US006404380B2

(12) United States Patent
Poore, Jr.

(10) Patent No.: US 6,404,380 B2
(45) Date of Patent: *Jun. 11, 2002

(54) METHOD AND SYSTEM FOR TRACKING MULTIPLE REGIONAL OBJECTS BY MULTI-DIMENSIONAL RELAXATION

(75) Inventor: Aubrey B. Poore, Jr., Fort Collins, CO (US)

(73) Assignee: Colorado State University Research Foundation, Fort Collins, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/312,036

(22) Filed: May 14, 1999

Related U.S. Application Data

(63) Continuation of application No. 08/682,904, filed on Jul. 16, 1996, now Pat. No. 5,959,574, which is a continuation-in-part of application No. 08/404,024, filed on Mar. 14, 1995, now Pat. No. 5,537,119, which is a continuation-in-part of application No. 08/171,327, filed on Dec. 21, 1993, now Pat. No. 5,406,289.

(51) Int. Cl.⁷ .............................................. G01S 13/00

(52) U.S. Cl. ........................................ 342/96; 342/90

(58) Field of Search .................................. 342/90, 96

(56) References Cited

U.S. PATENT DOCUMENTS 3,849,779 A * 11/1974 Boyd ........................ 343/7.4
3,869,601 A * 3/1975 Metcalf ................... 235/150.2

(List continued on next page.)

FOREIGN PATENT DOCUMENTS

JP 4113291 * 4/1992
JP 4198886 * 7/1992

OTHER PUBLICATIONS

W. P. Pierskalla, The multi-dimensional assignment problem, Operations Research, 16 (1968, pp. 422–431.*
C.R. Reeves ed. *Modern Heuristic Techniques for Combinatorial Problems.* Halstead Press, Wiley, New York, NY, 1993.

(List continued on next page.)

*Primary Examiner*—Mark Hellner
(74) *Attorney, Agent, or Firm*—William W. Cochran

(57) ABSTRACT

A method and system for real-time tracking of objects are disclosed. A region is repeatedly scanned providing a plurality of images or data sets having points corresponding to objects in the region to be tracked. Given a previously determined track for each object in the region, an M-dimensional combinatorial optimization assignment problem is formulated using the points from M–1 of the images or data sets, wherein each point is preferably used in extending at most one track. The M-dimensional problem is subsequently solved for an optimal or near-optimal assignment of the points to the tracks, extending the tracking of the objects so that a response to each object can be initiated by the system in real-time. Speed and accuracy is provided by an iterative Lagrangian Relaxation technique wherein a plurality of constraint dimensions are relaxed simultaneously to yield a reduced dimensional optimization problem whose solution is used to formulate an assignment problem of dimensionality less than M. The iterative reducing of dimensions terminates when exact solutions are determined for two-dimensional cases. A recovery procedure is used for determining a higher dimensional assignment problem solution from a problem having one less dimension. The procedure is useful when the reduced dimensional optimizational problem has two constraint dimensions.

20 Claims, 6 Drawing Sheets

U.S. PATENT DOCUMENTS

| | | | | |
|---|---|---|---|---|
| 4,042,924 A | * | 8/1977 | Evans et al. | 343/7 |
| 4,768,034 A | * | 8/1988 | Preikschat et al. | 342/80 |
| 4,823,272 A | * | 4/1989 | Inselberg | 364/461 |
| 4,839,658 A | * | 6/1989 | Kathol et al. | 342/455 |
| 4,975,707 A | * | 12/1990 | Smith | 342/357 |
| 5,058,024 A | * | 10/1991 | Inselberg | 364/461 |
| 5,138,321 A | * | 8/1992 | Hammer | 342/36 |
| 5,170,440 A | * | 12/1992 | Cox | 382/22 |
| 5,406,289 A | * | 4/1995 | Barker et al. | 342/96 |
| 5,537,119 A | | 7/1996 | Poore et al. | 342/96 |

OTHER PUBLICATIONS

A.M. Frieze and J. Yadegar. An algorithm for solving 3–dimensional assignment problems with application to scheduling a teaching practice. *Journal of the Operational Research Society*, 32:989–995, 1981.

M.FR. Garey and D.S. Johnson. *Computers and Intractability*. W.H. Freeman and Company, San Francisco, CA, 1979.

J.L. Goffin On convergence rates of subgradient optimization methods, mathematical programming. *Mathematical Programming*, 13:329–347, 1977.

J.–B. Hiriart–Urruty and C. Lemarechal. *Convex Analysis and Minimization Algorithms I & II*. Springer–Verlag, Berlin, 1993.

K.C. Kiwiel. Methods of descent for nondifferentiable optimization. In A. Dold and B. Eckmann, editors, *Lecture Notes in Mathematics*, vol. 1133, Berlin, 1985. Springer–Verlag.

K.C. Kiwiel. An aggregate subgradient method for non–smooth convex minimization. *Mathematical Programming*, 27:320–341, 1983.

C. Lemarechall and R. Mifflin. *Nonsmooth Optimization*. Pergamon Press, Oxford, UK, 1978.

C.H. Papadimitriou and K. Steiglitz. *Combinatorial Optimization: Algorithms and Complexity*. Prentice–Hall, Inc., Englewood Cliffs, NJ, 1982.

J. Pearl. *Heuristics: Intelligent Search Strategies for Computer Problem Solving*. Addition Wesley, Reading, MA, 1984.

W. Pierskalla. The tri–substitution method for the three–dimensional assignment problem. *Journal du CORS*, 5:71–81, 1967.

A.B. Poore. Multidimensional assignment formulation of data association problems arising from multitarget tracking and multisensor data fusion. *Computational Optimization and Applications*, 3:27–57, 1994.

A.B. Poore and O.E. Drummond. Track initiation and maintenance using multidimensional assignment problems. In D.W. Hearn W.W. Hager and P.M. Pardalos, editors, *Network Optimization*, volume 450, pp. 407–422, Boston, 1996. Kluwer Academic Publishers B.V.

A.B. Poore and N. Rijavec. A lagrangian relaxation algorithm for multidimensional assignment problems arising from multgitarget tracking. *SIAM Journal of Optimization*, 3, No. 3:544–563, 1993.

K.R. Pattipati S. Deb and Y. Bar–Shalom. A s–dimensional assignment algorithm for track initiation. In *Proceedings of the IEEE Systems Conference, Kobe, Japan*, pp. 127–130, 1992.

K.R. Pattipati S. Deb and Y. Bar–Shalom. A multisensor––multitarget data association algorithm for heterogeneous sensors. In *Proceedings of the IEEE Transactions on Aerospace and Electronic Systems*, vol. 29 No. 2, pp. 560–568, Apr. 1993.

Y. Bar–Shalom S. Deb, K.R. Pattipati and H. Tsanakis. A new algorithm for the generalized multidimensional assignment problem. In *Proceedings of the IEEE International Conference on Systems, Man, and Cybernetics, Chicago*, pp. 132–136, 1992.

H. Schramm and J. Zowe. A version of the bundle idea for minimizing a nonsmooth function: Conceptual idea, convergence analysis, numberical results. *SIAM Journal of Optimization*, 2, No. 1:121–152, Feb., 1992.

N.Z. Shor. *Minimization Methods for Non–Differentiable Functions*. Springer–Verlag, New York, 1985.

S.S. Blackman. *Multiple Target Tracking with Radar Applications*. Artech House, Dedham MA, 1986.

A.V. Aho, J.E. Hopcroft, and J.D. Ullman. *Design and Analysis of Computer Algorithms*. Addison–Wesley, MA, 1974.

Y. Bar–Shalom. *Multitarget–Multisensor Tracking: Advanced Applications*. Artech House, Dedham, MA, 1990.

Y. Bar–Shalom and T.E. Fortmann. *Tracking and Data Association*. Academic Press Boston, MA,1988.

D.P. Bertsekas and D.A. Castañon. A forward/reverse auction algorithm for asymmetric assignment problems. *Computational Optimization and Applications*, 1: 277–298, 1992).

G.L. Nemhauser and L.A. Wolsey. *Integer and Combinatorial Optimization*. Wiley, New York, NY, 1988.

O.E. Drummond. Multiple target tracking with multiple frame, probabilistic data association. In *Signal and Data Processing of Small Targets, SPIE Proceedings*, vol. 1954, pp. 394–408, 1993.

O.E. Drummond. Feedback in track fusion without process noise. In *Signal and Data processing of Small Targets, SPIE Proceedings*, vol. 2561, pp. 369–383, 1995.

O.E. Drummond. Multiple sensor tracking with multiple frame, probabilistic data association. In *Signal and Data Processing of Small Targets, SPIE Proceedings*, vol. 2561, pp. 322–336, 1995.

B.T. Poljak. Subgradient method: A survey of Soviet research. In C. Lemarèchal and R. Mifflin, editors, *Nonsmooth Optimization*, pp. 5–29, N.Y., 1978, Pergamon Press.

A.B. Poore. Multidimensional assignments and multitarget tracking: Partitioning data sets. In P. Hansen, I.J. Cox, and B. Julesz, editors, *DIMACS Series in Discrete Mathematics and Theoretical Computer Science*, vol. 19, pp. 169–198, Providence, R.I., 1995. American Mathematical Society.

A.B. Poore and N.Rijavec. A numerical study of some data association problems arising in multitarget tracking. *Large Scale Optimization: State of the Art*, pp. 339–361, 1994.

A.B. Poore and N. Rijavec. Partitioning multiple data sets: multidimentional assignments and lagrangian relaxation. In P.M. Pardalox and H. Wolkowicz, editors, *Quadratic Assignment and Related Problems: DIMACS Series in Discrete Mathematics and Theoretical Computer Science*, vol. 16, pp. 25–37, 1994.

A.J. Robertson III. A class of lagrangian relaxation algorithms for the multidimensional assignment problem. *Ph.D. Thesis, Colorado State University, Ft. Collins, CO*, 1995.

T. Kurien. Issues in the designing of practical multitarget tracking algorithms. In *Multitarget–Multisensor Tracking: Advances Applications by Y. Bar–Shalom*. Artech House, MA, 1990.

P. Wolfe. A method of conjugate subgradients for minimizing nondifferentiable functions. *Mathematical Programming Study*, 3:145–173, 1975.

P. Wolfe. Finding the nearest point in a polytope. *Mathematical Programming Study*, 11:128–149, 1976.

* cited by examiner

METHOD AND SYSTEM FOR TRACKING MULTIPLE REGIONAL OBJECTS BY MULTI-DIMENSIONAL RELAXATION

CROSS-REFERENCE TO RELATED APPLICATIONS

This application is a continuation of U.S. patent application Ser. No. 08/682,904 filed Jul. 16, 1996, now U.S. Pat. No. 5,959,574 which is a continuation-in-part of U.S. patent application Ser. No. 08/404,024, filed Mar. 14, 1995 and issued Jul. 16, 1996 as U.S. Pat. No. 5,537,119, which is a continuation-in-part of U.S. patent application Ser. No. 08/171,327 filed Dec. 21, 1993, now U.S. Pat. No. 5,406,289.

BACKGROUND OF THE INVENTION a. Field of the Invention

The invention relates generally to computerized techniques for processing data obtained from radar to track multiple discrete objects.

b. Description of the Background

There are many situations where the courses of multiple objects in a region must be tracked. Typically, radar is used to scan the region and generate discrete images or "snapshots" based on sets of returns or observations. In some types of tracking systems, all the returns from any one object are represented in an image as a single point unrelated to the shape or size of the objects. "Tracking" is the process of identifying a sequence of points from a respective sequence of the images that represents the motion of an object. The tracking problem is difficult when there are multiple closely spaced objects because the objects can change speed and direction rapidly and move into and out of the line of sight for other objects. The problem is exacerbated because each set of returns may result from noise as well as echoes from the actual objects. The returns resulting from the noise are also called false positives. Likewise, the radar will not detect all echoes from the actual objects and this phenomena is called a false negative or "missed detect" error. For tracking airborne objects, a large distance between the radar and the objects diminishes the signal to noise ratio so the number of false positives and false negatives can be high. For robotic applications, the power of the radar is low and as a result, the signal to noise ratio can also be low and the number of false positives and false negatives high.

In view of the proximity of the objects to one another, varied motion of the objects and false positives and false negatives, multiple sequential images should be analyzed collectively to obtain enough information to properly assign the points to the proper tracks. Naturally, the larger the number of images that are analyzed, the greater the amount of information that must be processed.

While identifying the track of an object, a kinematic model may be generated describing the location, velocity and acceleration of the object. Such a model provides the means by which the future motion of the object can be predicted. Based upon such a prediction, appropriate action may be initiated. For example, in a military application there is a need to track multiple enemy aircraft or missiles in a region to predict their objective, plan responses and intercept them. Alternatively, in a commercial air traffic control application there is a need to track multiple commercial aircraft around an airport to predict their future courses and avoid collision. Further, these and other applications, such as robotic applications, may use radar, sonar, infrared or other object detecting radiation bandwidths for tracking objects. In particular, in robotic applications reflected radiation can be used to track a single object which moves relative to the robot (or vice versa) so the robot can work on the object.

Consider the very simple example of two objects being tracked and no false positives or false negatives. The radar, after scanning at time $t_1$, reports objects at two locations in a first observation set. That is, the radar returns a set of two observations $\{o_{11}, o_{12}\}$. At time $t_2$ the radar returns a similar set of two observations $\{o_{21}, o_{22}\}$ from a second observation set. Suppose from prior processing that track data for two tracks $T_1$ and $T_2$ includes the locations at $t_0$ of two objects. Track $T_1$ may be extended through the points in the two sets of observations in any of four ways, as may track $T_2$. The possible extensions of $T_1$ can be described as: $\{T_1, o_{11}, o_{21}\}$, $\{T_1, o_{11}, o_{22}\}$, $\{T_1, o_{12}, o_{21}\}$ and $\{T_1, o_{12}, o_{22}\}$. Tracks can likewise be extended from $T_2$ in four possible ways, including $\{T_2, o_{12}, o_{21}\}$. FIG. 1 illustrates these five (out of eight) possible tracks (to simplify the problem for purposes of explanation). The five track extensions are labeled $h_{11}$, $h_{12}$, $h_{13}$, $h_{14}$, and $h_{21}$ wherein $h_{11}$ is derived from $\{T_1, o_{11}, o_{21}\}$, $h_{12}$ is derived from $\{T_1, o_{11}, o_{22}\}$, $h_{13}$ is derived from $\{T_1, o_{12}, o_{21}\}$, $h_{14}$ is derived from $\{T_1, o_{12}, o_{22}\}$, and $h_{21}$ is derived from $\{T_2, o_{11}, o_{21}\}$. The problem of determining which such track extensions are the most likely or optimal is hereinafter known as the assignment problem.

It is known from prior art to determine a figure of merit or cost for assigning each of the points in the images to a track. The figure of merit or cost is based on the likelihood that the point is actually part of the track. For example, the figure of merit or cost may be based on the distance from the point to an extrapolation of the track. FIG. 1 illustrates costs $\delta_{21}$ and $\delta_{22}$ for hypothetical extension $h_{21}$ and modeled target characteristics. The function to calculate the cost will normally incorporate detailed characteristics of the sensor, such as probability of measurement error, and track characteristics, such as likelihood of track maneuver.

FIG. 2 illustrates a two by two by two matrix, c, that contains the costs for each point in relation to each possible track. The cost matrix is indexed along one axis by the track number, along another axis by the image number and along the third axis by a point number. Thus, each position in the cost matrix lists the cost for a unique combination of points and a track, one point from each image. FIG. 2 also illustrates a $\{0, 1\}$ assignment matrix, z, which is defined with the same dimensions as the cost matrix. Setting a position in the assignment matrix to "one" means that the equivalent position in the cost matrix is selected into the solution. The illustrated solution matrix selects the $\{h_{14}, h_{21}\}$ solution previously described. Note that for the above example of two tracks and two snapshots, the resulting cost and assignment matrices are three-dimensional. As used in this patent application, the term "dimension" means the number of axes in the cost or assignment matrix while size refers to the number of elements along a typical axis. The costs and assignments have been grouped in matrices to facilitate computation.

A solution to the assignment problem satisfies two constraints—first, the sum of the associated costs for assigning points to a track extension is minimized and, second, if no false positives or false negatives exist, then each point is assigned to one and only one track.

When false positives exist, however, additional hypothetical track extensions incorporating the false positives will be generated. Further note that the random locations of false positives will, in general, not fit well with true data and such additional hypothetical track extensions will result in higher costs. Also note that when false negative errors exist, then the size of the cost matrix must grow to include hypothetical track extensions formulated with "gaps" (i.e., data omissions where there should be legitimate observation data) for the false negatives. Thus, the second criteria must be weakened to reflect false positives not being as signed and also to permit the gap filler to be multiply assigned. With hypothetical cost calculated in this manner then the foregoing criteria for minimization will to materialize the false negatives and avoid the false positives.

For a three-dimensional problem, as is illustrated in FIG. 1, but with $N_1$ (initial) tracks, $N_2$ observations in scan 1, $N_3$ observations in scan 2, false positives and negatives assumed, the assignment problem can be formulated as:

(a) Minimize: $$\sum_{i_1=0}^{N_1}\sum_{i_2=0}^{N_2}\sum_{i_3=0}^{N_3} c_{i_1 i_2 i_3} z_{i_1 i_2 i_3} \quad (0.1)$$

(b) Subject to: $$\sum_{i_2=1}^{N_2}\sum_{i_3=1}^{N_3} z_{i_1 i_2 i_3} = 1, \quad i_1 = 1, \ldots N_1,$$

(c) $$\sum_{i_1=1}^{N_1}\sum_{i_3=1}^{N_3} z_{i_1 i_2 i_3} \le 1, \quad i_2 = 1, \ldots N_2,$$

(d) $$\sum_{i_1=1}^{N_1}\sum_{i_2=1}^{N_2} z_{i_1 i_2 i_3} \le 1, \quad i_3 = 1, \ldots N_3,$$

(e) $$z_{i_1 i_2 i_3} \in \{0, 1\} \quad \forall\; z_{i_1 i_2 i_3},$$

where "c" is the cost and "z" is a point or observation assignment, as in FIG. 2.

The minimization equation or equivalently objective function (0.1)(a) specifies the sum of the element by element product of the c and z matrices. The summation includes hypothesis representations $z_{i_1 i_2 i_3}$ with observation number zero being the gap filler observation. Equation (0.1)(b) requires that each of the tracks $T_1, \ldots, T_{N_1}$ be extended by one and only one hypothesis. Equation (0.1)(c) relates to each point or observation in the first observation set and requires that each such observation, except the gap filler, can only associate with one track but, because of the "less than" condition, it might not associate with any track. Equation (0.1)(d) is like (0.1)(c) except that it is applicable to the second observation set. Equation (0.1)(e) requires that elements of the solution matrix z be limited to the zero and one values.

The only known method to solve Problem Formulation (0.1) exactly is a method called "Branch and Bound." This method provides a systematic ordering of the potential solutions so that solutions with a same partial solution are accessible via a branch of a tree describing all possible solutions whereby the cost of unexamined solutions on a branch are incrementally developed as the cost for other solutions on the branch are determined. When the developing cost grows to exceed the previously known minimal cost (i.e., the bound) then enumeration of the tree branch terminates. Evaluation continues with a new branch. If evaluation of the cost of a particular branch completes, then that branch has lower cost than the previous bound so the new cost replaces the old bound. When all possible branches are evaluated or eliminated then the branch that had resulted in the last used bound is the solution. If we assume that $N_1=N_2=N_3=n$ and that branches typically evaluate to half there full length, then workload associated with "branch and bound" is proportional to $(n!|n/2!)^2$. This workload is unsuited to real time evaluation.

The Branch and Bound algorithm has been used in past research on the Traveling Salesman Problem. Messrs. Held and Karp showed that if the set of constraints was relaxed by a method of Lagrangian Multipliers (described in more detail below) then tight lower bounds could be developed in advance of enumerating any branch of the potential solution. By initiating the branch and bound algorithm with such a tight lower bound, significant performance improvements result in that branches will typically evaluate to less than half their full length.

Messrs. Frieze and Yadagar in dealing with a problem related to scheduling combinations of resources, as in job, worker and work site, showed that Problem Formulation (0.1) applied. They further described a solution method based upon an extension of the Lagrangian Relaxation previously mentioned. The two critical extensions provided by Messrs. Frieze and Yadagar were: (1) an iterative procedure that permitted the lower bound on the solution to be improved (by "hill climbing" described below) and (2) the recognition that when the lower bound of the relaxed problem was maximized, then there existed a method to recover the solution of the non-relaxed problem in most cases using parameters determined at the maximum. The procedures attributed to Messrs. Frieze and Yadagar are only applicable to the three-dimensional problem posed by Problem Formulation (0.1) and where the cost matrix is fully populated. However, tracking multiple airborne objects usually requires solution of a much higher dimensional problem.

FIGS. 1 and 2 illustrate an example where "look ahead" data from the second image improved the assignment accuracy for the first image. Without the look ahead, and based only upon a simple nearest neighbor approach, the assignments in the first set would have been reversed. Problem Formulation (0.1) and the prior art only permit looking ahead one image. In the prior art it was known that the accuracy of assignments will improve if the process looks further ahead, however no practical method to optimally incorporate look ahead data existed. Many real radar tracking problems involve hundreds of tracks, thousands of observations per observation set and matrices with dimensions in the range of 3 to 25 including many images of look ahead.

It was also known that the data assignment problem may be simplified (without reducing the dimension of the assignment problem) by eliminating from consideration for each track those points which, after considering estimated limits of speed and turning ability of the objects, could not physically be part of the track. One such technique, denoted hereinafter the "cone method," defines a cone as a continuation of each previously determined track with the apex of the cone at the end of the previously defined track. The length of the cone is based on the estimated maximum speed of the object and the size of the arc of the cone is based on the estimated maximum turning ability of the object. Thus, the cone defines a region outside of which no point could physically be part of the respective track. For any such points outside of the cones, an infinite number could be put in the cost matrix and a zero could be preassigned in the assignment matrix. It was known for the tracking problem that these elements will be very common in the cost and selection matrices (so these matrices are "sparse").

It was also known in the prior art that one or more tracks which are substantially separated geographically from the other tracks can be separated also in the assignment problem. This is done by examining the distances from each point to the various possible tracks. If the distances from one set of points are reasonably short only in relation to one track, then they are assigned to that track and not further considered with the remainder of the points. Similarly, if a larger group of points can only be assigned to a few tracks, then the group is considered a different assignment problem. Because the complexity of assignment problems increases dramatically with the number of possible tracks and the total number of points in each matrix, this partitioning of the group of points into a separate assignment problem and removal of these points from the matrices for the remaining points, substantially reduces the complexity of the overall assignment problem.

A previously known Multiple Hypothesis Testing (MHT) algorithm (see Chapter 10 of S. S. Blackman. Multiple-Target Tracking with Radar Applications. Artech House, Norwood, Mass., 1986.) related to formulation and scoring. The MHT procedure describes how to formulate the sparse set of all reasonable extension hypothesis (for FIG. 1 the set $\{h_{11} \ldots h_{24}\}$) and how to calculate a cost of the hypothesis $\{T_i, o_{1j}, o^{2k}\}$ based upon the previously calculated cost for hypothesis $(T_i, o_{1j})$. The experience with the MHT algorithm, known in the prior art, is the basis for the assertion that look ahead through k sets of observations results in improved assignment of observations from the first set to the track.

In theory, the MHT procedure uses the extendable costing procedure to defer assignment decision until the accumulated evidence supporting the assignment becomes overwhelming. When it makes the assignment decision, it then eliminates all potential assignments invalidated by the decision in a process called "pruning the tree." In practice, the MHT hypothesis tree is limited to a fixed number of generations and the overwhelming evidence rule is replaced by a most likely and feasible rule. This rule considers each track independently of others and is therefore a local decision rule.

A general object of the present invention is to provide an efficient and accurate process for assigning each point object in a region from multiple images to a proper track and then taking an action based upon the assignments.

A more specific object of the present invention is to provide a technique of the foregoing type which determines the solution of a k-dimensional assignment problem where "k" is greater than or equal to three.

SUMMARY OF THE INVENTION

The present invention relates to a method and apparatus for tracking objects. In particular, the present invention tracks movement or trajectories of objects by analyzing radiation reflected from the objects, the invention being especially useful for real-time tracking in noisy environments.

In providing such a tracking capability, a region containing the objects is repeatedly scanned to generate a multiplicity of sequential images or data observation sets of the region. One or more points (or equivalently observations), in each of the images or observation sets are detected wherein each such observation either corresponds to an actual location of an object or is an erroneous data point due to noise. Subsequently, for each observation detected, figures of merit or costs are determined for assigning the observation to each of a plurality of previously determined tracks. *Afterwards, a first optimization problem is specified which includes:

(a) a first objective function for relating the above mentioned costs to potential track extensions through the detected observations (or simply observations); and (b) a first collection of constraint sets wherein each constraint set includes constraints to be satisfied by the observations in a particular scan to which the constraint set is related. In general, there is a constraint for each observation of the scan, wherein the constraint indicates the number of track extensions to which the observation may belong.

In particular, the first optimization problem is formulated, generated or defined as an M-dimensional assignment problem wherein there are M constraint sets in the first collection of constraint sets (i.e., there are M scans being examined) and the first objective function minimizes a total cost for assigning observations to various track extensions wherein terms are included in the cost, such that the terms have the figures of merit or costs for hypothesized combinations of assignments of the observations to the tracks. Subsequently, the formulated M-dimensional assignment problem is solved by reducing the complexity of the problem by generating one or more optimization problems each having a lower dimension and then solving each lower dimension optimization problem. That is, the M-dimensional assignment problem is solved by solving a plurality of optimization problems each having a lower number of constraint sets.

The reduction of the M-dimensional assignment problem to a lower dimensioned problem is accomplished by relaxing the constraints on the points of one or more scans thereby permitting these points to be assigned to more than one track extension. In relaxing the constraints, terms having penalty factors are added into the objective function thereby increasing the total cost of an assignment when one or more points are assigned to more than one track. Thus, the reduction in complexity by this relaxation process is iteratively repeated until a sufficiently low dimension is attained such that the lower dimensional problem may be solved directly by known techniques.

In one embodiment of the invention, each k-dimensional assignment problem (2<k<M) is iteratively reduced to a (k–1)-dimensional problem until a two-dimensional problem is specified or formulated. Subsequently, the two-dimensional problem formulated is solved directly and a "recovery" technique is used to iteratively recover an optimal or near-optimal solution to each k-dimensional problem from a derived (k–1)-dimensional problem k=2,3,4, . . . M.

In performing each recovery step (of obtaining a solution to a k-dimensional problem using a solution to a (k–1)-dimensional problem), an auxiliary function is utilized. In particular, to recover an optimal or near-optimal solution to a k-dimensional problem, an auxiliary function, $\Psi_{k-1}$ (k=4, 5, . . . ,M), is specified and a region or domain is determined wherein this function is maximized, whereby values of the region determine the penalty factors of the (k–1)-dimensional problem such that another two-dimensional problem can be formulated which determines a solution to the k-dimensional problem using the penalty factors of the (k–1)-dimensional problem.

Each Auxiliary function $\Psi_k$, k=3, . . . ,M–1, is a function of both lower dimensional problems, penalty factors, and a solution at the dimension k at which the penalized cost function is solved directly (typically a two-dimensional problem). Further, in determining, for auxiliary function $\Psi_k$, a peak region, a gradient of the auxiliary function is determined, and utilized to identify the peak region. Thus, gradients are used for each of the approximation functions $\Psi_3, \Psi_4, \ldots, \Psi_{M-1}$ which are sequentially formulated and used in determining penalty factors until M–1 is used in determining the penalty factors for the (M–1)-dimensional problem. Subsequently, once the M-dimensional problem is solved (using a two-dimensional problem to go from an (M–1)-dimensional solution to an M-dimensional solution), one or more of the following actions are taken based on the track assignments: sending a warning to aircraft or a ground or sea facility, controlling air traffic, controlling anti-aircraft or anti-missile equipment, taking evasive action, working on one of the objects.

According to one feature of this first embodiment of the present invention, the following steps are also performed before the step of defining the auxiliary function. A preliminary auxiliary function is defined for each of the lower dimensional problems having a dimension equal or one greater than the dimension at which the penalized cost function is solved directly. The preliminary auxiliary function is a function of lower order penalty values and a solution at the dimension at which the penalized cost function was solved directly. In determining a gradient of the preliminary auxiliary function, step in the direction of the gradient to identify a peak region of the preliminary auxiliary function and determine penalty factors at the peak region. Iteratively repeat the defining, gradient determining, stepping and peak determining steps to define auxiliary functions at successively higher dimensions until the auxiliary function dimension (k−1) is determined. In an alternative second embodiment of the present invention, instead of reducing the dimentionality of the M-dimensional assignment problem by a single dimension at a time, a plurality of dimensions are relaxed simultaneously. This new strategy has the advantage that when the M-dimensional problem is relaxed directly to a two-dimensional assignment problem, then all computations may be performed precisely without utilizing an auxiliary function such as $\Psi_k$ as in the first embodiment. More particularly, the second embodiment solves the first optimization problem (i.e., the M-dimensional assignment problem) by specifying (i.e., creating, generating, formulating and/or defining) a second optimization problem. The second optimization problem includes a second objective function and a second collection of constraint sets wherein:

a) the second objective function is a combination of the first objective function and penalty factors or terms determined for incorporating (M−m)-constraint sets of the first optimization problem into the second objective function;

b) the constraint sets of the second collection include only m of the constraint sets of the first collection of constraints, wherein 2<m<M−1. Note that, once the second optimization problem has been specified or formulated, an optimal or near-optimal solution is determined and that solution is used in specifying (i.e, creating, generating, formulating and/or defining) a third optimization problem of (M−m) dimensions (or equivalently constraint sets). The third optimization problem is subsequently solved by decomposing it using the same procedure of this second embodiment as was used to decompose the first optimization problem above. Thus, a plurality of instantiations of the third optimization problem are specified, each successive instantiation having a lower number of dimensions, until an instance of the third optimization problem is a two-dimensional assignment problem which can be solved directly. Subsequently, whenever an instance of the third optimization problem is solved, the solution is used to recover a solution to the instance of the first optimization problem from which this instance of the third optimization was derived. Thus, an optimal or near-optimal solution to the original first optimization problem may be recovered through iteration of the above steps.

As mentioned above, the second embodiment of the present invention is especially advantageous when m=2, since in this case all computations may be performed precisely and without utilizing auxiliary functions.

Other features and benefits of the present invention will become apparent from the detailed description with the accompanying drawings contained hereinafter.

DETAILED DESCRIPTION OF THE INVENTION

Figure 1:
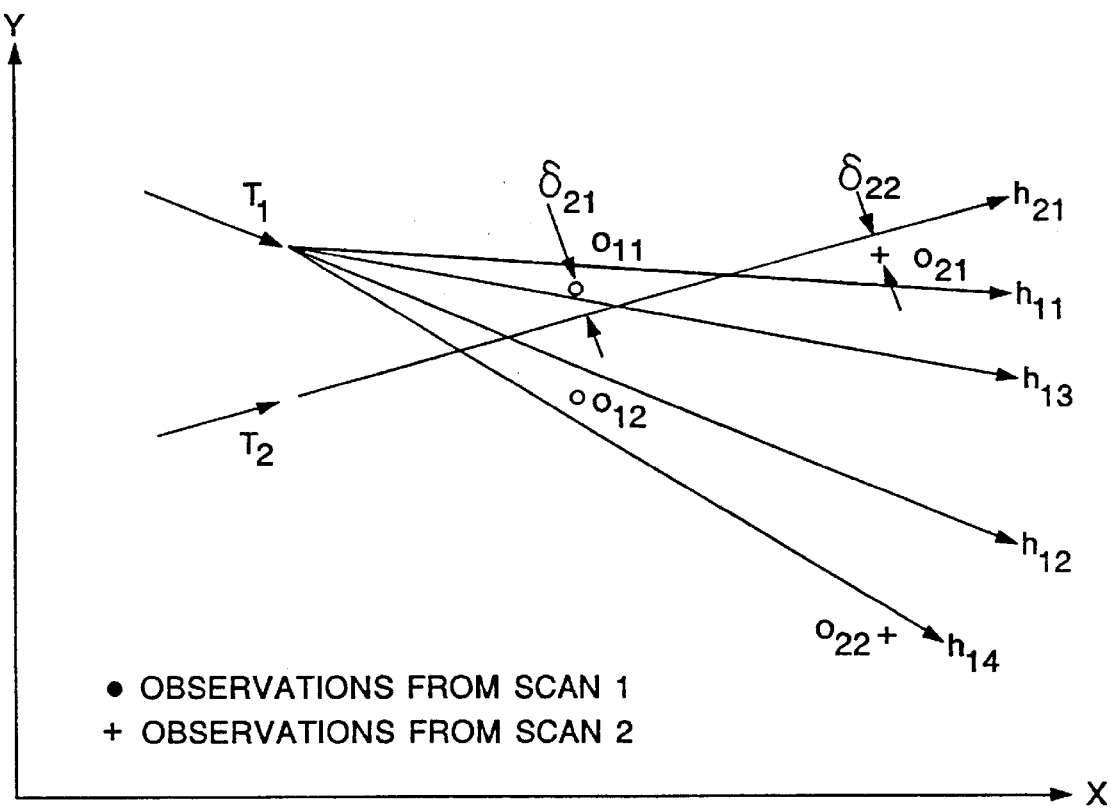
FIG. 1 is a graph of images or data sets generated by a scan of a region and possible tracks within the images or data sets according to the prior art.
Figure 2:
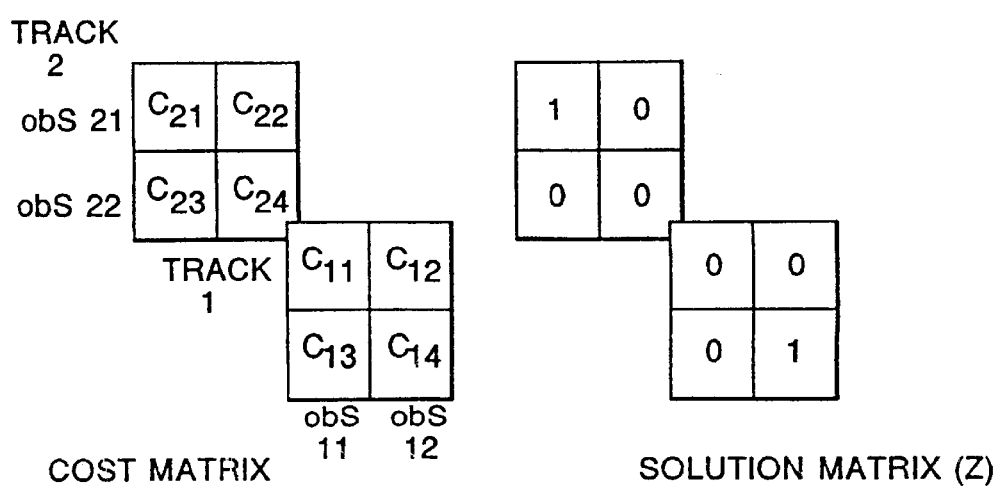
FIG. 2 illustrates cost and assignment matrices for the data sets of FIG. 1 according to the prior art.
Figure 3:
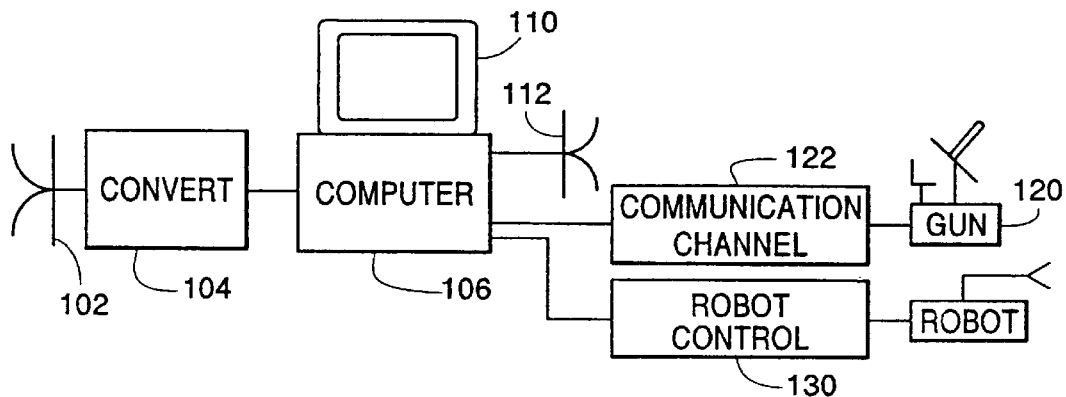
FIG. 3 is a block diagram of the present invention.

Referring now to the other figures in detail wherein like reference numerals indicate like elements throughout the several views, FIG. 3 illustrates a system generally designated 100 for implementing the present invention. System 100 comprises, for example, a radar station 102 (note sonar, microwave, infrared and other radiation bandwidths are also contemplated) for scanning a region which may be, for example, an aerial region (in aerial surveillance applications) or a work region (in robotic applications) and generating signals indicating locations of objects within the region. The signals are input to a converter 104 which converts the signals to data points or observations in which each object (or false positive) is represented by a single point. The output of the converter is input to and readable by a computer 106. As described in more detail below, the computer 106 assigns the points to respective tracks, and then displays the tracks and extrapolations of the tracks on a monitor 110. Also, the computer 106 determines an appropriate action to take based on the tracks and track extensions. For example, in a commercial application at an airport, the computer can determine if two aircraft being tracked are on a collision course and if so, signal a transmitter 112 to warn each aircraft, or if a scheduled take-off will pose the risk of collision, delay the take-off. For a military application on a ship or base, the computer can determine subsequent coordinates of enemy aircraft and send the coordinates to an antiaircraft gun or missile 120 via a communication channel 122. In a robotic application, the computer controls the robot to work on the proper object or portion of the object.

The invention generates k-dimensional matrices where k is the number of images or sets of observation data in the look ahead window plus one. Then, the invention formulates a k-dimensional assignment problem as in (0.1) above.

The k-dimensional assignment problem is subsequently relaxed to a (k−1)-dimensional problem by incorporating one set of constraints into the objective function using a Lagrangian relaxation of this set. Given a solution of the (k−1)-dimensional problem, a feasible solution of the k-dimensional problem is then reconstructed. The (k−1)-dimensional problem is solved in a similar manner, and the process is repeated until it reaches the two-dimensional problem that can be solved exactly. The ideas behind the Lagrangian relaxation scheme are outlined next.

Consider the integer programming problem $$\text{Minimize} \quad v(z) = c^T z \quad (0.2)$$

$$\text{Subject to:} \quad Az \leq b,$$

$$Bz \leq d,$$

$$z_i \text{ is an integer for } i \in I,$$

where the partitioning of the constraints is natural in some sense. Given a multiplier vector $u \geq 0$, the Lagrangian relaxation of (0.2) relative to the constraints $Bz \leq d$ is defined to be $$\Phi(u) = \text{Minimize} \quad \{c^T z + u^T (Bz - d)\} \quad (0.3)$$

$$\text{Subject to:} \quad Az \leq b,$$

$$z_i \text{ is an integer for } i \in I.$$

If the constraint set $Bz \leq d$ is replaced by $Bz = d$, the non-negativity constraint on u is removed. $\mathcal{L} = c^T z + u^T (Bz - d)$ is the Lagrangian relative to the constraints $Bz \leq d$, and hence the name Lagrangian relaxation. The following fact gives the relationship between the objective functions of the original and relaxed problems.

FACT A.1. If $\bar{z}$ is an optimal solution to (0.2), then $\Phi(u) \leq v(\bar{z})$ for all $u \geq 0$. If an optimal solution $\hat{z}$ of (0.3) is feasible for (0.3), then $\hat{z}$ an optimal solution for (0.2) and $\Phi(u) = v(\bar{z})$.

This leads to the following algorithm:

Algorithm. Construct a sequence of multipliers $\{u_k\}_{k=0}^{\infty}$ converging to the solution $\bar{u}$ of Maximize $\{\Phi(u) : u \geq 0\}$ and a corresponding sequence of feasible solutions $\{z_k\}_{k=0}^{\infty}$ of (0.2) as follows:

1. Generate an initial approximation $u_0$.
2. Given $u_k$, choose a search direction $s_k$ and a search distance $\alpha_k$ so that $\Phi(u_k + \alpha_k s_k) > \Phi(u_k)$. Update the multiplier estimate $u_k$ by $u_{k+1} = u_k + \alpha_k s_k$.
3. Given $u_{k+1}$ and a feasible solution $\hat{z}_{k+1}(u_{k+1})$ of (3.0), recover a feasible solution $z_{k+1}(u_{k+1})$ of the integer programming problem (0.2).
4. Check the termination criteria. If the algorithm is not finished, set k=k+1 and return to Step 2. Otherwise, terminate the algorithm.

If $\bar{z}$ is an optimal solution of (0.2), then $$\Phi(u_k) \leq \Phi(\bar{u}) \leq v(\bar{z}) \leq v(z_k).$$

Since the optimal solution $\hat{z} = \hat{z}(u)$ of (0.3) is usually not a feasible solution of (0.2) for any choice of the multipliers, $\Phi(\bar{u})$ is usually strictly less than $v(\bar{z})$. The difference $v(\bar{z}) - \Phi(\bar{u})$ is called the "duality gap," which can be estimated by comparing the best relaxed and recovered solutions computed in the course of maximizing $\Phi(u)$.

Thus, to eliminate the "<" in the constraint formulations (e.g., (0.1)(a)–(0.1)(d)) that resulted from false positives, the constraint sets have been modified, as indicated above, to incorporate a gap filler in each observation set to account for false positives. Thus, a zero for an index $i_p$ $(1 \leq p \leq k)$ in $z_{i_1 \ldots i_k}$ in problem (0.4) below indicates that the track extension represented by $z_{i_1 \ldots i_k}$ includes a false positive in the $p^{th}$ observation set. Note that this implies that a hypothesis be formed incorporating an observation with k−1 gap fillers, e.g., $Z_0 \ldots 0, i_p 0 \ldots 0, i_p \neq 0$. Thus, the resulting generalization of Problem Formulation (0.1) without the "less than" complication within the constraints is the following k-Dimensional Assignment Problems in which $k \geq 3$:

$$\text{Minimize} \quad \sum_{i_1=0}^{N_1} \cdots \sum_{i_k=0}^{N_k} c_{i_1 \ldots i_k} z_{i_1 \ldots i_k} \quad (0.4)$$

$$\text{Subject to:} \quad \sum_{i_2=0}^{N_2} \cdots \sum_{i_k=0}^{N_k} z_{i_1 \ldots i_k} = 1, i_1 = 1, \ldots N_1,$$

$$\sum_{i_1=0}^{N_1} \cdots \sum_{i_{j-1}=0}^{N_{j-1}} \sum_{i_{j+1}=0}^{N_{j+1}} \cdots \sum_{i_k=0}^{N_k} z_{i_1 \ldots i_k} = 1,$$

$$\text{for } i_j = 1, \ldots N_j \text{ and } j = 2, \ldots k - 1,$$

$$\sum_{i_1=0}^{N_1} \cdots \sum_{i_{k-1}=0}^{N_{k-1}} z_{i_1 \ldots i_k} = 1, i_k = 1, \ldots N_k,$$

$$z_{i_1 \ldots i_k} \in \{0, 1\}, \forall i_n, n = 1, \ldots, k,$$

where c and z are similarly dimensioned matrices representing costs and hypothetical assignments. Note, in general, for tracking problems these matrices are sparse.

After formulating the k-dimensional assignment problem as in (0.4), the present invention solves the resulting problem so as to generate the outputs required by devices 110, 112, 122 and 130. For each observation set $o_i$ received from converter 104 at time $t_i$ where $i=1, \ldots, N_1$, the computer processes $o_i$ in a batch together with the other observation sets $o_{i-k+1}, \ldots, o_i$ and the track $T_{i-k}$, i.e., $T_j$ is the set of all tracks that have been defined up to but not including $o_j$. (Note, bold type designations refer to the vector of elements for the indicated time, i.e., the set of all observations in the scan or tracks existing at the time, etc.) The result of this processing is the new set of tracks $T_{i-k+1}$ and a set of cost weighted possible solutions indicating how the tracks might extend to the current time $t_i$. At time $t_{i+1}$ the batch process is repeated using the newest observation set and deleting the oldest. Thus, there is a moving window of observation sets which is shifted forward to always incorporate the most recent observation set. The effect is that input observation sets are reused for (k−1) cycles and then on the observation set's $k^{th}$ reuse each observation within the observation set is integrated into a track.

Figure 7:
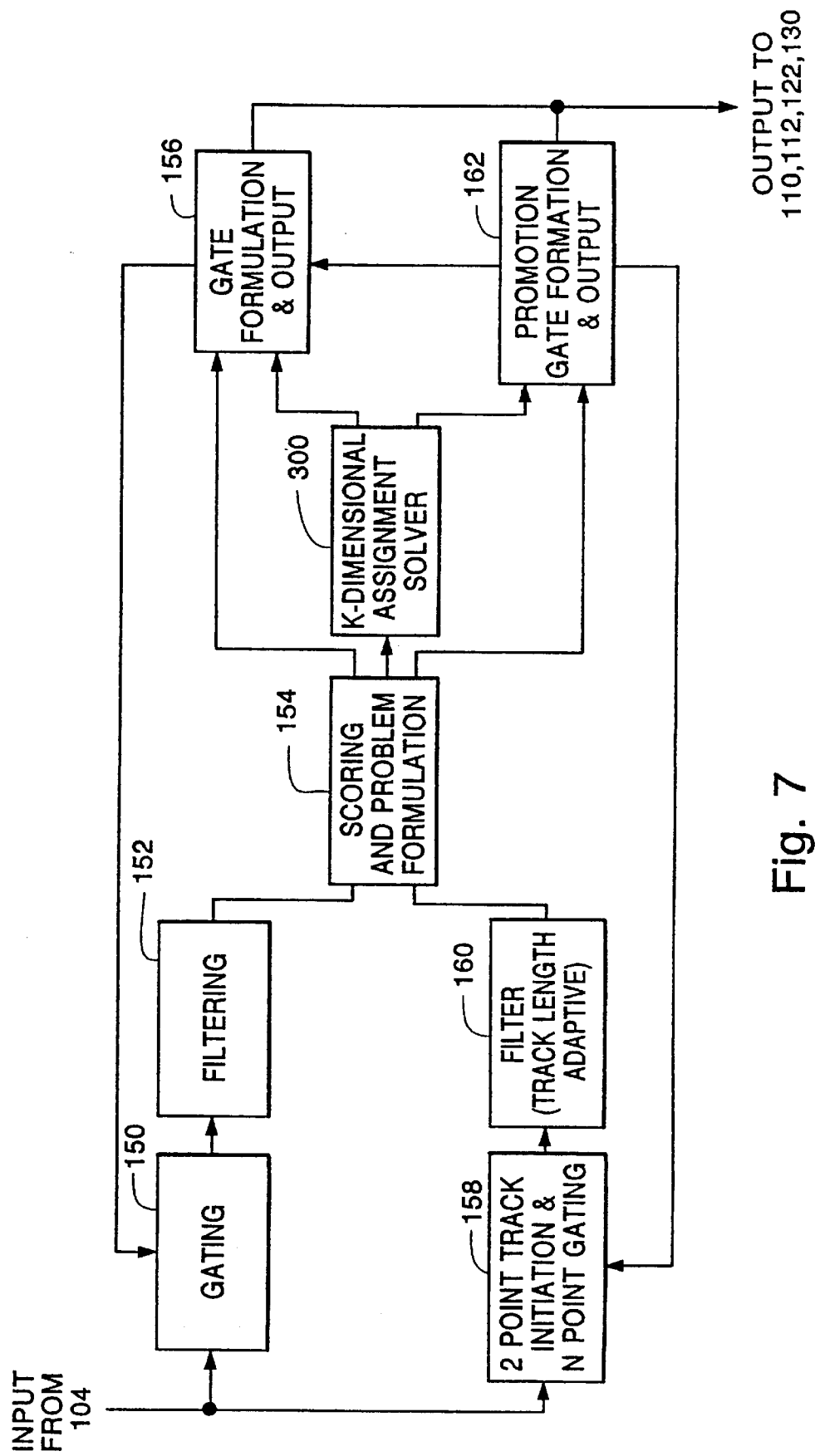
FIG. 7 is another block diagram of the present invention for solving the k-dimensional assignment problem where "k" is greater than or equal to three (3).

FIG. 7 illustrates various processes implemented upon receipt of each observation set. Except for the addition of the k-dimensional assignment solving process 300 and the modification to scoring process 154 to build data structures suitable for process 300, all processes in FIG. 7 are based upon prior art. The following processes 150 and 152 extend previously defined tracks $h_{i-1}$ based on new observations. Gate formulation and output process 156 determines, for each of the previously defined tracks, a zone wherein the track may potentially extend based on limits of velocity, maneuverability and radar precision. One such technique to accomplish this is the cone method described previously. The definition of the zone is passed to gating process 150. When a new observation set $o_i$ is received, the gating process 150 will match each member observation with the zone for each member of the hypothetical set $h_{i-1}$. After all input observations from $o_i$ are processed, the new hypothesis set $h_i$ is generated by extending each track of the prior set of hypothetical tracks $h_{i-1}$ either with missed detect gap fillers or with all new observation elements satisfying the track's zone. This is a many-to-many matching in that each hypothesis member can be extended to many new observations and each new observation can be used to extend many hypotheses. It, however, is not a full matching in that any hypothesis will neither be matched to all observations nor vice versa. It is this matching characteristic that leads to the sparse matrices involved in the tracking process. Subsequently, gating 150 forwards the new hypothesis set $h_i$ to filtering process 152. Filtering process 152 determines a smooth curve for each member of $h_i$. Such a smooth curve is more likely than a sharp turn from each point straight to the next point. Further, the filtering process 152 removes small errors that may occur in generating observations. Note that in performing these tasks, the filtering process 152 preferably utilizes a minimization of a least squares test of the points in a track hypothesis or a Kalman filtering approach.

As noted above, the foregoing track extension process requires knowledge of a previous track. For the initial observations, the following gating process 158 and filtering process 160 determine the "previous track" based on initial observations. In determining the initial tracks, the points from the first observation set form the beginning points of all possible tracks. After observation data from the next observation set is received, sets of simple two-point straight line tracks are defined. Then, promotion, gate formulation, and output step 162 determines a zone in which future extensions are possible. Note that filtering step 160 uses curve fitting techniques to smooth the track extensions depending upon the number of prior observations that have accumulated in each hypothesis. Further note that promotion, gate formulation and output process 162 also determines when sufficient observations have accumulated to form a basis for promoting the track to processes 150 and 152 as described above.

The output of each of the filtering processes 152 and 160 is a set of hypothetical track extensions. Each such extension contains the hypothetical initial conditions (from the previous track), the list of observations incorporated in the extension, and distance between each observation and the filtered track curve. scoring process 154 determines the figure of merit or cost of an observation being an extension of a track. In one embodiment, the cost is based on the above-mentioned distance although the particular formula for determining the cost is not critical to the present invention. A preferred formula for determining the cost utilizes a negative log likelihood function in which the cost is the negative of the sum of: (a) the logs of the distances normalized by sensor standard deviation parameters, and (b) the log likelihoods for events related to track initiation, track termination, track maneuver, false negatives and false positives. Note that track maneuvers are detected by comparing the previous track curve with the current extension. Further note that some of the other events related to, for example, false negatives and false positives are detected by analyzing the relative relationship of gap fillers in the hypothesis. Thus, after determining that one of these events occurred, a cost for it can be determined based upon suitable statistics tables and system input parameters. The negative log likelihood function is desirable because it permits effective integration of the useful components. Copies of the set of hypothetical track extensions which are scored are subsequently passed directly to one of the gate formulation and output steps 156 and 162. Note that the scoring process 154 also arranges the actual scores in a sparse matrix based upon observation identifiers, and passes them to k-dimensional assignment problem solving process 300.

The assignment solving process 300 is described below. Its output is simply the list of assignments which constitute the most likely solution of the problem described by Equation (0.4). Note that both gate formulation and output processes 156 and 162 use (at different times) the list of assignments to generate the updated track history $T_i$ to eliminate or prune alternative previous hypotheses that are prohibited by the actual assignments in the list, and, subsequently, to output any required data. Also note that when one of the gate formulation and output processes 156 and 162 accomplish these tasks, the process will subsequently generate and forward the new set of gates for each remaining hypothesis and the processes will then be prepared to receive the next set of observations. In one embodiment, the loop described here will generate zones for a delayed set of observations rather than the subsequent set. This permits processes 156 and 162 to operate on even observation sets while the scoring step 154 and k-dimensional solving process operate on odd sets of observations, or vice versa.

The assignment solving process 300 permits the present invention to operate with a window size of dimension k−1 for some k≧3. The upper limit on k depends only upon the computational power of the computer 106 and the response time constraints of system 100. The k−1 observation sets within the processing window plus the prior track history result in a k-dimensional Assignment Problem as described by Problem Formulation (0.4). The present invention solves this generalized problem including the processes required to consider false positives and negatives, and also the processes required to consider sparse matrix problem formulations.

I. A First Embodiment of the k-Dimensional Assignment Solver 300

Figure 4:
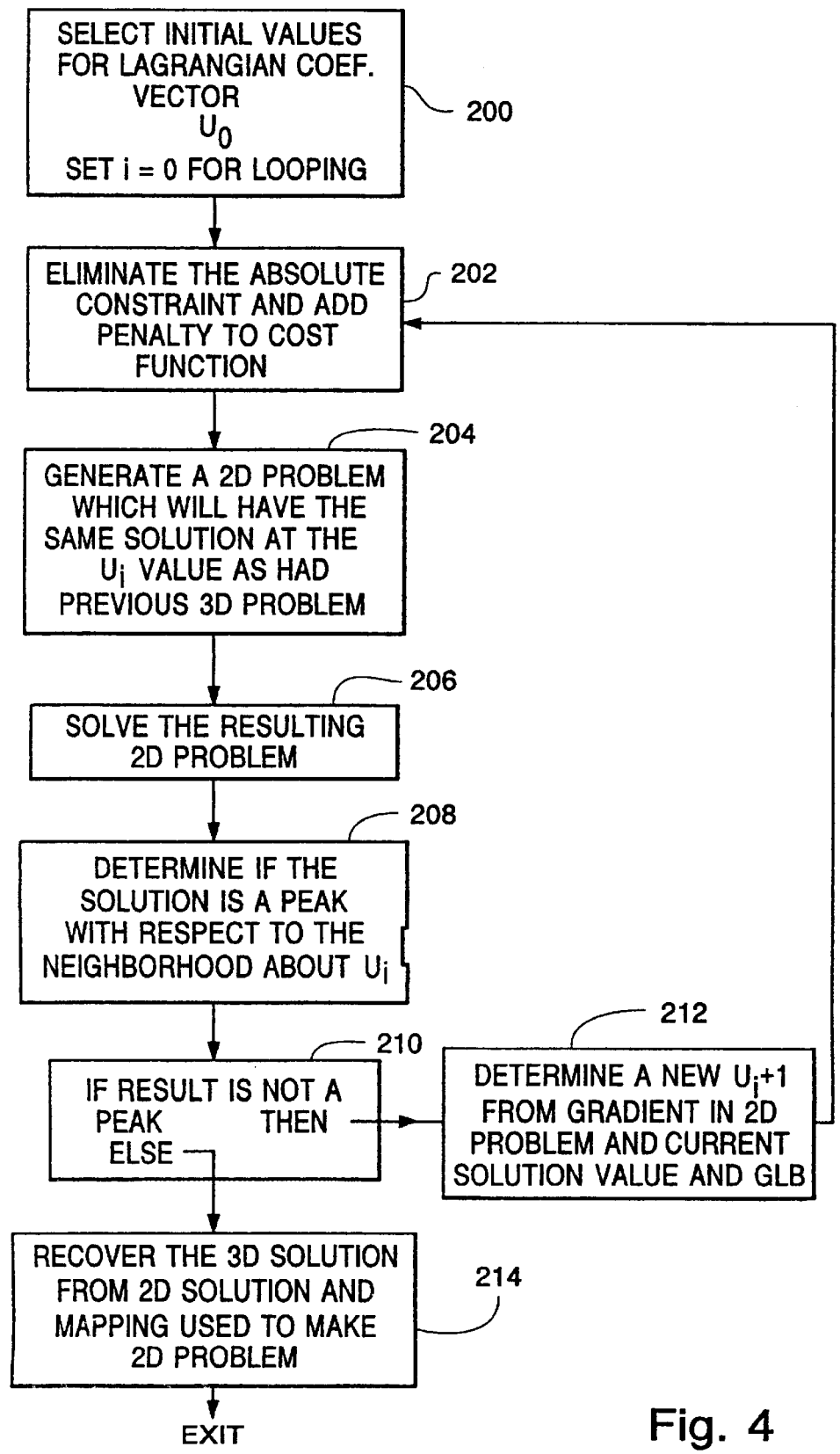
FIG. 4 is a flow chart of a process according to the prior art for solving a three-dimensional assignment problem.

In describing a first embodiment of the k-dimensional assignment solver 300, it is worthwhile to also discuss the process of FIG. 4 which is used by the solver 300. FIG. 4 illustrates use of the Frieze and Yadagar process as shown in prior art for transforming a three-dimensional assignment problem into a two-dimensional assignment problem and then use a hill climbing algorithm to solve the three-dimensional assignment problem. The solver 300 uses a Lagrangian Relaxation technique (well known in the art) to reduce the dimension of an original k-dimensional assignment problem (k>3) down to a three-dimensional problem and then use the process of FIG. 4 to solve the three-dimensional problem. Further note that the Lagrangian Relaxation technique is also utilized by the process of FIG. 4 and that in using this technique the requirement that each point is assigned to one and only one track is relaxed. Instead, an additional cost, which is equal to a respective Lagrangian Coefficient u, is added to the cost or objective function (0.1)(a) whenever a point is assigned to more than one track. This additional cost can be picked to weight the significance of each constraint violation differently, so this additional cost is represented as a vector of coefficients u which are correlated with respective observation points. Hill climbing will then develop a sequence of Lagrangian Coefficients sets designated $(u_0, \ldots, u_j, u_{j+1}, \ldots, u_p)$. That correspond to an optimum solution of the two-dimensional assignment problem. The assignments at this optimum solution are then used to "recover" the assignment solution of the three-dimensional assignment problem.

In step 200 of FIG. 4, initial values are selected for the $u_0$ coefficients. Because the Lagrangian Relaxation process is iterative, the initial values are not critical and are all initially selected as zero. In step 202, these additional costs are applied to the objective function (0.1)(a). With the addition of the costs u, the goal is still to assign the points which minimize the total cost. This transforms Equation (0.1)(a), written for k=3 and altered to exclude mechanisms related to false positives and negatives, into objective function (1.1) (a). In the first iteration it is not necessary to consider the u matrix because all u values are set to zero. To relax the requirement that each point be assigned to one and only one track, the constraint Equation (0.1)(d) is deleted, thereby permitting points from the last image to be assigned to more than one track. Note that while any axis can be chosen for relaxation, observation constraints are preferably relaxed. The effect of this relaxation is to create a new problem which must have the same solution in the first two axes but which can have a differ solution in the third axis. The result is constraints (1.1)(b–d).

(a) Minimize $\sum_{i_1=0}^{N_1} \sum_{i_2=0}^{N_2} \{(c_{i_1 i_2 i_3} - u_{i_3})\} z_{i_1 i_2 i_3}$ (1.1)

(b) Subject to: $\sum_{i_2=1}^{N_2} \sum_{i_3=1}^{N_3} z_{i_1 i_2 i_3} = 1, i_1 = 1, \ldots, N_1,$ (c) $\sum_{i_1=1}^{N_1} \sum_{i_3=1}^{N_3} z_{i_1 i_2 i_3} \leq 1, i_2 = 1, \ldots, N_2,$ (d) $z_{i_1 i_2 i_3} \in \{0, 1\} \; \forall \; z_{i_1 i_2 i_3}.$ Step 204 then generates from the three-dimensional problem described by Problem Formulation (0.1) a new two-dimensional problem formulation which will have the same solution for the first two indices. As Problem Formulation (1.1) has no constraints on the $3^{rd}$ axis, any value within a particular $3^{rd}$ axis can be used in a solution, but using anything other than the minimum value from any $3^{rd}$ axis has the effect of increasing solution cost. Conceptually, the effect of step 204 is to change the three-dimensional arrays in Problem Formulation (1.1) into two-dimensional arrays as shown in Problem Formulation (1.2) and to generate the new two-dimensional matrix $m_{i_1 i_2}$ defined as shown in Equation (1.3).

(a) Minimize $\sum_{i_1=0}^{N_1} \sum_{i_2=0}^{N_2} \left\{ \begin{array}{l} \text{Min:} \\ \forall \; i_3 \end{array} (c_{i_1 i_2 i_3} - u_{i_3}) \right\} z_{i_1 i_2}$ (1.2)

(b) Subject to: $\sum_{i_2=1}^{N_2} \sum_{i_3=1}^{N_3} z_{i_2 i_3} = 1, i_1 = 1, \ldots, N_1,$ (c) $\sum_{i_1=1}^{N_1} \sum_{i_3=1}^{N_3} z_{i_1 i_3} \leq 1, i_2 = 1, \ldots, N_2,$ (d) $z_{i_1 i_2} \in \{0, 1\} \; \forall \; z_{i_1 i_2},$ $m_{i_1 i_2} = \text{Minimum}\{c_{i_1 i_2} - u_{j_i} | i = 1, \ldots, N_k\}.$ (1.3)

The cost or objective function for the reduced problem as defined by (1.2)(a), if evaluated at all possible values of u is a surface over the domain of u. This surface is referred to as $\Phi(u)$ and is non-smooth but provable convex (i.e., it has a single peak and several other critical characteristics which form terraces). Due to the convex characteristics of $\Phi(u)$, the results from solving Problem Formulation (1.2) at any particular $u_j$ can be used to generate a new set of coefficients $u_{j+1}$ whose corresponding cost value is closer to the peak of $\Phi(u)$. The particular set of Lagrangian Coefficients that will generate the two-dimensional problem resulting in the maximum cost is designated $u_p$. To recover the solution to the three-dimensional assignment problem requires solving the Equation (1.2) problem corresponding to $u_p$.

In step 206, the two-dimensional problem is solved directly using a technique known to those skilled in the art such as Reverse Auction for the corresponding cost and solution values. This is the evaluation of one point on the surface or for the first iteration $\Phi(u_0)$.

Thus, after this first iteration, the points have been assigned based on all "u" values being arbitrarily set to zero. Because the "u" values have been arbitrarily assigned, it is unlikely that these assignments are correct and it is likely that further iterations are required to properly assign the points. Step 208 determines whether the points have been properly assigned after the first iteration by determining if for this set of assignments whether a different set of "u" values could result in a higher total cost. Thus, step 208 is implemented by determining the gradient of objective function (1.2)(a) with respect to $u_j$. If the gradient is substantially non-zero (greater than a predetermined limit) then the assignments are not at or near enough to the peak of the surface $\Phi(u)$(decision 210), and the new set of Lagrangian Coefficients $u_{j+1}$ is determined.

Hill climbing Step 212 determines the $u_{j+1}$ values based upon the $u_j$ values, the direction resulting from protecting the previous gradient into the $U^3$ domain, and a step size. The solution value of the two-dimensional problem is the set of coefficients that minimize the two-dimensional problem and the actual cost at the minimum. Those coefficients augmented by the coefficients stored in $m_{i_1 i_2}$ permit the evaluation (but not the minimization) of the cost term in Problem Formulation (1.1). These two cost terms are lower and upper bounds on the actual minimized cost of the three-dimensional problem, and the difference between them in combination with the gradient is used to compute the step size.

With this new set of u values, steps 202–210 are repeated as a second iteration. Steps 212 and 202–210 are repeated until the gradient as a function of u determined in step 208 is less than the predetermined limit. This indicates that the $u_p$ values which locate the peak area of the $\Phi(u)$ surface are determined and that the corresponding Problem Formulation (1.2) has been solved. Step 214 will attempt to use the assignments that resulted from this particular two-dimensional assignment problem to recover the solution of the three-dimensional assignment problem as described below. If the limit was chosen properly so that the u values are close enough to the peak, this recovery will yield the proper set of assignments that rigidly satisfies the constraint that each point be assigned to one and only one track. However, if the u values are not close enough to the peak, then the limit value for decision 210 is reduced and the repetition of steps 212 and 202–210 is continued.

Step 214 recovers the three-dimensional assignment solution by using the assignment values determined on the last iteration through step 208. Consider the two-dimensional z assignment matrix to have 1's in the locations specified by the list $L_1 = (a_i, b_i)_{i=1}^N$. If the three-dimensional z matrix is specified by placing 1's at the location indicated by the list $L_2=(a_i, b_i, m_{a_ib_i})_{i=1}^N$ then the result is a solution of Problem Formulation (1.1). Let $L_3=(m_{a_ib_i})_{i=1}^N$ be the list formed by the third index. If each member of $L_3$ is unique then the $L_2$ solution satisfies the third constraint so it is a solution to Problem Formulation (0.1). When this is not the case, recovery determines the minimal substitutions required within list $L_3$ so that it plus $L_1$ will be a feasible solution, i.e., a solution which satisfies the constraints of a problem formulation, but which may not optimize the objective function of the problem formulation. This stage of the recovery process is formulated as a two-dimensional assignment problem as follows. Form a new cost matrix $[c_{i,j}]_{i,j=1}^N$ where $c_{i,j}=c_{a_ib_ij}$ for $j=1 \ldots N_i$ and the $N_i$ term is the total number of cost elements in the selected row of the three-dimensional cost matrix. Attempt to solve this two-dimensional problem for the minimum using two constraints sets. If a feasible solution is found then the result will have the same form as list $L_1$. Replace the first set of indices by the indicated $(a_i, b_i)$ pairs taken from list $L_1$ and the result will be a feasible solution of Problem Formulation (0.4). If no feasible solution to the new two-dimensional problem exists then further effort to locate the peak of $\Phi(u)$ is required.

I.1. Generalization to a Multi-Dimensional Assignment Solving Process

Let M be a fixed integer and assume that M is the dimension of the initial assignment problem to be solved. Thus, initially, the result of the scoring step 154 is a M-dimensional Cost Matrix which is structured as a sparse matrix (i.e., only a small percentage of the entries in the cost and assignment matrices are filled or non-zero). Individual cost elements represent the likelihood that a track $T_i$ as extended by the set of observations $\{O_{ij}|i=1, \ldots, M-1\}$, is not valid. Because the matrix is sparse the list of cost elements is stored as a packed list, and then for each dimension of the matrix, a vector of a variable length list of pointers to the cost elements is generated and stored. This organization means that for a particular observation $o_{ij}$ for the $j^{th}$ list in the $i^{th}$ vector will be a list of pointers to all hypotheses in which $O_{ij}$ participates. This structure is further explained in the following section dealing with problem partitioning.

The objective of the assignment solving process is to select from the set of all possible combinations of track extensions a subset that satisfies two criteria. First, each point in the subset of combinations should be assigned to one and only one track and therefore, included in one and only one combination of the subset, and second, the total of the scoring sums for the combinations of the subset should be minimized. This yields the following M-dimensional equations where k=M:

(a) Minimize $v_k(z^k) = \sum_{i_1=0}^{N_1} \cdots \sum_{i_k=0}^{N_k} c_{i_1 \ldots i_k}^k z_{i_1 \ldots i_k}^k$ (1.4)

(b) Subject to: $\sum_{i_2=0}^{N_2} \cdots \sum_{i_k=0}^{N_k} z_{i_1 \ldots i_k}^k = 1,$ (c) $\sum_{i_1=0}^{N_1} \cdots \sum_{i_{j-1}=0}^{N_{j-1}} \sum_{i_{j+1}=0}^{N_{j+1}} \cdots \sum_{i_k=0}^{N_k} z_{i_1 \ldots i_k}^k = 1,$ for $i_j = 1, \ldots, N_j$ and $j = 2, \ldots, k-1$, (d) $\sum_{i_1=0}^{N_1} \cdots \sum_{i_{k-1}=0}^{N_{k-1}} z_{i_1 \ldots i_k}^k = 1, i_k = 1, \ldots, N_k,$ (e) $z_{i_1 \ldots i_k}^k \in \{0, 1\}$ for all $i_1, \ldots, i_k$, and where $c^k$ is the cost matrix $[c_{i_1 \ldots i_k}^k]$ which is a function of the distance between the observed point $z^k$ and the smoothed track determined by the filtering step, and $v_k$ is the cost function. This set of equations is similar to the set presented in Problem Formulation (0.4) except that it includes the subscript and superscript k notation. Thus, in solving the M-dimensional Assignment Problem the invention reduces this problem to an (M−1)-dimensional Assignment Problem and then to an (N−2)-dimensional Assignment Problem, etc. Further, the symbol $k\in\{3, \ldots, M\}$ customizes Problem Formulation (1.4) to a particular relaxation level. That is, the notation is used to reference data from levels relatively removed as in $c^{k+l}$ are the cost coefficients which existed prior to this level of relaxed coefficients $c_k$. Note that actual observations are numbered from 1 to $N_i$, where $N_i$ is the number of observations in observation set i. Further note that the added O observation in each set of observations is the unconstrained "gap filler." This element serves as a filler in substituting for missed detects, and a sequence of these elements including only one true observation represents the possibility that the observation is a false positive. Also note that by being unconstrained a gap filler may be used in as many hypotheses as required.

While direct solution to (1.4) would give the precise assignment, the solution of k-dimensional equations directly for large k is too complex and time consuming for practice. Thus, the present invention solves this problem indirectly.

The following is a short description of many aspects of the present invention and includes some steps according to the prior art. The first step in solving the problem indirectly is to reduce the complexity of the problem by the previously known and discussed Lagrangian Relaxation technique. According to the Lagrangian Relaxation technique, the absolute requirement that each point is assigned to one and only one track is relaxed such that for some one image, points can be assigned to more than one track. However, a penalty based on a respective Lagrangian Coefficient $u^k$ is added to the cost function when a point in the image is assigned to more than one track. The Lagrangian Relaxation technique reduces the complexity or "dimension" of the formulation of the assignment problem because constraints on one observation set are relaxed. Thus, the Lagrangian Relaxation is performed iteratively to repeatedly reduce the dimension until a two-dimensional penalized cost function problem results as in Problem Formulation (1.1). This two-dimensional problem is solved then directly by a previously known technique such as Reverse Auction. The penalized cost function for the two-dimensional problem defines a valley or convex shaped surface which is a function of various sets of $\{u^k|k=3, \ldots, M\}$ penalty values and one set of assignments for the points in two dimensions. That is, for each particular $u^3$ there is a corresponding two-dimensional penalized cost function problem and its solution. Note that the solution of the two-dimensional penalized cost function problem identifies the set of assignments for the particular $u^3$ values that minimize the penalized cost function. However, these assignments are not likely to be optimum for any higher dimensional problem because they were based on an initial arbitrary set of $u_k$ values. Therefore, the next step is to determine the optimum assignments for the related three-dimensional penalized cost function problem. There exists a two-dimensional hill shaped function $\Phi$ which is a graph of the minimums of all penalized cost functions at various sets of assignments in two dimensions. For the three-dimensional problem, the function $\Phi$ can be defined based on the solution to the foregoing two-dimensional penalized cost function. By using the current $u^3$ values and the $\{u^k|k>3\}$ values originally assigned, the gradient of the hill-shaped function $\Phi$ is determined, which points toward the peak of the hill. By using the gradient and $u^3$ values previously selected for the one point on the hill (corresponding to the minimum of the penalized cost function $\Phi$) as a starting point, the $u^3$ values can be found for which the corresponding problem will result in the peak of the function $\Phi$. The solution of the corresponding two-dimensional problem is the proper values for two of the three sets of indices in the three-dimensional problem. These solution indices can select a subsection of the cost array which maps to a two-dimensional array. The set of indices which minimize the two-dimensional assignment problem based on that array corresponds to the proper assignment of points in the third dimension. The foregoing "recovery" process was known in the prior art, but it is modified here to adjust for the sparse matrix characteristic. The next task is to recover the solution of the proper $u^4$ values for the four-dimensional problem. The foregoing hill climbing process will not work again because the foregoing hill climbing process when required to locate the four-dimensional $u^4$ values for the peak of $\Phi^3$ requires the exact definition of the function $\Phi^3$ (as was available in the case of $\Phi^2$) or an always less than approximation of $\Phi^3$, whereas the iteration can result in a greater than approximation of $\Phi^3$. According to the present invention, another three-dimensional function $\Psi$ is defined which is a "less than approximation" the three-dimensional function $\Phi$ and which can be defined based on the solution to the two-dimensional penalized cost function and the previously assigned and determined $u^k$ values. Next, the gradient of the function $\Psi$ is found and hill climbing technique used to determine the $u^4$ values at the peak. Each selected $u^4$ set results in a new three-dimensional problem and requires the two-dimensional hill climbing based upon new two-dimensional problems. At the peak of the three-dimensional function $\Psi$, the solution values are a subset of the values required for the four-dimensional solution. Recovery processing extends the subset to a complete solution. This process is repeated iteratively until the $u^k$ values that result in a corresponding solution at the peak of the highest order functions $\Psi$ and $\Phi$ are found. The final recovery process then results in the solution of k-dimensional problem.

Figure 5:
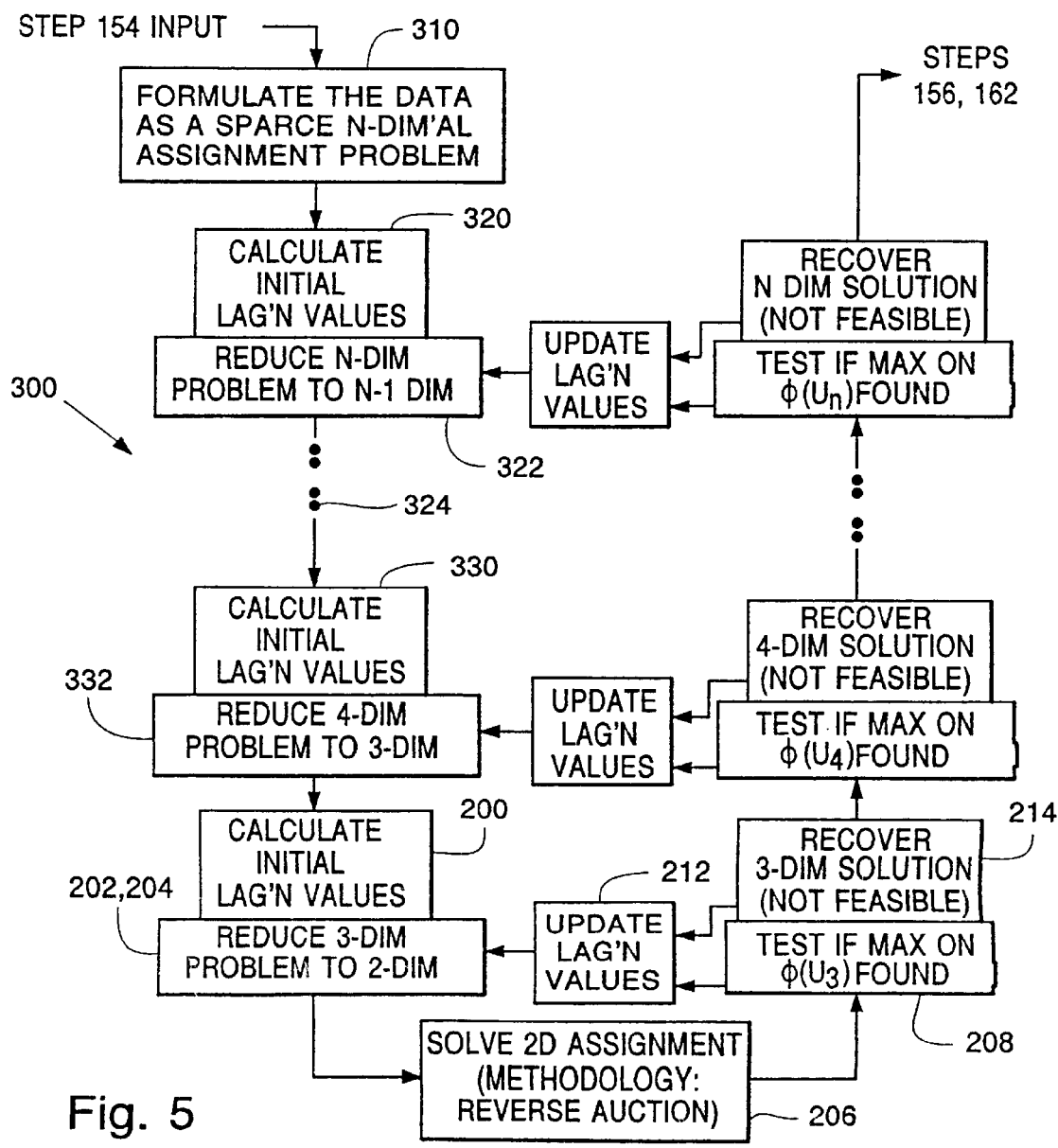
FIG. 5 is a flow chart of a process according to the present invention for solving a k-dimensional assignment problem where "k" is greater than or equal to 3.

FIG. 5 illustrates process 300 in more detail.

I.2. Problem Formulation

In problem formulation step 310, all data structures for the subsequent steps are allocated and linked by pointers as required for execution efficiency. The incoming problem is partitioned as described in the subsequent section. This partitioning has the effect of dividing the incoming problem into a set of independent problems and thus reducing the total workload. The partitioning process depends only on the actual cost matrix so the partitioning can and is performed for all levels of the relaxation process.

I.2.1. Relaxation and Recovery

Step 320 begins the Lagrangian Relaxation process for reducing the M-dimensional problem by selecting all Lagrangian Coefficient $u^M$ penalty values initially equal to zero. The Lagrangian Coefficients associated with the $M^{th}$ constraint set are an $(N_M+1)$-element vector. The reduction of this M-dimensional problem in step 322 to a (M−1)-dimensional problem uses the two step process described above. First, a penalty based on the value of the respective $u^M$ coefficient is added to the cost function when a point is assigned to more than one track and then the resultant cost function is minimized. However, during the first iteration, the penalty is zero because all $u^M$ values are initially set to zero. Second, the requirement that no point from any image can be assigned to more than one track is relaxed for one of the images. In the extreme this would allow a point from the relaxed image to be associate with every track. However, the effect of the previous penalty would probably mean that such an association would not minimize the cost. The effect of the two steps in combination is to remove a hard constraint while adding the penalty to the cost function so that it operates like a soft constraint. For step 322 this two-step process results in the following penalized cost function problem with k=M:

(a) $\Phi_k(u^k) \equiv$ Minimize: $\phi_k(u^k, z^k)$ (1.5)

$$= \sum_{i_1=0}^{N_1} \cdots \sum_{i_k=0}^{N_k} c^k_{i_1\ldots i_k} z^k_{i_1\ldots i_k} -$$

$$\sum_{i_k=0}^{N_k} u^k_{i_k} \left[ \sum_{i_1=0}^{N_1} \cdots \sum_{i_{k-1}}^{N_{k-1}} z^k_{i_1\ldots i_k} - 1 \right]$$

$$= \sum_{i_1=0}^{N_1} \cdots \sum_{i_k=0}^{N_k} (c^k_{i_1\ldots i_k} - u^k_{i_k}) z^k_{i_1\ldots i_k} + \sum_{i_k=0}^{N_k} u^k_{i_k}$$

(b) Subject to: $\sum_{i_2=0}^{N_2} \cdots \sum_{i_k=0}^{N_k} z^k_{i_1\ldots i_k} = 1, i_1 = 1, \ldots N_1,$ (c) $\sum_{i_1=0}^{N_1} \cdots \sum_{i_{j-1}=0}^{N_{j-1}} \sum_{i_{j+1}=0}^{N_{j+1}} \cdots \sum_{i_k=0}^{N_k} z^k_{i_1\ldots i_k} = 1$ for $i_j = 1, \ldots N_j$ and $j = 2, \ldots k-1,$ (d) $z^k_{i_1\ldots i_k} \in \{0, 1\}$ for all $i_1 \ldots l_k$.

Because the constraint on single assignment of elements from the last image has been eliminated, an (M−1)-dimensional problem can be developed by eliminating some of the possible assignments. As shown in Equations (1.6), this is done by selecting the smallest cost element from each of the $M^{th}$ axis vectors of the cost matrix. Reduction in this manner yields a new, lower-order penalized cost function defined by Equations (1.6) which has the same minimum cost as does the objective function defined by (1.5)(a) above.

The cost vectors are selected as follows. Define a new cost array $c_{i_1\ldots i_{k-1}}^{k-1}$ by:

$$c_{i_1\ldots i_k}^k = \text{Minimum}\{c_{i_1\ldots i_k}^k - u_{i_k}^k \mid i_k = 0, 1, \ldots, N_k\}, \quad (1.6)$$

$$\text{for } (i_1, \ldots, i_{k-1}) \neq (0, \ldots, 0),$$

$$c_{0\ldots 0}^{k-1} = \sum_{i_k=0}^{N_k} \min\{0, c_{0\ldots 0}^k - u_{i_k}^k\}.$$

The resulting (M−1)-dimensional problem is (where k=M):

$$\Phi_k(u^k) = \text{Minimize:} \quad v_{k-1}(z^{k-1}) \quad (1.7)$$

$$= \sum_{i_1=0}^{N_1} \cdots \sum_{i_{k-1}=0}^{N_{k-1}} c_{i_1\ldots i_{k-1}}^{k-1} z_{i_1\ldots i_{k-1}}^{k-1}$$

Subject to: $\sum_{i_2=0}^{N_2} \cdots \sum_{i_k=0}^{N_k} z_{i_1\ldots i_k}^{k-1} = 1, i_1 = 1, \ldots N_1,$ $$\sum_{i_1=0}^{N_1} \cdots \sum_{i_{j-1}=0}^{N_{j-1}} \sum_{i_{j+1}=0}^{N_{j+1}} \cdots \sum_{i_k=0}^{N_k} z_{i_1\ldots i_k}^{k-1} = 1,$$

for $i_j = 1, \ldots N_j$ and $j = 2, \ldots k-1$, $$\sum_{i_1=0}^{N_1} \cdots \sum_{i_{k-2}=0}^{N_{k-2}} z_{i_1\ldots i_{k-1}}^{k-1} = 1, i_{k-1} = 1, \ldots N_{k-1},$$

$$z_{i_1\ldots i_k}^k \in \{0, 1\} \text{ for all } i_1 \ldots i_{k-1}.$$

Assignment Problem (1.4) and Problem Formulation (1.7) differ only in the dimension M vs. M−1, respectively. An optimal solution to (1.7) is also an optimal solution to equation (1.5). This relationship is the basis for an iterative sequence of reductions indicated by steps 320–332 through 330–332 and 200–204 in which the penalized cost function problem is reduced to a two-dimensional problem. As these formula will be used to describe the processing at all levels, the lowercase k is used where specific reference to the top level is needed. In step 206, the two-dimensional penalized cost function is solved directly by the prior art Reverse Auction technique. Each execution of 206 produces two results, the set of $z^2$ values that minimize the problem and the cost that results $v^2$ when these z values are substituted into the objective function (1.7)(a).

In step 208, according to the prior art, solution $z^2$ values are substituted into the two-dimensional derivative of the surface $\Phi_2$. The result indicates how the value of $u^3$ should be adjusted so as to perform the hill climbing function. As was previously described the objective is to produce a sequence of $u_i^3$ values which ends when the $u_p^3$ value is in the domain of the peak of the surface $\Phi$. The section "Determining Effective Gradient" describes how new values are computed and how it is determined that the current $u_i^k$ points to the peak of $\Phi_2$. When no further adjustment is required the flow moves to step 214 which will attempt to recover the three-dimensional solution as previously described. When further adjustment is required then the flow progresses to step 212 and the new values of $u^k$ are computed. At the two-dimensional level the method of the prior art could be used for the hill climbing procedure. However, it is not practical to use this prior art hill climbing technique to determine the updated Lagrangian Coefficients $u^k$ or the Max on the next (or any) higher order surface $\Phi$ because the next (or any) higher dimensional function $\Phi$ cannot be defined based on known information.

Figure 6:
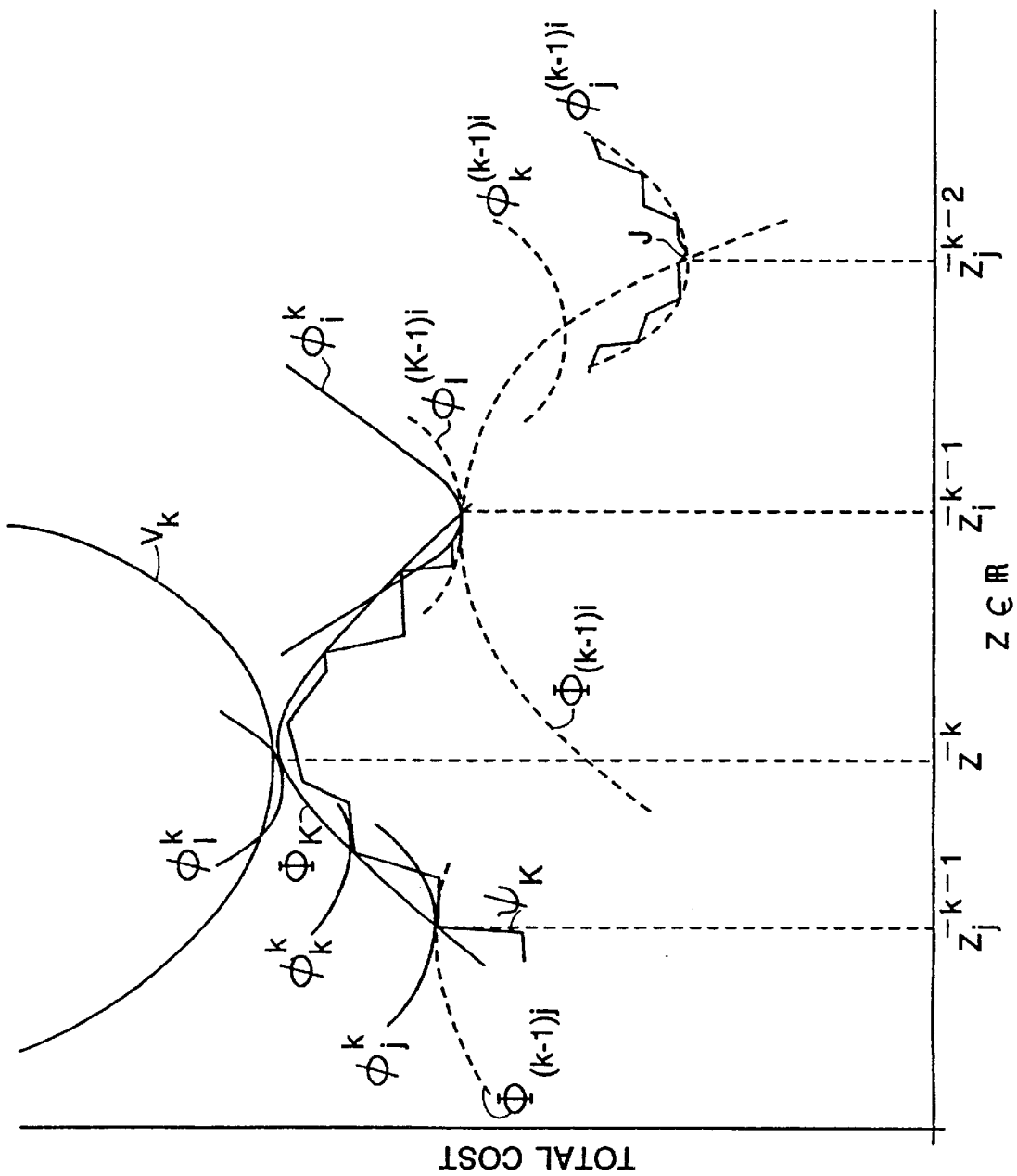
FIG. 6 is a graph of various functions used to explain the present invention.

Instead, the present invention defines a new function based on known information which is useful for hill climbing from the third to the fourth and above dimensions, i.e., $u^k$ values which result in z values that are closer to the proper z values for the highest k-dimension. This hill climbing process (which is different than that used in the prior art of FIG. 4 for recovering only the three-dimensional solution) is used iteratively at all lower dimensions k of the M-dimensional problem (including the three-dimensional level where it replaces prior art) even when k is much larger than three. FIG. 6 helps to explain this new hill climbing technique and illustrates the original k-dimensional cost function $v_k$ of Problem Formulation (1.4). However, the actual k-dimensional cost surface $v_{km}$ defined by (1.4)(a) comprises scalar values at each point described by k-dimensional vectors and as such can not be drawn. Nevertheless, for illustration purposes only, FIG. 6 ignores the reality of ordering vectors and illustrates a concave function $v_k(z^k)$ to represent Equation (1.4). The surface $v_k$ is illustrated as being smooth to simplify the explanation although actually it can be imagined to be terraced. The goal of the assignment problem is to find the values of $\bar{z}^k$; these values minimize the k-dimensional cost function $v_k$.

For purposes of explanation, assume that in FIG. 6, k=4 (the procedure is used for all k≧3). This problem is reduced by two iterations of Lagrangian Relaxation to a two-dimensional penalized cost function $\phi_j^{(k-1)i}$. This cost function, and all other cost functions described below, are also non-smooth and continuous but are illustrated in FIG. 6 as smooth for explanation purposes. Solving the $\phi_j^{(k-1)i}$ problem results in one set of $z^2$ assignments and the value of $\Phi_{(k-1)_i}$ at the point $u_{ij}^2$. A series of functions $\phi_j^{(k-1)i}, \ldots, \phi_1^{(k-1)i}$ each generated from a different $u^3$ are shown. The particular series illustrates the process of locating the peak of $\Phi_{(k-1)_i}$. The two-dimensional penalized cost functions $\phi_j^{(k-1)i}, \ldots, \phi_1^{(k-1)i}$ can be solved directly. Each such solution provides the information required to calculate the next $u^3$ value. Each iteration of the hill climbing improves the selection of $u^3$ values, i.e., yields $\phi^2$ problem whose solution is closer to those at the solution of the $\phi^3$ problem. The result of solving $\phi_1^{(k-1)i}$ is values that are on both $\Phi_{(k-1)_i}$ and $\Phi_k$. FIG. 6 illustrates the surface $\Phi_k$ which comprises the minimums of all k-dimensional penalized cost function surfaces $\phi_k$, i.e., if the Problem Formulations (1.5) and (1.7) were solved at all possible values of $u^k$ the function $\Phi_k(u_k)$ would result. The surface $\Phi_k$ is always less than the surface $v_k$ except at the peak as described in Equation (1.8) and its maximum occurs where the surface $v_k$ is minimum. Because the surface $\Phi_k$ represents the minimum of the surface $\phi_k$, any point on the surface $\Phi_k$ can mapped to the surface $v_k$. The function $\Phi_k$ provides a lower bound on the minimization problem described by (1.4)(a). Let $\bar{z}^k$ be the unknown solution to Problem Formulation (1.4) and note that:

$$\Phi^k(u^k) \leq v_k(\bar{z}^k) \leq v_{k-1}(z^k). \quad (1.8)$$

Consequently, the values $z^k$ at the peak of $\Phi_k$ (i.e., the greatest lower bound on the cost of the relaxed problem), can be substituted into the k-dimensional penalized cost function to determine the proper assignments. Consequently, the present invention attempts to find the maximum on the surface $\Phi_k$. However, it is not possible to use the prior art hill climbing to hill climb to the peak of $\Phi_k$ because the definition of $\Phi_k$ requires exact knowledge of lower order functions $\Phi$. As the solution of $\phi_i^k$ is not the exact solution, in that higher order values of u are not yet optimized, its value can be larger than the true peak of $\Phi_k$. As such it is not a lower bound on $v_k$ and it can not be used to recover the required solution.

Instead, the present invention defines all auxiliary functions $\Psi_k$ which are based only on the solution to the two-dimensional penalized cost function problem, lower order values $z^k$ and values $u^k$ determined previously by the reduction process. The function $\Psi_k$ is a less than approximation of $\Phi_k$, and its gradient is used for hill climbing to its peak. The values $z^k$ at the peak of the function $\Psi_k$ are then substituted into Problem Formulation (1.5) to determine the proper assignments. To define the function $\Psi_k$, the present invention explicitly makes the function $\Phi_k(u^k)$ a function of all higher order sets of Lagrangian Coefficients with the expanded notation: $\Phi_k(u^k;u^{k+1},\ldots,u^K)$. Then, a new set of functions $\Psi$, is defined recursively, using the $\Phi_k$'s domain:

$$\psi_3(u^3) = v_2 + \sum_{i_3=0}^{N_3} u_{i_3}^3 = \Phi_3(u^3; u^4, \ldots, u^K), \quad (1.9)$$

where $v_2$ is the solution value for the most recent two-dimensional penalized cost function problem. For $k>3$ $$\psi_k(u^3,\ldots,u^{k-1};u^k) = \quad (1.10)$$

$$\begin{cases} \Phi_k(u^k;u^{k+1},\ldots,u^K), & \text{if known,} \\ \psi_{k-1}(u^3,\ldots,u^{k-2};u^{k-1}) + \sum_{i_k=0}^{N_k} u_{i_k}^k, & \text{otherwise.} \end{cases}$$

From the definitions of $\Phi_k$ and $v_k$ (Problem Formulation (1.7) compared with Problem Formulation (1.5)):

$$\Phi_k(u^k; u^{k+1},\ldots,u^M) = v_{k-1}(z^{k-1}) + \sum_{i_k=0}^{N_k} u_{i_k}^k,$$

it follows that:

$$\psi_3(u^3) = v_2 + \sum_{i_3=0}^{N_3} u_{i_3}^3 = \Phi_3(u^3; u^4,\ldots,u^M) \leq v_3^3(z^3)$$

and with that Equation (1.8) is extended to:

$$\Psi_k(u^3,\ldots,u^{k-1};u^k) \leq \Phi_k(u^k;u^{k+1},\ldots,u^M) \leq v_k(\bar{u}^k) \leq v_k(u^k) \quad (1.11)$$

This relationship means that either $\Phi_k$ or $\Psi_k$ may be used in hill climbing to update the Lagrangian Coefficients u. $\Phi_k$ is the preferred choice, however it is only available when the solution to Problem Formulation (1.5) is a feasible solution to Problem Formulation (1.4) (as in hill climbing from the second to third dimension which is why prior art worked). For simplicity in implementation, the function $\Psi_k$ is defined so that it equals $\Phi_k$ when either function could be used. It is therefore always used, even for hill climbing from the second dimension. The use of the function $\Psi$ which is based on previously assigned or determined u values and not higher order u values which are not yet determined, is an important feature of the present invention.

I.2.2. Determining Effective Gradient

After the function $\Psi_k$ is defined, the next steps of hill climbing/peak detection are to determine the gradient of the function $\Psi_k$, determine an increasing portion of the gradient and then move up the surface $\Psi_k$ in the direction of this increasing portion of the gradient. As shown in FIG. 6, any upward step on the surface $\Psi_k$, for example, to the minimum of the $\phi^k_j$ will yield a new set of values $u^k$ (to the "left") that is closer to the ideal set of values $u^k$ which correspond to the minimum of the function $v_k$. While it is possible to iteratively step up this surface $\Psi_k$ with steps of fixed size and then determine if the peak has been reached, the present invention optimizes this process by determining the single step size from the starting point at the minimum of $\phi^k_j$ that will jump to the peak and then calculate the values $u^k$ at the peak. Once the values u at the peak of $\Psi_k$ are determined, then the values $u^k$ can be substituted into Problem Formulation (1.5) to determine the proper assignment. (However, in a more realistic example, where k is much greater than three, then the values $u^k$ at the peak of the function $\Psi$ along with the lower-order values $u^k$ and those assigned and yielded by the reduction steps are used to define the next higher level function $\Psi$. This definition of a higher order function $\Psi$ and hill climbing process are repeated iteratively until $\Psi_k$, the peak of $\Psi_k$, and the values $u^k$ at the peak of $\Psi_k$ are identified.) The following is a description of how to determine the gradient of each surface $\Psi$ and how to determine the single step size to jump to the peak from the starting point on each surface $\Psi$.

As noted above, each surface $\Psi$ is non-smooth. Therefore, if a gradient was taken at a single point, the gradient may not point toward the peak. Therefore, several gradients (a "bundle") are determined at several points on the surface $\Psi_k$ in the region of the starting point (i.e., minimum of $\phi_{k_j}$) and then averaged. Statistically, the averaged result should point toward the peak of the surface $\Psi_k$. Wolfe's Conjugate Subgradient Algorithm (P. Wolfe. A method of conjugate subgradients for minimizing non-differentiable functions. *Mathematical Programming Study*, 3:145–173, 1975; P. Wolfe. Finding the nearest point in a polytope. *Mathematical Programming Study*, 11;128–149, 1976) for minimization was previously known in another environment to determine a gradient of a non-smooth surface using multiple subgradients and can be used with modification in the present invention. The modification to Wolfe's algorithm uses the information generated for $\Psi_k(u^{k3},\ldots,u^{kk-2};u^{kk-1})$ as the basis for calculating the subgradients. The definition of a subgradient v of $\Psi_k(u^{k3},\ldots,u^{kk})$ is any member of the subdifferential set defined as:

$$\partial\Psi_k(u) = \{v \in R^{N_k+1} | (\Psi_k(u^{k3},\ldots,u^{kk-1};u') - \Psi_k(u^{k3},\ldots,u^k)) \geq v^T(u'-u^k) \forall u' \in R^{N_k+1}\},$$

where $v^T$ is the transpose of v.

Next, a subgradient vector is determined from this function. If $z^k$ is the solution of Problem Formulation (1.5), then differentiating $\Psi_k(u^3_1,\ldots,u^{k-1};u^k)$ with respect to $u_{ik}^k$ and evaluating the result with respect to the current selection matrix $z^k$ yields a subgradient vector:

$$g = \left(0, \left(1 - \sum_{i_1=0}^{N_1} \cdots \sum_{i_{k-1}=0}^{N_k} z_{i_1\ldots i_k}^k \, \middle| \, i_k = 1,\ldots,N_k\right)\right).$$

The iterative nature of the solution process at each dimension yields a set of such subgradients. Except for a situation described below, where the resultant averaged gradient does not point toward the peak, the most recent set of such subgradients are saved and used as the "bundle" for the peak finding process for this dimension. For example, at the level k there is a bundle of subgradients of the surface $\Psi_k$ near the minimum of the surface $\phi^k_j$ determined as a result of solving Problem Formulation (1.4) at all lower levels. This bundle can be averaged to approximate the gradient. Alternately, the previous bundle can be discarded so as to use the new value to initiate a new bundle. This choice provides a way to adjust the process to differing classes of problems, i.e., when data is being derived from two sensors and the relaxation proceeds from data derived from one sensor to the other then the prior relaxation data for the first sensor could be detrimental to performance on the second sensors data.

I.2.3. Step Size and Termination Criterion

After the average gradient of the surface $\Psi_k$ is determined, the next step is to determine a single step that will jump to the peak of the surface $\Psi_k$. The basic strategy is first to specify an arbitrary step size, and then calculate the value of $\Psi_k$ at this step size in the direction of the gradient. If the value of $\Psi_k$ is larger than the previous one, this probably means that the step has not yet reached the peak. Consequently, the step size is doubled and a new value of $\Psi_k$ is determined and compared to the previous one. This process is repeated until the new value of $\Psi_k$ is less than the previous one. At that time, the step has gone too far and crossed over the peak. Consequently, the last doubling is rolled-back and that step size is used for the iteration. If the initial estimated $\Psi_k$ is less than previous value then the step size is decreased by 50%. If this still results in a smaller value of $\Psi_k$, then the last step is rolled back and the previous step size is decreased by 25%. The following is a more detailed description of this process.

With a suitable bundle of subgradients determined as just described, Wolfe's algorithm can be used to determine the effective subgradient d and the upgraded value $u_{j+1}^k$. From the previous iteration, or from an initial condition, there exists a step length value t. The value, $$u_+ = u_j^k + td$$

is calculated as an estimate of $u_{j+1}^k$. To determine if the current step size is valid we evaluate $\Psi_k(u^3, \ldots, u^{k-2}; u_+)$. If the result represents an improvement then we double the step size. Otherwise we halve the step size. In either case a new $u_+$ is calculated. The doubling or halving continues until the step becomes too large to improve the result, or until it becomes small enough to not degrade the result. The resulting suitable step size is saved with d as part of the subgradient bundle. The last acceptable $u_+$ is assigned to $u_{j+1}^k$.

Three distinct criteria are used to determine when $u_j^k$ is close enough to $\bar{u}^k$:

1. The Wolfe's algorithm criterion of d=0 given that the test has been repeated with the bundle containing only the most recent subgradient.
2. The difference between the lower bound $\Phi_k(u^k)$ and the upper bound $v_k(z^k, u^k)$ being less than a preset relative threshold. (Six percent was found to be an effective threshold for radar tracking problems.)
3. An iteration count being exceeded.

The use of limits on the iteration are particularly effective for iterations at the level 3 through (n−1) as these iterations will be repeated so as to resolve higher order coefficient sets. With limited iterations the process is in general robust enough to improve the estimate of upper order Lagrangian Coefficients. By limiting the iteration counts then the total processing time for the algorithm becomes deterministic. That characteristic means the process can be effective for real time problems such as radar, where the results of the last scan of the environment must be processed prior to the next scan being received.

I.2.4. Solution Recovery

The following process determines if the $u^k$ values at what is believed to be the peak of the function $\Psi_k$ adequately approximate the $u^k$ values at the peak of the corresponding function $\Phi_k$. This is done by determining if the corresponding penalized cost function is minimized. Thus, the $u^k$ values at the peak of the function $\Psi_k$ are first substituted into Problem Formulation (1.5) to determine a set of z assignments for k−1 points. During the foregoing reduction process, Problem Formulation (1.7) yielded a tentative list of k selected z points that can be described by their indices as: $\{(i_1^j \ldots i_{k-1}^j)\}_{j=1}^{N_0}$, where $N_0$ is the number of cost elements selected into the solution. One possible solution of Problem Formulation (1.4) is the solution of Problem Formulation (1.5) which is described as $\{(i_1^j \ldots i_{k-1}^j m_{i_1}^k \ldots i_{k-1})\}_{j=1}^{N_0}$ with $m_{i_1}^k \ldots i_{k-1}$ as it 5 was defined in Problem Formulation (1.6). If this solution satisfies the $k^{th}$ constraint set, then it is the optimal solution.

However, if the solution for Problem Formulation (1.5) is not feasible (decision 355), then the following adjustment process determines if a solution exists which satisfies the $k^{th}$ constraint while retaining the assignments made in solving Problem Formulation (1.7). To do this, a two-dimensional cost matrix is defined based upon all observations from the $k^{th}$ set which could be used to extend the relaxed solution.

$$h_{jl} = c_{i_1, \ldots, i_{k-1}, l}^k \quad (1.12)$$

for $l = 0, \ldots, N_k$ and $j = 0, \ldots, N_0$.

If the resulting two-dimensional assignment problem, $$\text{Minimize} \sum_{j=0}^{N_0} \sum_{l=0}^{N_1} h_{jl} w_{jl} \quad (1.13)$$

Subject to:

$$\sum_{l=0}^{N_k} w_{jl} = 1 \quad j = 1, \ldots, N_0,$$

$$\sum_{l=0}^{N_k} w_{jl} = 1 \quad j = 1, \ldots, N_0,$$

$$w_{jl} \in \{0, 1\} \quad j = 0, \ldots, N_0, l = 0, \ldots, N_k$$

has a feasible solution, then the indices of that solution map to the solution of Problem Formulation (1.4) for the k-dimensional problem. The first index in each resultant solution entry is the pointer back to an element of the $\{(i_1^j \ldots i_{k-1}^j m_{i_1} \ldots i_{k-1})\}_{j=1}^{N_0}$ list. That element supplies the first k−1 indices of the solution. The second index of the solution to the recovery problem is the $k^{th}$ index of the solution. Together these indexes specify the values of $z^k$ that solve Problem Formulation (1.4) at the $k^{th}$ level.

If Problem Formulation (1.13) does not have a feasible solution, then the value of $u_i^k$ which was thought to represent $u_p^k$ is not representative of the actual peak and further iteration at the $k^{th}$ level is required. This decision represent the branch path from step 214 and equivalent steps.

I.3. Partitioning

A partitioning process is used to divide the cost matrix that results from the Scoring step 154 into as many independent problems as possible prior to beginning the relaxation solution. The partitioning process is included with the Problem Formulation Step 310. The result of partitioning is a set of problems to be solved, i.e., there will be $p_1$ problems that consist of a single hypothesis, $p_2$ problems that consist of two hypothesis, etc. Each such problem is a group in that one or more observations or tracks are shared between members of the group.

In partitioning to groups no consideration is given to the actual cost values. The analysis depends strictly on the basis of two or more cost elements sharing the same specific axis of the cost matrix. In a two-dimensional case two cost elements must be in the same group if they share a row or a column. If the two elements are in the same row, then each other cost element that is also in the same row, as well as any cost elements that are in columns occupied by members of the row must be included in the group. The process continues recursively. In literature it is referred to as "Constructing a Spanning Forest." The k-dimensional case is analogous to the two-dimensional case. The specific method we have incorporated is a depth first search, presented by Aho, Hopcraft, and Ullman (A. V. Aho, J. E. Hopcroft, and J. D. Ullman. *Design and Analysis of Computer Algorithms.* Addison-Wesley, MA, 1974).

The result of partitioning at level M is the set of problems described as $\{P_{ij}|i=1,\ldots,p_j \text{ and } j=1,\ldots,N\}$, where N is the total number of hypothesis. The problems labeled $\{P_{i1}|i=1,\ldots,p_1\}$ are the cases where there is only one choice for the next observation at each scan and that observation could be used for no other track, i.e., it is a single isolated track. The hypothesis must be included in the solution set and no further processing is required.

As hypothesis are constructed the first element is used to refer to the track ID. Any problem in the partitioned set which does not have shared costs in the first scan represent a case where a track could be extended in several ways but none of the ways share an observation with any other track. The required solution hypothesis for this case is the particular hypothesis with the maximum likelihood. For this case all likelihoods are determined as was described in Scoring and the maximum is selected.

In addition to partitioning at the level M, partitioning is applied to each subsequent level M-1 . . . ,2. For each problem that was not eliminated by the prior selection, partitioning is repeated, ignoring observations that are shared in the last set of observations. Partitioning recognizes that relaxation will eliminate the last constraint set and thus partitioning is feasible for the lower level problems that will result from relaxation. This process is repeated for all levels down to k=3. The full set of partitionings can be performed in the Problem Formulation Step 310, prior to initiating the actual relaxation steps. The actual two-dimensional solver used in step 206 includes an equivalent process so no advantage would be gained by partitioning at the k=2 level.

There are two possible solution methods for the remaining problems. "Branch and Bound" as was previously described, or the relaxation method that this invention describes. If any of the partitions have 5–10 possible tracks and less than 50 to 20 hypotheses, then the prior art "Branch and Bound" algorithm generally executes faster than does the relaxation due to its reduced level of startup overhead. The "Branch and Bound" algorithm is executed against all remaining M level problems that satisfy the size constraint. For the remainder the Relaxation algorithm is used. The scheduling done in Problem Formulation allows each Problem Formulation (1.5) cost matrix resulting from the first step of relaxation to be partitioned. The resulting partitions can be solved by any of the four methods: isolated track direct inclusion, isolated track tree evaluation, small group "Branch and Bound" or an additional stage of relaxation as has been fully described.

The partitioning after each level of Lagrangian Relaxation is effective because when a problem is relaxed, the constraint that requires each point to be assigned to only one track is eliminated (for one image at a time). Therefore, two tracks previously linked by contending for one point will be unlinked by the relaxation which permits the point to be assigned to both tracks. The fruitfulness of partitioning increases for lower and lower levels of relaxation.

The following is a more detailed description of the partitioning method. Its application at all but the level M depends upon the relaxation process described in this invention. The recursive partitioning is therefore a distinct part of this invention. The advantage of this method is greatly enhanced by the sparse cost matrix resulting from tracking problems. However the sparse nature of the problem requires special storage and search techniques.

A hypothesis is the combination of the cost element $c_n$, the selection variable $z_n$ and all observations that made up the potential track extension. It can be written as, $h_n = \{c_n, z_n, \{o_{n_k} = o_{k_i}|k=1,\ldots,M_f \in \{1\ldots,N_k\}\}\}$, i.e., cost, selection variable and observations in the hypothesis. Here $n \in \{1,\ldots N\}$, where N is the total number of hypotheses in the problem. While the cost and assignment matrices were previously referenced, these matrices are not effective storage mechanisms for tracking applications. Instead the list of all hypothesis and sets of lists for each dimension that reference the hypothesis set are stored. The hypothetical set in list form is:

$$\{i \; h_n\}_{n=1}^{n=N}.$$

For each dimension $k=1,\ldots,M$ there exists a set of lists, with each list element being a pointer to a particular hypothesis:

$$L_{k_i} = \{p_{k_j}|k_j = 1,\ldots,N_{k_i}\}_{i=1,k=1}^{i=N_{k_i},k=M},$$

where $N_{k_i}$ is a number of hypothesis containing the $i^{th}$ observation from scan k. This structure is a multiply linked list in that any observation is associated with a set of pointer to all hypothesis it participates in, and any hypothesis has a set of pointers to all observations that formed it. (These pointers can be implemented as true pointers or indices depending upon the particular programming language utilized.)

Given this description of the matrix storage technique then the partitioning technique is as follows: Mark the first list $L_{k_i}$ and follow out all pointers in that list to the indicated hypothesis $$h_{p_{k_i}} \text{ for } i = 1,\ldots,N_{k_i}.$$

Mark all located hypothesis, and for each follow pointers back the particular $L_k$ for $k=1,\ldots,M$. Those L's if not previously marked get marked and also followed out to hypothesis elements and back to L's. When all such L's or h's being located are marked, then an isolated sub-problem has been identified. All marked elements can be removed from the lists and stored as a unique problem to be solved. The partitioning problem then continues by again starting at the first residual set L. When none remain, the original problem is completely partitioned.

Isolated problems can result from one source track having multiple possible extensions or from a set of source tracks contending for some observations. Because one of the indices of k (in our implementation it is k=1) indicates the source track then it is possible to categorize the two problem types by observing if the isolated problem includes more than one L-list from the index level associated with tracks.

I.4. Subsequent Track Prediction

As noted above, after the points are assigned to the respective tracks, some action is taken such as controlling take-offs and landings to avoid collision, advising airborne aircraft to change course, warning airborne aircraft of an adjacent aircraft in a commercial environment, or aiming and firing an anti-aircraft (or anti-missile) missile, rocket or projectile, or taking evasive action in a military environment. Also, the tracking can be used to position a robot to work on an object. For some or all of these applications, usually the tracks which have just been identified are extended or extrapolated to predict a subsequent position of the aircraft or other object. The extrapolation can be done in a variety of prior art ways; for example, straight line extensions of the most likely track extension hypothesis, parametric quadratic extension of the x versus time, y versus time, etc. functions that are the result of the filtering process described earlier, least square path fitting or Kalman filtering of just the selected hypothesis.

The process of gating, filtering, and gate generation as they were previously described require that a curve be fit through observations such that fit of observations to the likely path can be scored and further so that the hypothetical target future location can be calculated for the next stage of gating. In the implementation existing, quadratic functions have been fit through the measurements that occur within the window. A set of quadratics is used, one per sensor measurement. To calculate intercept locations these quadratics can be converted directly into path functions. Intercept times are then calculated by prior methods based upon simultaneous solution of path equations.

The use of the fitted quadratics is not as precise as more conventional filters like the Kalman Filter. They are however much faster and sufficiently accurate for the relative scores required for the Assignment problem. When better location prediction is required then the assignment problem is executed to select the solution hypothesis and based upon the observations in those hypothesis the more extensive Kalman filter is executed. The result is tremendous computation savings when compared with the Kalman Filter being run on all hypothetical tracks.

Based on the foregoing, apparatus and methods have been disclosed for tracking objects. However, numerous modifications and substitutions can be made without deviating from the scope of the present invention. For example, the foregoing functions $\Psi$ can also be defined as recursive approximation problem in which several values of higher order $u^k$ values are used to eliminate the higher than approximation characteristic of the function $\Phi_k$. The hill climbing of the function $\Psi$ can be implemented by a high order hill climbing using the enhanced function $\Phi_k$. Although the result would not be as efficient it seems likely that the method would converge. Therefore, the invention has been disclosed by way of example and not limitation, and reference should be made to the following claims to determine the scope of the present invention.

II. An Alternative Embodiment of the Multi-dimensional Assignment Solving Process The following description provides an alternative second embodiment of the multi-dimensional assignment solving process of section I.1. However, in order to clearly describe the present alternative embodiment, further discussion is first presented regarding the data assignment problem of partitioning measurements into tracks and false alarms and, in particular, the representation of multi-dimensional assignment problems.

II.1. Formulation of the Assignment Problem

The goal of this section is to explain the formulation of the data association problems, and more particularly multi-dimensional assignment problems, that govern large classes of problems in centralized or hybrid centralized-sensor level multisensor/multitarget tracking. The presentation is brief; technical details are presented for both track initiation and maintenance in (A. B. Poore. Multidimensional assignment formulation of data association problems arising from multitarget tracking and multisensor data fusion. *Computational Optimization and Applications,* 3:27–57, 1994) for non-maneuvering targets and in (A. B. Poore. Multidimensional assignments and multitarget tracking: Partitioning data sets. In P. Hansen, I. J. Cox, and B. Julesz, editors, *DIMACS Series in Discrete Mathematics and Theoretical Computer Science,* volume 19, pages 169–198, Providence, R.I., 1995. American Mathematical Society) for maneuvering targets. Note that the present formulation can also be modified to include target features (e.g., size and type) into the scoring process 154.

The data assignment problems for multisensor and multitarget tracking considered here are generally posed as that of maximizing the posterior probability of the surveillance region (given the data) according to $$\text{Maximize} \left\{ \frac{P(\Gamma = \gamma | Z^M)}{P(\Gamma = \gamma^0 | Z^M)} \,\middle|\, \gamma \in \Gamma^* \right\}, \quad (2.1)$$

where $Z^M$ represents M data sets, $\gamma$ is a partition of indices of the data (and thus induces a partition of the data), $\Gamma^*$ is the finite collection of all such partitions, $\Gamma$ is a discrete random element defined on $\Gamma^*$, $\gamma^0$ is a reference partition, and $P(\Gamma=\gamma|Z^M)$ is the posterior probability of a partition $\gamma$ being true given the data $Z^M$. The term partition is defined below.

Consider M observation sets $Z(k)$ (k=1, ..., N) each of $N_k$ observations $\{z_{i_k}^k\}_{i_k=1}^{N_k}$ and let $Z^M$ denote the cumulative data set defined by $$Z(k) = \{z_{i_k}^k\}_{i_k=1}^{N_k} \text{ and } Z^m = \{Z(1), \ldots, Z(M)\}, \quad (2.22)$$

respectively. In multisensor data fusion and multitarget tracking the data sets Z(k) may represent different classes of objects, and each data set can arise from different sensors. For track initiation the objects are measurements that must be partitioned into tracks and false alarms. In the formulation of track extensions a moving window over time of observations sets is used. The observation sets will be measurements which are: (a) assigned to existing tracks, (b) designated as false measurements, or (c) used for initiating tracks. However, note that alternative data objects instead of observation sets may also be fused such as in sensor level tracking wherein each sensor forms tracks from its own measurements and then the tracks from the sensors are fused in a central location. Note that, as one skilled in the art will appreciate, both embodiments of the present invention may be used for this type of data fusion.

The data assignment problem considered presently is represented as a case of set partitioning defined in the following way. First, for notational convenience in representing tracks, a zero index is added to each of the index sets in (2.2), a gap filler $z_0^k$ is added to each of the data sets z(k) in (2.2), and a "track of data" is defined as $(z_{i_1}^1, \ldots, z_{i_N}^N)$, where $i_k$ can now assume the values of 0. A partition of the data will refer to a collection of tracks of data or track extensions wherein each observation occurs exactly once in one of the tracks of data and such that all data is used up.

Note that the occurrence of the gap filler is unrestricted. The gap filler $z_0^k$ serves several purposes in the representation of missing data, false observations, initiating tracks, and terminating tracks. Note that a "reference partition" may be defined which is a partition in which all observations are declared to be false.

Next under appropriate independence assumptions it can be shown that:

$$\frac{P(\Gamma = \gamma \mid Z^M)}{P(\Gamma = \gamma^0 \mid Z^M)} \equiv L_\gamma \equiv \prod_{(i_1 \ldots i_N) \in \gamma} L_{i_1 \ldots i_M}, \quad (2.3)$$

where $L_{i_1 \ldots i_M}^k$ is a likelihood ratio containing probabilities for detection, maneuvers, and termination as well as probability density functions for measurement errors, track initiation and termination. Then if $c_{i_1 \ldots i_N}^k = -\ln(L_{i_1 \ldots i_M}^k)$, $$-\ln\left[\frac{P(\Gamma = \gamma \mid Z^M)}{P(\Gamma = \gamma^0 \mid Z^M)}\right] = \sum_{(i_1, \ldots, i_M) \in \gamma} c_{i_1 \ldots i_N}. \quad (2.4)$$

Using (2.3) and the zero-one variable $z_{i_1 \ldots i_N}^k = 1$, if $(i_1, \ldots, i_M) \in \gamma$, and 0, otherwise, one can then write the problem (2.1) as the following M-dimensional assignment problem (as also presented in section Problem Formulation (1.4) with k=M):

(a) Minimize $\quad \sum_{i_1=0}^{N_1} \ldots \sum_{i_M=0}^{N_M} c_{i_1 \ldots i_M} z_{i_1 \ldots i_M}$ (2.5)

(b) Subject to: $\quad \sum_{i_2=0}^{N_2} \ldots \sum_{i_M=0}^{N_M} z_{i_1 \ldots i_M} = 1, i_1 = 1, \ldots, N_1,$ (c) $\quad \sum_{i_1=0}^{N_1} \ldots \sum_{i_{k-1}=0}^{N_{k-1}} \sum_{i_{k+1}=0}^{N_{k+1}} \ldots \sum_{i_M=0}^{N_M} z_{i_1 \ldots i_M} = 1,$ for $i_k = 1, \ldots, N_k$ and $k = 2, \ldots, M-1,$ (d) $\quad \sum_{i_1=0}^{N_1} \ldots \sum_{i_{M-1}=0}^{N_{M-1}} z_{i_1 \ldots i_M} = 1, i_M = 1, \ldots, N_M,$ (e) $\quad z_{i_1 \ldots i_M} \in \{0, 1\}$ for all $i_1, \ldots, i_M,$ where $c_0 \ldots 0$ is arbitrarily defined to be zero. Here, each group of sums in the constraints (2.5)(b)–(2.5)(e) represents the fact that each non-gap filler observation occurs exactly once in a "track of data." One can modify this formulation to include multi-assignments of one, some, or all the actual observations. The assignment problem (2.5) is changed accordingly. For example, if $z_{i_k}^k$ is to be assigned no more than, exactly, or no less than $n_{i_k}^k$ times, then the "=1" is changed to $\leq$, $=$, $\geq n_{i_k}^k$, respectively.

Expressions for the likelihood ratios $L_{i_1 \ldots i_M}^k$ appearing in the costs $c_{i_1 \ldots i_M} = -\ln (L_{i_1 \ldots i_M})$ are well-known. In particular, discussions of these ratios may be found in (A.B. Poore. Multidimensional assignment formulation of data association problems arising from multitarget tracking and multisensor data fusion, *Computational Optimization and Applications*, 3:27–57, 1994; A.B. Poore. Multidimensional assignments and multitarget tracking: Partitioning data sets. In P. Hansen, I. J. Cox, B. Julesz, editors, *DIMACS Series in Discrete Mathematics and Theoretical Computer Science*, volume 19, pages 169–198, Providence, R.I., 1995. American Mathematical Society). Furthermore, the likelihood ratios are easily modified to include target features and to account for different sensor types. Also note that in track initiation, the M observation sets provide observations from M sensors, possibly all the same. Additionally note that for track maintenance, a sliding window of M observation sets and one data set containing established tracks may be used. In this latter case, the formulation is the same as above except that the dimension of the assignment problem is now M+1.

II.2. Overview of the New Lagrangian Relaxation Algorithms

Having formulated an M-dimensional assignment problem (2.5), we now turn to a description of the Lagrangian relaxation algorithm. Subsection II.2.1 below presents many of the relaxation properties associated with the relaxation of an n-dimensional assignment problem to an m-dimensional one via a Lagrangian relaxation of n−m sets of constraints wherein m<n≤M and preferably in the present invention embodiment n−m>1. Although any n−m constraint sets can be relaxed, the description here is based on relaxing the last n−m sets of constraints and keeping the first m sets. Given either an optimal or suboptimal solution of the relaxed problem, a technique for recovering a feasible solution of the n-dimensional problem is presented in subsection II.2.2 below and an overview of the Lagrangian relaxation algorithm is given in subsection II.2.3.

The following notation will be used throughout the remainder of the work. Let M be an integer such that $M \geq 3$ and let $n \in \{3, \ldots, M\}$. The n-dimensional assignment problem is (a) Minimize: $v_n(z) = \sum_{i_1=0}^{N_1} \ldots \sum_{i_n=0}^{N_n} c_{i_1 \ldots i_n}^n z_{i_1 \ldots i_n}^n$ (2.6)

(b) Subject to $\quad \sum_{i_2=0}^{N_2} \ldots \sum_{i_n=0}^{N_n} z_{i_1 \ldots i_n}^n = 1, i_1 = 1, \ldots, N_1,$ (c) $\quad \sum_{i_1=0}^{N_1} \ldots \sum_{i_{k-1}=0}^{N_{k-1}} \sum_{i_{k+1}=0}^{N_{k+1}} \ldots \sum_{i_n=0}^{N_n} z_{i_1 \ldots i_n}^n = 1,$ for $i_k = 1, \ldots, N_k$ and $k = 2, \ldots, n-1,$ (d) $\quad \sum_{i_1=0}^{N_1} \ldots \sum_{i_{n-1}=0}^{N_{n-1}} z_{i_1 \ldots i_n}^n = 1, i_n = 1, \ldots, N_n,$ (e) $\quad z_{i_1 \ldots i_n}^n \in \{0, 1\}$ for all $i_1, \ldots, i_n.$ To ensure that a feasible solution of (2.6) always exists, all variables with exactly one nonzero index (i.e., variables of the form $z_0^n \ldots 0_{i_k}0 \ldots 0^n$ for $i_k \neq 0$) are assumed free to be assigned and the corresponding cost coefficients are well-defined.

II.2.1. The Lagrangian Relaxed Assignment Problem

The n-dimensional assignment problem (2.6) has n sets of constraints. A $(N_k+1)$-dimensional multiplier vector associated with the $k^{th}$ constraint set will be denoted by $u^k = (u_0^k, u_1^k, \ldots, u_{M_k}^k)^T$ with $u_0^k = 0$ and $k = 1, \ldots, n$. The n-dimensional assignment problem (2.6) is relaxed to an m-dimensional assignment problem by incorporating n−m of the n sets of constraints into the objective function (2.6)(a). Although any constraint set can be relaxed, the description of the relaxation procedure for (2.6) will be based on the relaxation of the last n−m sets of constraints.

The relaxed problem is $$\phi_{mn}(u^{m+1}, \ldots, u^n) \equiv \text{Minimize } \phi_{mn}(z^n; u^{m+1}, \ldots, u^n) \quad (2.7)$$

$$\equiv \sum_{i_1=0}^{N_1} \cdots \sum_{i_n=0}^{N_n} c_{i_1 \ldots i_n}^n z_{i_1 \ldots i_n}^n + \sum_{k=m+1}^{n} \sum_{i_k=0}^{N_k} u_{i_k}^k \left[ \sum_{i_1=0}^{N_1} \cdots \sum_{i_{k-1}=0}^{N_{k-1}} \sum_{i_{k+1}=0}^{N_{k+1}} \cdots \sum_{i_n=0}^{N_n} z_{i_1 \ldots i_n}^n - 1 \right]$$

$$\equiv \sum_{i_1=0}^{N_1} \cdots \sum_{i_n=0}^{N_n} \left[ c_{i_1 \ldots i_n}^n + \sum_{k=m+1}^{n} u_{i_k}^k \right] z_{i_1 \ldots i_n}^n - \sum_{k=m+1}^{n} \sum_{i_k=0}^{N_k} u_{i_k}^k$$

Subject To $\sum_{i_2=0}^{N_2} \cdots \sum_{i_n=0}^{N_n} z_{i_1 \ldots i_n}^n = 1, i_1 = 1, \ldots, N_1$, $$\sum_{i_1=0}^{N_1} \cdots \sum_{i_{k-1}=0}^{N_{k-1}} \sum_{i_{k+1}=0}^{N_{k+1}} \cdots \sum_{i_n=0}^{N_n} z_{i_1 \ldots i_n}^n = 1$$

for $i = 1, \ldots, N_k$ and $k = 2, \ldots, m$, $z_{i_1 \ldots i_n}^n \in \{0, 1\}$ for all $i_1, \ldots, i_n$, wherein we have added the multiplier $u_0^k \equiv 0$ for notational convenience. Thus, the multiplier $u^k \in \mathbb{R}^{N+1}$ with $u_0^k = 0$ is fixed.

An optimal (or suboptimal) solution of (2.7) can be constructed from that of an m-dimensional assignment problem. To show this, define for each $(i_1, \ldots, i_m)$ an index $(j_{m+1}, \ldots, j_n) = (j_{m+1}(i_1, \ldots, i_m), \ldots, j_n(i_1, \ldots, i_m))$ and a new cost function $c_{i_1 \ldots i_m}^m$ by $$(j_{m+1}, \ldots, j_n) = \quad (2.8)$$

$$\arg\min \left\{ c_{i_1 \ldots i_n}^n + \sum_{k=m+1}^{n} u_{i_k}^k \; \middle| \; i_k = 0, \ldots, N_k \text{ and } k = m+1, \ldots, n \right\},$$

$$c_{i_1 \ldots i_m}^m = c_{i_1 \ldots i_m j_{m+1} \ldots j_n} + \sum_{k=m+1}^{n} u_{j_k}^k \text{ for } (i_1, \ldots, i_m) \neq (0, \ldots 0),$$

$$c_{0 \ldots 0}^m = \sum_{i_{m+1}}^{N_{m+1}} \cdots \sum_{i_n=0}^{N_0} \text{Minimum} \left\{ 0, c_{0 \ldots 0 i_{m+1} \ldots i_n}^n + \sum_{k=m+1}^{n} u_{j_k}^k \right\}.$$

If $(j_{m+1}, \ldots, j_n)$ is not unique, choose the smallest such $j_{m+1}$, amongst those (n–m)-tuples with the same $j_{m+1}$ choose the smallest $j_{m+2}$, etc., so that $(j_{m+1}, \ldots, j_n)$ is uniquely defined.) Using the cost coefficients defined in this way, the following m-dimensional assignment problem is obtained:

$$\hat{\phi}_{mn}(u^{m+1}, \ldots, u^n) = \text{Minimize } \hat{\phi}_{mn}(z^m; u^{m+1}, \ldots, u^n) \quad (2.9)$$

$$\equiv v_m(z^m) \equiv \sum_{i_1=0}^{N_1} \cdots \sum_{i_m=0}^{N_0} c_{i_1 \ldots i_m}^m z_{i_1 \ldots i_m}^m$$

Subject to: $\sum_{i_2=0}^{N_1} \cdots \sum_{i_m=0}^{N_m} z_{i_1 \ldots i_m}^m = 1, i_1 = 1, \ldots, N_1$, $$\sum_{i_1=0}^{N_1} \cdots \sum_{i_{k-1}=0}^{N_{k-1}} \sum_{i_{k+1}=0}^{N_{k+1}} \cdots \sum_{i_m=0}^{N_0} z_{i_1 \ldots i_m}^m = 1,$$

for $i_k = 1, \ldots, N_k$ and $k = 2, \ldots, m-1$, $$\sum_{i_1=0}^{N_1} \cdots \sum_{i_{m-1}=0}^{N_{m-1}} z_{i_1 \ldots i_m}^m = 1, i_m = 1, \ldots, N_m,$$

$z_{i_1 \ldots i_m}^m \in \{0, 1\}$ for all $i_1, \ldots, i_m$.

As an aside, observe that any feasible solution $z^n$ of (2.6) yields a feasible solution $z^m$ of (2.9) via the construction $$z_{i_1 \ldots i_m}^m = \begin{cases} 1, & \text{if } z_{i_1 \ldots i_{m-1} i_n}^n = 1 \text{ for some } (i_{m+1}, \ldots, i_n), \\ 0, & \text{otherwise.} \end{cases}$$

Thus, the m-dimensional assignment problem (2.9) has at least as many feasible solutions of the constraints as the original problem (2.6).

The following Fact A.2 has been shown to be true. it states that an optimal solution of Problem Formulation (2.7) can be computed from that of Problem Formulation (2.9). Furthermore, the converse to this fact is provided in Fact A.3. Moreover, if the solution of either of these two problems (2.7) or (2.9) is $\epsilon$-optimal (i.e., the objective 10 function associated with the suboptimal solution is within "$\epsilon$" of the objective function associated with the optimal solution), then so is the other.

Fact A.2. Let $w^m$ be a feasible solution to problem (2.9) and define $w^n$ by $$w_{i_1 \ldots i_n}^n = w_{i_1 \ldots i_m}^m \quad \text{if } (i_{m+1}, \ldots, i_n) = (j_{m+1}, \ldots, j_n) \text{ and} \quad (2.10)$$
$$(i_1, \ldots, i_m) \neq (0, \ldots, 0)$$

$$w_{i_1 \ldots i_n}^n = 0 \quad \text{if } (i_{m+1}, \ldots, i_n) \neq (j_{m+1}, \ldots, j_n) \text{ and}$$
$$(i_1, \ldots, i_m) \neq (0, \ldots, 0)$$

$$w_{0 \ldots 0 i_{m+1} \ldots i_n}^n = 1 \quad \text{if } c_{0 \ldots 0 i_{m+1} \ldots i_n}^n + \sum_{k=m+1}^{n} u_{i_k}^k \leq 0$$

$$w_{0 \ldots 0 i_{m+1} \ldots i_n}^n = 0 \quad \text{if } c_{0 \ldots 0 i_{m+1} \ldots i_n}^n + \sum_{k=m+1}^{n} u_{i_k}^k > 0.$$

Then $w^n$ is a feasible solution of the Lagrangian relaxed problem (2.7) and $$\phi_{mn}(w^n; u^{m+1}, \ldots, u^n) = \hat{\phi}_{mn}(w^m; u^{m+1}, \ldots, u^n) - \sum_{k=m+1}^{n} \sum_{i_k=0}^{M_k} u_{i_k}^k.$$

If, in addition, $w^m$ is optimal for (2.9), then $w^n$ is an optimal solution of (2.7) and $$\phi_{mn}(u^{m+1}, \ldots, u^n) = \hat{\phi}_{mn}(u^{m+1}, \ldots, u^n) - \sum_{k=m+1}^{n} \sum_{i_k=0}^{M_k} u_{i_k}^k.$$

With the exception of one equality being converted to an inequality, the following Fact is a converse of Fact A.2 and has also been shown to be true.

Fact A.3. Let $w^n$ be a feasible solution to problem (2.7) and define $w^m$ by $$w^m_{i_1 \ldots i_m} = \sum_{i_{m+1}=0}^{N_{m+1}} \ldots \sum_{i_n=0}^{N_m} w^n_{i_1 \ldots i_n} \text{ for } (i_1, \ldots, i_m) \neq (0, \ldots, 0), \quad (2.11)$$

$w^m_{0 \ldots 0} = 0$ if $(i_1, \ldots, i_m) = (0, \ldots, 0)$ and $c^n_{0 \ldots 0 i_{m+1} \ldots i_n} +$ $$\sum_{k=m+1}^{n} u^k_{i_k} > 0 \text{ for all } (i_{m+1}, \ldots, i_n),$$

$w^m_{0 \ldots 0} = 1$ if $(i_1, \ldots, i_m) = (0, \ldots, 0)$ and $c^n_{0 \ldots 0 i_{m+1} \ldots i_n} +$ $$\sum_{k=m+1}^{n} u^k_{i_k} \leq 0 \text{ for some } (i_{m+1}, \ldots, i_n).$$

Then $w^m$ is a feasible solution of the problem (2.9) and $$\phi_{mn}(w^n; u^{m+1}, \ldots, u^n) \geq \hat{\phi}_{mn}(w^n; u^{m+1}, \ldots, u^n) - \sum_{k=m+1}^{n} \sum_{i_k=0}^{M_k} u^k_{i_k}.$$

If, in addition, $w^n$ is optimal for (2.7), then $w^m$ is an optimal solution of (2.9), $$\phi_{mn}(w^n; u^{m+1}, \ldots, u^n) = \hat{\phi}_{mn}(w^m; u^{m+1}, \ldots, u^n) - \sum_{k=m+1}^{n} \sum_{i_k=0}^{M_k} u^k_{i_k},$$

and $$\Phi_{mn}(u^{m+1}, \ldots, u^n) = \hat{\Phi}_{mn}(u^{m+1}, \ldots, u^n) - \sum_{k=m+1}^{n} \sum_{i_k=0}^{M_k} u^k_{i_k}.$$

II.2.2. The Recovery Procedure

The next objective is to explain a recovery procedure or method for recovering a solution to the n-dimensional problem of (2.6) from a relaxed problem having potentially substantially fewer dimensions than (2.6). Note that this aspect of the alternative embodiment of the present invention is substantially different from the method disclosed in the first embodiment of the multidimensional assignment solving process of section I.1 of this specification. Further, this alternative embodiment provides substantial benefits in terms of computational efficiency and accuracy over the first embodiment, as will be discussed. Thus, given a feasible (optimal or suboptimal) solution $w^m$ of (2.9) (or $w^n$ if Problem Formulation (2.7) is constructed via Fact A.2), an explanation is provided here regarding how to generate a feasible solution $z^n$ of (2.6) which is close to $w^m$ in a sense to be specified. We first assume that no variables in (2.6) are preassigned to zero (this assumption will be removed shortly). The difficulty with the solution $w^n$ is that it need not satisfy the last n−m sets of constraints in (2.6). Note, however, that if $w^m$ is an optimal solution for (2.9) and $w^n$ (constructed as in Fact A.2) satisfies the relaxed constraints, then $w^n$ is optimal for (2.6). The recovery procedure described here is designed to preserve the 0-1 character of the solution $w^m$ of (2.9) as far as possible. That is, if $w_{i_1 \ldots i_m}{}^m = 1$ and $i_l \neq 0$ for at least one l=1, . . . , m, then the corresponding feasible solution $z^n$ of (2.6) is constructed so that $z_{i_1 \ldots i_n}{}^n = 1$ for some $(i_{m+1}, \ldots, i_n)$. Note that by this reasoning, variables of the form $z_0 \ldots 0 i_{m+1} \ldots i_n{}^n$ can be assigned to a value of 1 in the recovery problem only if $w_0 \ldots 0{}^m = 1$. However, variables $z_0 \ldots 0 i_{m+1} \ldots i_n{}^n$ will be treated differently in the recovery procedure in that they can be assigned 0 or 1 independent of the value $w_0 \ldots 0{}^m$. This increases the feasible set of the recovery problem, leading to a potentially better solution.

Let $\{(i_1{}^j, \ldots, i_m{}^j)\}_{j=1}^{N_0}$ be an enumeration of indices of $w^m$ (or the first m indices of $w^n$ constructed as in Fact A.2) such that $w_{i_1{}^j \ldots i_m{}^j}{}^m = 1$ and $(i_1{}^j, \ldots, i_m{}^j) \neq (0, \ldots, 0)$. Set $(i_1{}^0, \ldots, i_m{}^0) = (0, \ldots, 0)$ for j=0 and define $$c_{j i_{m+1} \ldots i_n}^{n-m+1} = c_{i_1{}^j \ldots i_m{}^j i_{m+1} \ldots i_n}^n \quad (2.12)$$

for $i_k = 0, \ldots, N_k$; k=m+1, . . . ,n; j=0, . . . , $N_0$.
Let Y denote the solution of the (n−m+1)-dimensional assignment problem:

$$\text{Minimize } \sum_{j=0}^{N_0} \sum_{i_{m+1}=0}^{N_{m+1}} \ldots \sum_{i_n=0}^{N_m} c_{j i_{m+1} \ldots i_n}^{n-m+1} y_{j i_{m+1} \ldots i_n} \quad (2.13)$$

Subject to $\sum_{i_{m+1}=0}^{N_{m+1}} \ldots \sum_{i_n=0}^{N_m} y_{j i_{m+1} \ldots i_n} = 1, j = 1, \ldots, N_0,$ $$\sum_{j=0}^{N_0} \sum_{i_{m+1}=0}^{N_{m+1}} \ldots \sum_{i_{k-1}=0}^{N_{k-1}} \sum_{i_{k+1}=0}^{N_{k+1}} \ldots \sum_{i_n=0}^{N_m} y_{j i_{m+1} \ldots i_n} = 1,$$

for $i_k = 1, \ldots, N_k$ and $k = m+1, \ldots, n-1$, $$\sum_{j=0}^{N_0} \sum_{i_{m+1}=0}^{N_{m+1}} \ldots \sum_{i_{n-1}=0}^{N_{m-1}} y_{j i_{m+1} \ldots i_n} = 1,$$

$i_n = 1, \ldots, N_m,$ $y_{j i_{m+1} \ldots i_n} \in \{0, 1\}$ for all $j, i_{m+1}, \ldots, i_n$.

The recovered feasible solution $z^n$ of (2.6) corresponding to the multiplier set $\{u^m, \ldots, u^n\}$ is then defined by $$z^n_{i_1 \ldots i_n} = \begin{cases} 1, & \text{if } (i_1, \ldots, i_m) = (i_1{}^j, \ldots, i_m{}^j) \text{ for some} \\ & j = 0, \ldots, N_0 \text{ and } Y_{j i_{m+1} \ldots i_n} = 1, \\ 0, & \text{otherwise.} \end{cases} \quad (2.14)$$

This recovery procedure is valid as long as all cost coefficients $c^n$ are defined and all zero-one variables in $z^n$ are free to be assigned. Note that modifications are necessary for sparse problems. If the cost coefficient $c_{i_1{}^j \ldots i_m{}^j i_{m+1} \ldots i_n}{}^n$ is well defined and the zero-one variable $c_{i_1{}^j \ldots i_m{}^j i_{m+1} \ldots i_n}{}^n$ is free to be assigned to zero or one, then define $c_{j i_{m+1} \ldots i_n}^{n-m+1} = c_{i_1{}^j \ldots i_m{}^j i_{m+1} \ldots i_n}{}^n$ as in (2.12) with $z_{j i_{m+1} \ldots i_n}^{n-m+1}$ being free to be assigned. Otherwise, $z_{j i_{m+1} \ldots i_n}^{n-m+1}$ preassigned to zero. To ensure that a feasible solution exists, we now only need ensure that the variables $z_{j 0 \ldots 0}^{n-m+1}$ are free for j=0, 1, . . . , $N_0$. (Recall that all variables of the form $z_0 \ldots 0 i_k \ldots 0{}^n$ are free (to be assigned) and all coefficients of the form $c_0 \ldots 0 i_k \ldots 0{}^n$ are well defined for k=1, . . . , n.) This is accomplished as follows. If the cost coefficient $c_{i_1{}^j i_2{}^j \ldots i_m{}^j 0 \ldots 0}{}^n$ is well defined and $z_{i_1{}^j i_2{}^j \ldots i_m{}^j 0 \ldots 0}{}^n$ is free, then define $c_{j 0 \ldots 0}^{n-m+1} = c_{i_1{}^j i_2{}^j \ldots i_m{}^j 0 \ldots 0}{}^n$ with $z_{j 0 \ldots 0}^{n-m+1}$ being free. Otherwise, since all variables of the form $z_0 \ldots i_k \ldots 0{}^n$ are known feasible and have well-defined costs, put $$c_{j 0 \ldots 0}^{n-m+1} = \sum_{k=1, i_k^j \neq 0}^{m} c^n_{0 \ldots 0 i_k^j 0 \ldots 0}.$$

II.3. The Multi-Dimensional Lagrangian Relaxation Algorithm for the n-Dimensional Assignment Problem Starting with the M-dimensional assignment problem (2.6), i.e., n=M, the algorithm described below is recursive in that the M-dimensional assignment problem is relaxed to an m-dimensional problem by incorporating (n−m) sets of constrains into the objective function using Lagrangian relaxation of this set. This problem is maximized with respect to the Lagrange multipliers, and a good suboptimal solution to the original problem is recovered using an (n−m+1)-dimensional assignment problem. Each of these two (the m-dimensional and the (n−m+1)-dimensional assignment problems) can be solved in a similar manner.

Figure 8:
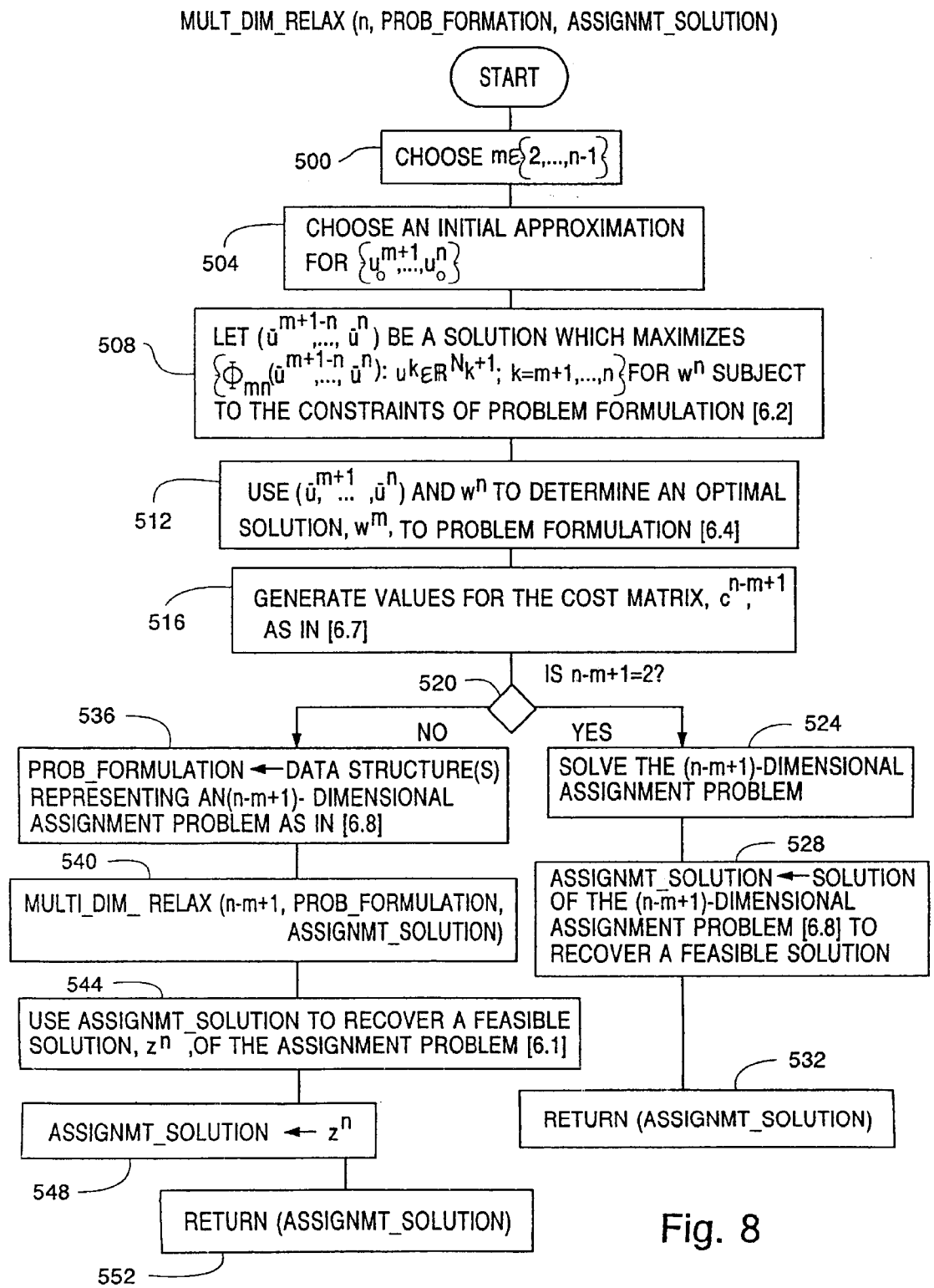
FIG. 8 is a flowchart describing the procedure for solving an n-dimensional assignment problem according to the second embodiment of the invention.

More precisely, reference is made to FIG. 8 which presents a flowchart of a procedure embodying the multidimensional relaxation algorithm, referred to immediately above. This procedure, denoted MULTI_DIM_RELAX in FIG. 8, has three formal parameters, n, PROB_FORMULATION and ASSIGNMT_SOLUTION, which are used to transfer information between recursive instantiations of the procedure. In particular, the parameter, n, is an input parameter supplying the dimension for the multi-dimensional assignment problem (as in(2.6)) which is to be solved (i.e., to obtain an optimal or near-optimal solution). The parameter, PROB_FORMULATION, is also an input parameter supplying the data structure(s) used to represent the n-dimensional assignment problem to be solved. Note that PROB_FORMULATION at least provides access to the cost matrix, $[c^n]$, and the observation sets whose observations are to be assigned. Additionally, the parameter, ASSIGNMT_SOLUTION, is used as an output parameter for returning a solution of a lower dimensioned assignment problem to an instantiation of MULTI_DIM_RELAX which is processing a higher dimensioned assignment problem.

A description of FIG. 8 follows. Assuming MULTI_DIM_RELAX is initially invoked with M as the value for the parameter n and the PROB_FORMULATION having a data structure(s) representing an M-dimensional assignment problem as in (2.5), in step 500 an integer m, $2 \leq m < n$ is chosen such that the constraint sets corresponding to dimensions m+1, ..., n are to be relaxed so that an m-dimensional problem formulation as in (2.7) results. In step 504 an initial approximation is provided for $\{u_0^{m+1}, \ldots, u_0^n\}$. Subsequently, in step 508 the above initial values for $\{u_0^{m+1}, \ldots, u_0^n\}$ are used in an iterative process in determining $(\bar{u}^{m+1}, \ldots, \bar{u}^n)$ which maximizes $\{\Phi_{mn}(u^{m+1}, \ldots, u^n)$ where $u^k \in \mathbb{R}^{M_k+1}$ and k=m+1, ..., n} for a feasible solution $w^n$ subject to the constraints of Problem Formulation (2.7). Note that by maximizing $\Phi_{mn}(u^{m+1}, \ldots, u^n)$, some of the constraints that were relaxed are being forced to be satisfied and in so doing information is built into a solution of this function for solving the input assignment problem in "PROB_FORMULATION." Further note that a non-smooth optimization technique is used here and that a preferred method of determining a maximum in step 508 is the bundle-trust method of Schramm and Zowe (H. Schramm and J. Zowe. A version of the bundle idea for minimizing a non-smooth function: Conceptual idea, convergence anailysis, numerical results. *SIAM Journal on Optimization*, 2, No. 1:121–152, February, 1992). This method, along with various other methods for determining the maximum in step 508, are discussed below.

Also note that for m>2, a solution to the optimization problem of step 508 is NP-hard and therefore cannot be solved optimally. That is, there is no known computationally tractable method for guaranteeing an optimal solution. Thus, there are two possibilities: either (a) allow m to be greater than 2 and use auxiliary functions similar to those disclosed in the first embodiment of the k-dimensional assignment solver 300 in section I to compute a near-optimal solution, or (b) make m=2 wherein algorithms such as the forward/reverse auction algorithm of D. P. Bertsekas and D. A. Castanon (D. P. Bertsekas and D. A. Castafion. A forward/reverse auction algorithm for asymmetric assignment problems. *Computational Optimization and Applications*, 1: 277–298, 1992) provides an optimal solution.

If option (a) immediately above is chosen, then the auxiliary functions are used as approximation functions for obtaining at least a near-optimal solution to the optimization problem of step 508. Note that the auxiliary functions used depend on the value of m. Thus, auxiliary functions used when m=3 will likely be different from those for m=4. But in any case, the optimization procedure is guided by using the merit function, $\Phi_{2n}(u^3, \ldots, u^n)$, which can be computed exactly via a two-dimensional assignment problem for guiding the maximization process.

Alternatively, if option (b) above is chosen, then two important advantages result, namely, the optimization problem of step 508 can be always solved optimally and without using auxiliary approximation functions. Thus, better solutions to the original M-dimensional assignment problem are likely since there is no guarantee that when the non-smooth optimization techniques are applied to the auxiliary functions the techniques will yield an optimal solution to step 508. Furthermore, it is important to note that without auxiliary functions, the processing in step 508 is both conceptually easier to follow and more efficient.

Subsequently, in step 512 of FIG. 8, the solution $(\bar{u}^{m+1}, \ldots, \bar{u}^n)$ is used in determining an optimal solution $w^m$ to Problem Formulation (2.9) as generated according to (2.8) and Fact A.3.

In step 516, the solution w is used in defining the cost matrix $c^{n-m+1}$ as in (2.12). Subsequently, if n−m+1=2, then the assignment problem (2.13) may be solved straightforwardly using known techniques such as forward/reverse auction algorithms. Following this, in step 528, the solution to the two-dimensional assignment problem is assigned to the variable ASSIGNMT_SOLUTION and in step 532 ASSIGNMT_SOLUTION is returned to a dimension three level recursion of MULTI_DIMRELAX for solving a three-dimensional assignment problem.

Alternatively, if in step 520, n−m+1>2, then in step 536 the data structure(s) representing a problem formulation as in (2.13) is generated and assigned to the parameter, PROB_FORMULATION. Subsequently, in step 540 a recursive copy of MULTI_DIM_RELAX is invoked to solve the lower dimensional assignment problem represented by PROB_FORMULATION. Upon the completion of step 540, the parameter, ASSIGNMT_SOLUTION, contains the solution to the (n−m+1)-dimensional assignment problem. Thus, in step 544, the (n−m+1)$^{th}$ solution is used to solve the n-dimensional assignment problem as discussed regarding equations (2.14). Finally, in steps 548 and 552 the solution to the n-dimensional assignment problem is returned to the calling program so that, for example, it may be used in taking one or more actions such as (a) sending a warning to aircraft or sea facility; (b) controlling air traffic; (c) controlling anti-aircraft or anti-missile equipment; (d) taking evasive action; or (e) surveilling an object.

II.3.1. Comments on the Various Procedures Provided by FIG. 8

There are many procedures described by FIG. 8. One such procedure is the first embodiment of the multidimensional assignment Solving process of section I.1. That is, by specifying m=n−1 in step 500, a single set of constraints is relaxed in step 508. Thus, one set of constraints is incorporated into the objective function via the Lagrangian problem formulation, resulting in an (m=n−1)-dimensional problem. The relaxed problem is subsequently maximized in step 512 with respect to the corresponding Lagrange multipliers and then a feasible solution is reconstructed for the n-dimensional problem using a two-dimensional assignment problem. The second procedure provided by FIG. 8 is a novel approach which is not suggested by the first embodiment of section I.1. In fact, the second procedure is somewhat of a mirror image of the first embodiment in that n−2 sets of constraints are simultaneously relaxed, yielding immediately an (m=2)-dimensional problem in step 512. Thus, a feasible solution to the n-dimensional problem is then recovered using a recursively obtained solution to an (n−1)-dimensional problem via step 540. In this case, the function values and subgradients of $\Phi_{2n}(u^3, \ldots, u^n)$ of step 508 can be computed optimally via a two-dimensional assignment problem. The significant advantage here is that there is no need for the merit or auxiliary functions, $\Psi_k$, as required in the first embodiment of the multidimensional assignment solving process of section I.1 above and also there is no need for the more general merit or auxiliary functions $\Psi_{mn}$, as discussed in subsection II.4.2 below. Further, note that all function values and subgradients used in the nonsmooth maximization process are computed exactly (i.e., optimally) in this second procedure. Moreover, problem decomposition is now carried out for the n-dimensional problem; however, decomposition of the (n−1)-dimensional recovery problem (and all lower recovery problems) is performed only after the problem is formulated.

Between these two procedures are a host of different relaxation schemes based on relaxing n−m sets of constraints to an m-dimensional problem (2<m<n), but these all have the same difficulties as the procedure for the first embodiment of section I.1 in that the relaxed problem is an NP-hard problem. To resolve this difficulty, we use an auxiliary or merit function $\Psi_{mn}$ as described in subsection II.4.2 below. (The notation $\Psi_k$ was used for $\Psi_{n-1,n}$ in section I.1.) For the case m<n−1, the recovery procedure is still based on an NP-hard (n−m+1)-dimensional assignment problem. Note that the partitioning techniques similar to those discussed in Section I.3 may be used to identify the assignment problem with a layered graph and then to find the disjoint components of this graph. In general, all relaxed problems can be decomposed prior to any nonomooth computations because their structure stays fixed throughout the algorithm of FIG. 8. However, all recovery problems cannot be decomposed until they are formulated, as their structure changes as the solutions to the relaxed problems change.

II.4. Details and Refinements Relating to the Flowchart of FIG. 8

Further explanation is provided here on how various steps of FIG. 8 are solved. Note that the refinements presented here can significantly increase the speed of the relaxation procedure of step 508.

II.4.1 Maximization of the Non-smooth Function $\Phi_{mn}(u^{m+1}, \ldots, u^n)$ One of the key steps in the Lagrangian relaxation algorithm in section II.3 is the solution of the problem $$\text{Maximize } \{\Phi_{mn}(u^{m+1}, \ldots, u^n) : u^k \in \mathbb{R}^{M_{k+1}}; k=m+1, \ldots, n\}, \quad (2.15)$$

where $u_0^k = 0$ for all $k = m+1, \ldots, n$. The evaluation of $\Phi_{mn}(u^{m+1}, \ldots, u^n)$ requires the optimal solution of the corresponding minimization problem (2.7). The following discussion provides some properties of these functions.

Fact A.4. Let $u^{m+1}, \ldots, u^n$ be multiplier vectors associated with the $(m+1)^{st}$ through the $n^{th}$ set of constraints (2.6), let $\Phi_{mn}$ be as defined in (2.7), let $V_n(z^n)$ be the objective function value of the n-dimensional assignment problem in equation (2.6), let $z^n$ be any feasible solution of (2.6), and let $\bar{z}^n$ be an optimal solution of (2.6). Then, $\Phi_{mn}(u^{m+1}, \ldots, u^n)$ is piecewise affine, concave and continuous in $\{u^{m+1}, \ldots, u^n\}$ and $$\Phi_{mn}(u^{m+1}, \ldots, u^n) \leq V_n(\bar{z}^n) \leq V_n(z^n). \quad (2.16)$$

Furthermore, $$\Phi_{m-1,n}(u^m, \ldots, u^n) \leq \Phi_{mn}(u^{m+1}, \ldots, u^n). \quad (2.17)$$

Most of the procedures for nonsmooth optimization are based on generalized gradients called subgradients, given by the following definition.

Definition. At $u = (u^{m+1}, \ldots, u^n)$ the set $\partial \Phi_{mn}(u)$ is called a subdifferential of $\Phi_{mn}$ and defined by $$\partial \Phi_{mn}(u) = \{q \in \mathbb{R}^{M_{m+1}+1} \times \ldots \times \mathbb{R}^{M_n+1} | \Phi_{mn}(w) - \Phi_{mn}(u) \leq q^T(w-u) \, \forall w \in \mathbb{R}^{M_{m+1}+1} \times \ldots \times \mathbb{R}^{M_n+1}\}. \quad (2.18)$$

A vector $q \in \partial \Phi_{mn}(u)$ is called a subgradient.

If $z^n$ is an optimal solution of (2.7) computed during evaluation of $\Phi_{mn}(u)$, differentiating $\Phi_{mn}$ with respect to $u_{i_n}^n$ yields the following $i_n^{th}$ component of a subgradient g of $\Phi_{mn}(u)$ $$g_0^k = 0, \quad (2.19)$$

$$g_{i_k}^k = \sum_{i_1=0}^{N_1} \cdots \sum_{i_{k-1}=0}^{N_{k-1}} \sum_{i_{k+1}=0}^{N_{k+1}} \cdots \sum_{i_n=0}^{N_n} z_{i_1 \ldots i_n}^n - 1$$

for $i_k = 1, \ldots, N_k$ and $k = m+1, \ldots, n$.

If $z^n$ is the unique optimal solution of (2.7), $\partial \Phi_{mn}(u) = \{g\}$ and $\Phi_{mn}$ is differentiable at u. If the optimal solution is not unique, then there are finitely many such solutions, say $z^n(1), \ldots, z^n(K)$. Given the corresponding subgradients, $g^1, \ldots, g^K$, the subdifferential $\partial \Phi(u)$ is the convex hull of $\{g^1, \ldots, g^K\}$.

II.4.2 Mathematical Description of a Merit or Auxiliary Function

For real-time needs, one must address the fact that the non-smooth optimization problem of step 508 (FIG. 8) requires the solution of an NP-hard problem for m>2. One approach to this problem is to use the following merit or auxiliary function to decide whether a function value has increased or decreased sufficiently in the line search or trust region methods:

$$\Psi_{mn}(\bar{u}^3, \ldots, \bar{u}^m; u^{m+1}, \ldots, u^n) = \quad (2.20)$$

$$\begin{cases} \Phi_{mn}(u^{m+1}, \ldots, u^n), & \text{if } m = 2 \\ & \text{or (2.7) is solved optimally,} \\ \Phi_{2n}(\bar{u}^3, \ldots, \bar{u}^m; u^{m+1}, \ldots, u^n), & \text{otherwise.} \end{cases}$$

where the multipliers $\bar{u}^3, \ldots, \bar{u}^m$ that appear in lower order relaxations used to construct (suboptimal) solutions of the m-dimensional relaxed problem (2.7) have been explicitly included. Note that $\Psi_{mn}$ is well-defined since (2.9) can always be solved optimally if m=2. For sufficiently small problems (2.7) or (2.9), one can more efficiently solve the NP-hard problem by branch and bound. This is the reason for the inclusion of the first case; otherwise, the relaxed function $\Phi_{2n}$ is used to guide the nonsmooth optimization phase. That the merit function provides a lower bound for the optimal solution follows directly from Fact A.4 and the following fact.

Fact A.5. Given the definition of $\Psi_{mn}$ in (2.20) above, $$\Psi_{mn}(\bar{u}^3, \ldots, \bar{u}^m; u^{m+1}, \ldots, u^n) \leq \Phi_{mn}(u^{m+1}, \ldots, u^n) \text{ for all multipliers } \bar{u}^3, \ldots, \bar{u}, u^{m+1}, \ldots, u^m. \quad (2.21)$$

The actual function value used in the optimization phase is $\Psi_{mn}$; however, the subgradients are computed as in (2.19), but with the solution $z_{i_1 \ldots i_n}^n$ being a suboptimal solution constructed from a relaxation procedure applied to the m-dimensional problem. Again, the use of these lower order relaxed problems is the reason for the inclusion of the multipliers $\bar{u}^3, \ldots, \bar{u}^m$.

To explain how the merit function is used, suppose there is a current multiplier set $(u_{old}^{m+1}, \ldots, u_{old}^n)$ and it is desirable to update to a new multiplier set $(u_{new}^{m+1}, \ldots, u_{new}^n)$ via $(u_{new}^{m+1}, \ldots, u_{new}^n) = (u_{old}^{m+1}, \ldots, u_{old}^n) + (\Delta u^{m+1}, \ldots, \Delta u^n)$. Then $\Psi_{mn}(\bar{u}_{old}^3, \ldots, \bar{u}_{old}^m; u_{old}^{m+1}, \ldots, u_{old}^n)$ is computed where $(\bar{u}_{old}^3, \ldots, \bar{u}_{old}^m)$ is obtained during the relaxation process used to compute a high quality solution to the relaxed m-dimensional assignment problem (2.7) at $(u^{m+1}, \ldots u^n) = (u_{old}^{m+1}, \ldots, u_{old}^n)$. The decision to accept $(u_{new}^{m+1}, \ldots, u_{new}^n)$ is then based on $\Psi_{mn}(\bar{u}_{old}^3 \ldots, \bar{u}_{old}^m; u_{old}^{m+1}, \ldots, u_{old}^n) < \Psi_{mn}(\bar{u}_{new}^3, \ldots, \bar{u}_{new}^m; u_{new}^{m+1}, \ldots, u_{new}^n)$ or some other stopping criteria commonly used in line searches. Again, $(\bar{u}_{new}^3, \ldots, \bar{u}_{new}^m)$ represents the multiplier set used in the lower level relaxation procedure to construct a high quality feasible solution to the m-dimensional relaxed problem (2.7) at $(u^{m+1}, \ldots, u^n) = (u^{m+1}_{new}, \ldots, u^n_{new})$. The point is that each time one changes $(u^{m+1}, \ldots, u^n)$ and uses the merit function $\Psi_{mn}(\bar{u}^3, \ldots, \bar{u}^m; u^{m+1}, \ldots, u^n)$ for comparison purposes, one must generally change the lower level multipliers $(\bar{u}^3, \ldots, \bar{u}^m)$.

An illustration of this merit function for m=n−1 is given in (A. B. Poore and N. Rijavec. Partitioning multiple data sets: multidimensional assignments and Lagrangian relaxation. In P. M. Pardalos and H. Wolkowicz, editors, *Qqudratic assignments and related problems: DIMACS Series in Discrete Mathematics and Theoretical Computer Science*, volume 16, pages 25–37, 1994).

II.4.3 Non-smooth Optimization Methods

By Fact A.4 the function $\Phi_{mn}(u)$ is a continuous, piecewise affine, and concave, so that the negative of $\Phi_{mn}(u)$ is convex. Thus the problem of maximizing $\Phi_{mn}(u)$ is one of nonsmooth optimization. Since there is a large literature on such problems, only a brief discussion of the primary classes of methods for solving such problems is provided. A first class of methods, known as subgradient methods, are reviewed and analyzed in (N. Z. Shor. *Minimization Methods for Non-Differentiable Functions*. Springer-Verlag, New York, 1985). Despite their relative simplicity, subgradient methods have some drawbacks that make them inappropriate for the tracking problem. They do not guarantee a descent direction at each iteration, they lack a clear stopping criterion, and exhibit poor convergence (less than linear).

A more recent and sophisticated class of methods are the bundle methods; excellent developments are presented in (J.-B. Hiriart-Urruty and C. Lemaréchal. *Convex Analysis and Minimization Algorithms I and II*. Springer-Verlag, Berlin, 1993; K. C. Kiwiel. Methods of Descent for Non-Differentiable Optimization. In A. Dold and B. Eckmann, editors, *Lecture Notes in Mathematics*, volume 1133, Berlin, 1985. Springer-Verlag). Bundle methods retain a set (or bundle) of previously computed subgradients to determine the best possible descent direction at the current iteration. Because of the nonsmoothness of $\Phi_{mn}$, the resulting direction may not provide a "sufficient" decrease in $\Phi_{mn}$. In this case, bundle algorithms take a "null" step, wherein the bundle is enriched by a subgradient close to $u_k$. As a result, bundle methods are non-ascent methods which satisfy the relaxed descent condition $\Phi_{mn}(u_{k+1}) < \Phi_{mn}(u_k)$ if $u_{k+1} \neq u_k$. These methods have been shown to have good convergence properties. In particular, bundle method variants have been proven to converge in a finite number of steps for piecewise affine convex functionals in (K. C. Kiwiel. An aggregate subgradient method for non-smooth convex minimization. *Mathematical Programming*, 27:320–341, 1983; H. Schramm and J. Zowe. A version of the bundle idea for minimizing a non-smooth function: Conceptual idea, convergence analysis, numerical results. *SIAM Journal on Optimization*, 2, No. 1:121–152, Febuary, 1992).

All of the above non-smooth optimization methods require the computation of $\Phi_{mn}(u)$ and a $g \in \partial \Phi_{mn}(u)$. These in turn require the computation of the relaxed cost coefficients (2.8). In both the first and second procedures discussed in section II.3.1, maximization of $\Phi_{2n}(u)$ must be repeatedly evaluated. In the most efficient implementations presently known of these two procedures, it was found that at least 95% of the computational effort of the entire procedure is spent in the evaluation of the relaxed cost coefficients (2.8) as part of computing $\Phi_{2n}(u)$. Thus, generally a method should be chosen that makes as efficient use of the subgradients and function values as possible, even at the cost sophisticated manipulation of the subgradients. In evaluating three different bundle procedures: (a) the conjugate subgradsent method of Wolfe used in section I.1 of the first embodiment of the present invention; (b) the aggregate subgradient method of Kiwiel (K. C. Kiwiel. An aggregate subgradient method for non-smooth convex minimization. *Mathematical Programming*, 27:320–341, 1983); and (c) the bundle trust method of Schramm and Zowe (H. Schramm and J. Zowe. A version of the bundle idea for minimizing a non-smooth function: Conceptual idea, convergence analysis, numerical results. *SIAM Journal on Optimization*, 2, No. 1:121–152, February, 1992), it was determined that for a fixed number of non-smooth iterations, say, ten, the bundle-trust method provides good quality solutions with the fewest number of function and subgradient evaluations of all the methods, and is therefore the preferred method.

II.4.4 The Two-Dimensional Assignment Problem

The forward/reverse auction algorithm of Bertsekas and Castañon (D. P. Bertsekas and D. A. Castañon. A forward/reverse auction algorithm for asymmetric assignment problems. *Computational Optimization and Applications*, 1277–298, 1992) is used to solve the many relaxed two-dimensional problems that occur in the course of execution.

II.4.5. Initial Multipliers and Hot Starts

The effective use of "hot starts" is fundamental for real-time applications. A good initial set of multipliers can significantly reduce the number of non-smooth iterations (and hence the number of $\Phi_{mn}$ evaluations) required for a high quality recovered solution. Further, there are several ways that multipliers can be reused. First, if an n-dimensional problem is relaxed to an m-dimensional problem, relaxation provides the multiplier set $\{u^{m+1}, u^{m+2}, \ldots, u^n\}$. These can be used as the initial multipliers for the (n−m+1)-dimensional recovery problem for n−m+1>2. This approach has also worked well to reduce the number of non-smooth iterations during recovery.

Further, for track maintenance, initial feasible solutions are generated as follows. When a new scan of information (a new observation set) arrives from a sensor, one can obtain an initial primal feasible solution by matching new reports to existing tracks via a two-dimensional assignment problem. This is known as the track-while-scan (TWS) approach. Thus, an initial primal solution exists and then we use the above relaxation procedure to make improvements to this TWS solution. Also for track maintenance, multipliers are available from a previously solved and closely related multidimensional assignment problems for all but the new observation set.

II.4.6. Local Search Methods

Given a feasible solution of the multidimensional assignment problem, one can consider local search procedures to improve this result, as described in (C. H. Papadimitriou and K. Steiglitz. *Combinatorial Optimization: Algorithms and Complexity*. Prentice-Hall, Inc., Englewood Cliffs, N.J., 1982; J. Pearl. *Heuristics: Intelligent Search Strategies for Computer Problem Solving*. Addison-Wesley, Reading, Mass., 1984). One method is the idea of k interchanges. Since for sparse problems only those active arcs that participate in the solution are stored, it is difficult to efficiently identify eligible variable exchange sets with some data structures for solving the assignment problem. However, a local search that may be more promising is to use the two-dimensional assignment solver in the following way. Given a feasible solution to the multidimensional assignment problem, the indices that correspond to active arcs in the solution are enumerated. Subsequently, one coordinate is freed to formulate a two-dimensional assignment problem with one index corresponding to the enumeration and the other to the freed coordinate, and then solve a two-dimensional assignment problem to improve the freed index position.

II.4.7. Problem Decomposition

The procedures described thus far are all based on relaxation. Due to the sparsity of assignment problems, however, frequently a decomposition of the problem into a collection of disjoint components can be done wherein each of the components can be solved independently. Due to the setup costs of Lagrangian relaxation, a branch and bound procedure is generally more efficient for small components, say ten to twenty feasible 0–1 variables (i.e., $z_{i_1 \ldots i_r}$). Otherwise, the relaxation procedures described above are used. Perhaps the easiest way to view the decomposition method is to view the reports or measurements as a layered graph. A vertex is associated with each observation point, and an edge is allowed to connect two vertices only if the two observations belong to at least one feasible track of observations. Given this graph, the decomposition problem can then be posed as that of identifying the connected subcomponents of a graph which can be accomplished by constructing a spanning forest via a depth first search algorithm, as described in (A. V. Aho, J. E. Hopcroft, and J. D. Ullman. *The Design and Analysis of Computer Algorithms*. Addison-Wesley, Mass., 1974). Additionally, decomposition of a different type might be based on the identification of bi- and tri-connected components of a graph and enumerating on the connections. Here is a technical explanation. Let $$\Xi = \{Z_{i_1 i_2 \ldots i_r} / z_{i_1 i_2 \ldots i_n} \text{ is not preassigned to zero}\}$$

denote the set of assignable variables. Define an undirected graph G(N,A) where the set of nodes is $$N = \{z_{i_n}^n | n=1, \ldots, n; \ i_n=1, \ldots, N_m\}$$

and arcs, $$A = \{(z_{j_n}^n, z_{j_l}^1) | n \neq l, j_n \neq 0, j_l \neq 0 \text{ and there exists } z_{i_1 i_2 \ldots i_n} \in \Xi \text{ such}$$

that $j_n = i_n$ and $j_l = i_l$\}.

Note that the nodes corresponding to zero index have not been included in the above defined graph, since two variables that have only the zero index in common can be assigned independently. Connected components of the graph are then easily found by constructing a spanning forest via a depth first search. (A detailed algorithm can be found in the book by Aho, Hopcroft and Ullman cited above). Furthermore, this procedure is used at each level in the relaxation, i.e., is applied to each assignment problem (1.4) for n=3 . . . ,M.

The original relaxation problem is decomposed first. All relaxed assignment problems can be decomposed a priori and all recovery problems can be decomposed only after they are formulated. Hence, in the n-to- (n−1) case, we have n−2 relaxed problems that can all be decomposed initially, and the recovery problems that are not decomposed (since they are all two-dimensional). In the n-to-2 case, we have only one relaxed problem that can be decomposed initially. This case yields n−3 recovery problems, which can be decomposed only after they are formulated.

III. New Approaches to Track Initiation and Maintenance Using Multidemensional Assignment Problems III.1. Introduction The ever-increasing demand for sensor surveillance systems is to accurate track and identify objects in real-time, even for dense target scenarios and in regions of high track contention. The use of multiple sensors, through more varied information, has the potential to greatly improve target state estimation and identification. However, to take full advantage of the available data, a multiple frame data association approach is needed. The most popular such approach is an enumerative technique called multiple hypothesis tracking (MHT). As an enumerative technique, MHT can be too computationally intensive for real-time needs because this problem is NP-hard. A promising approach is to utilize the recently developed Lagrangian relaxation algorithms (K. P.Pattipati, S. Deb, and Y.Bar-Shalom. A multisensor-multitarget data association algorithm for heterogeneous sensors. *IEEE Transactions on Aerospace and Electronic Systems*, 29, No. 2:560–568, April 1993; A. B. Poore and N.Rijavec. Partitioning multiple data sets: multidimensional assignments and lagrangian relaxation, in quadratic assignment and related problems, P.M. Pardalos and H.Wolkowicz, editors, *DIMACS series in Discrete Mathematics and Theoretical Computer Science*, 16:25–37, 1994; A. J. Robertson III. A class of lagrangian relaxation algorithms for the multidimensional problem. Ph.D. Thesis, Colorado State University, Ft. Collins, Colo., 1995) for the multidimensional assignment problem; however, there are many other potentially good approaches to these assignment problems such as LP relaxation combined with an interior point method, GRASP, and parallelization.

These data association problems are fundamentally important in tracking. Thus, our first objective is to present an overview of the tracking problem and the context within which these data association problems fit. Following a brief review of the probabilistic framework for data association, the second objective is to formulate two models for track initiation and maintenance as multidimensional assignment problems. This formulation is based on a window moving over the frames of data. The first and simpler model uses the same window length for track initiation and maintenance, while the second model uses different lengths. As the window moves over the frames of data, one creates a sequence of these multidimensional assignment problems and there is an overlap region of frames common to adjacent windows. Thus, given the solution of one problem, one can develop a warm start for the solution to the next problem in the sequence, as shown hereinafter. Such information is critically important to the design of real-time algorithms.

III.2. Overview of the Tracking Problem

Tracking and data fusion are complex subjects of specialization that can only be briefly summarized as they are related to the subject of this paper. The processing of track multiple targets using data from one or more sensors is typically partitioned into two stages or major functional blocks, namely, signal processing and data processing (Y.Bar-Shalom. *Multitarget-Multisensor Tracking: Advanced Applications*. Artech House, Dedham, Mass., 1990; Y.Bar-Shalom and T. E. Fortmann. *Tracking and Data Association*. Academic Press, Boston, Mass., 1988; S. S. Blackman. *Multiple Target Tracking with Radar Applications*. Artech House, Dedham, Mass., 1986). The first stage is the signal processing that takes raw sensor data and outputs reports. Reports are sometimes called observations, threshold exceedances, plots, hits, or returns, depending on the type of sensor. The true source of each report is usually unknown and can be due to a target of interest, a false signal, or persistent background objects that can be moving in the field of view of the sensor.

Two principal functions of data processing are tracking and discrimination or target identification. The discrimination or target identification function distinguishes between tracks that are for targets of interest and other tracks such as those due to background. Also, if there is enough information, each track is classified as to the type of target it appears to represent. Target identification and discrimination will not be discussed further in this paper except to comment here on the use of attributes (including identification information) in the data association.

There are two types of attributes or features, namely, discrete valued variables and continuous valued variables. Available attributes of either or both types should be used in computing the log likelihoods or scores for data association. In discussing tracking in this paper, the attributes will not be mentioned explicitly but it should be understood that some reports and some tracks may include attributes information that should be and can be used in the track processing (both data association and filtering) if it is useful.

III.2.1. Tracking Functions

The tracking function accepts reports for each frame of data and constructs or maintains a target state estimate, the variance-covariance matrix of the state estimation error, and refined estimates (or probabilities) of the target attributes. The state estimate typically includes estimates of target position and velocity in three dimensions and possibly also acceleration and other variables of interest.

The tracking function is typically viewed in two stages, namely, data association and filtering. Also, the process of constructing new tracks, called track initiation, is different from the process of updating existing tracks, called track maintenance.

In track maintenance, the data association function decides how to relate the reports from the current frame of data to the previously computed tracks. In one approach, at most one report is assigned to each track, and in other approaches, weights are assigned to the pairings of reports to a track. After the data association, the filter function updates each target state estimate using the one or more (with weights) reports that were determined by the data association function. A filter commonly used for multiple target tracking and data fusion is the well known Kalman filter (or the extended Kalman filter in the case of nonlinear problems) or a simplified version of it (Y. Bar-Shalom. *Multitarget-Multisensor Tracking: Advanced Applications*. Artech House, Mass., 1990; Y.Bar-Shalom and T. E. Fortmann. *Tracking and Data Association*. Academic Press, Boston, Mass., 1988; S. S. Blackman. *Multiple Target Tracking with Radar Applications*. Artech House, Dedham, Mass., 1986).

In track initiation, typically a sequence of reports is selected (one from each of a few frames of data) to construct a new track. In track initiation, the filtering function constructs a target state estimate and related information based on the selected sequence of reports. The new track is later updated by the track maintenance processing of the subsequent frames of reports.

In some trackers, there is also a tentative tracking function for processing recently established tracks until there is enough confidence to include them in track maintenance. While for simplicity of presentation, tentative tracking will not be included in the processing discussed in this paper, the techniques discussed could readily include one or more tentative tracking functions.

There have been numerous approaches developed to perform the data association function. Since optimal data association is far too complex to implement, good but practical sub-optimal approaches are pursued. Data association approaches can be classified in a number of ways. One way to classify data association approaches is based on the number of data frames used in the association process (O. E. Drummond. Multiple sensor tracking with multiple frame, probabilistic data association. In *Signal and Data Processing of Small Targets, SPIE Proceedings*, volume 2561, pages 322–336, 1995).

In single frame data association for track maintenance, "hard decisions" are made on the assignment of reports to the tracks. Some single frame approaches include: individual nearest neighbor, PDA, JPDA, and global nearest neighbor (sequential most probable hypothesis tracking), which uses a two-dimensional assignment algorithm (Y. Bar-Shalom. *Multitarget-Multisensor Tracking: Advanced Applications*. Artech House, MA, 1990; Y. Bar-Shalom and T. E. Fortmann. *Tracking and Data Association*. Academic Press, Boston, Mass., 1988; S. S. Blackman. *Multiple Target Tracking with Radar Applications*. Artech House, Dedham, Mass., 1986). In most single frame data association approaches, only one track per object is carried forward to be used in processing the next frame of reports.

Multiple frame data association is more complex and frequently involves purposely carrying forward more than one track per target to be used in processing the next frame of reports. By retaining more than one track per target, the tracking performance is improved at the cost of increased processing load. The best known multiple frame data association approach is an enumerative technique called multiple hypothesis tracking (MHT) which enumerates all the global hypothesis with various pruning rules.

As shown hereinafter, the log likelihood of the probability of a global hypothesis can be decomposed into the sum of scores of each track that is contained in the hypothesis. As a consequence, the most probable hypothesis can be identified with the aid of a non-enumerative algorithm for the assignment so formulated.

III.2.2. Interface Between Track Initiation And Track Maintenance

There are a number of ways that track initiation and track maintenance functions can interact (O. E. Drummond. Multiple target tracking with multiple frame, probabilistic data association. In *Signal and Data Proceedings*, volume 1954, pages 394–408, 1993). Two ways that are especially pertinent to the methods of this paper will be discussed in this section.

One approach is to treat these two functions sequentially, by first assigning reports to tracks and then using the information that remains to form new tracks. A better approach is to integrate both processes where initiating tracks compete for the new frame of reports on an equal basis, i.e., at the same time.

In the integrated approach, the data association for track initiation and track maintenance processing are combined and conducted simultaneously. One assignment array is created that includes the track scores for potential tracks for both track initiation and track maintenance. The first dimension of the assignment problem includes only all the tracks either created or updated in the processing of the prior frames of reports. Each of the remaining dimensions accommodates one frame of reports.

After the assignment algorithm finds a solution, each of the previously established tracks are updated with the report assigned to it from the second dimension of the assignment array. The remaining reports in the second dimension that were in the assignment solution are firmly established as track initiators. The unassigned reports in the second dimension of the assignment array are discarded as false signals. The processing of the next frame of reports repeats this process using these updated tracks and the newly identified initiators in the first dimension of the cost array for processing the new frame of reports. Details of this approach are discussed hereinafter.

The integrated approach just discussed, uses the same number of frames of reports for both track initiation and track maintenance. The goal in using the multi-dimensional assignment algorithm is to provide improved performance while minimizing the amount of processing required. Typically, track initiation will benefit from more frames of reports than will track maintenance. Thus, a second approach that integrates track initiation and track maintenance is discussed hereinafter, wherein the number of frames of reports is not the same for these two functions. This is a novel approach that is introduced in this paper.

III.2.3. Multiple Sensor Processing

There are many advantages and many ways of combining data from multiple sensors. There are also many ways of categorizing the different algorithmic architectures for processing data from multiple sensors. One approach outlines four generic algorithmic architectures (O. E. Drummond. Multiple sensor tracking with multiple frame, probabilistic data association. In *Signal and Data Processing of Small Targets, SPIE Proceedings*, volume 2561, pages 322–336, 1995). Two of these generic architectures are especially pertinent to this paper and are summarized briefly.

In the Centralized Fusion algorithmic architecture, reports are combined from the various sensors to form global tracks. This algorithmic architecture is also called Central Level Tracking, Centralized Algorithmic Architecture, or simply the Type IV algorithmic architecture. In track maintenance, for example, if a single frame data association is used, then for data association a frame of reports from one sensor is processed with the latest global tracks; then the global tracks are updated by the filter function. After the processing of this frame of reports is completed, a frame of the reports from another (or the same) sensor is processed with these updated global tracks. This process is continued as new frames of data become available to the system as a whole.

In Centralized Fusion, using the multi-dimensional assignment algorithm for the data association with multiple sensors is similar to the processing of data from a single sensor. Instead of using multiple frames of reports from a single sensor, the multiple frames of reports come from multiple sensors. The frames of reports from all the sensors are ordered based on the nominal time each frame of reports is obtained and independent of which sensor provided the reports. In this way the approaches discussed in this paper can be extended to process reports from multiple sensors using the Centralized Fusion algorithmic architecture.

The second pertinent algorithmic architecture is Track Fusion. This approach is also called the Hierarchical or Federated algorithmic architecture, sensor level tracking or simply the Type II algorithmic architecture. In track maintenance, for example, a processor for each sensor computes single sensor tracks; these tracks are then forwarded to the global tracker to compute global tracks based on data from all sensors.

After the first time a sensor processor forwards tracks to the global tracker, then subsequent tracks for the same targets are cross-correlated with the existing global tracks. This track-to-track cross-correlation is due to the common history of the current sensor tracks and the tracks from the same sensor that were forwarded earlier to the global tracker. The processing must take this cross-correlation into account and there are a number of ways of compensating for this cross-correlations. One method for dealing with this cross-correlation is to decorrelate the sensor tracks that are sent to the global tracker. There are a variety of ways to achieve this decorrelation and some are summarized in recent paper (O. E. Drummond. Feedback in track fusion without process noise. In *Signal and Data Processing of Small Targets, SPIE Proceedings*, volume 2561, pages 369–383, 1995).

Once the sensor tracks are decorrelated they can be processed by the global tracker in almost the same way as reports are processed. In the case of track fusion the association process is referred to as track (or track-to-track) association rather than data (or report-to-track) association. If the sensor tracks are decorrelated, the global tracker can process the tracks from the various sensor processors in much the same way that the global tracker of Centralized Fusion processes reports. Accordingly the methods described in this paper can be readily extended to processing data from multiple sensors using either the Centralized Fusion or Track Fusion or even a hybrid combination of both algorithmic architectures.

III.3. Formulation of the Data Association Problem

The goal of this section is to briefly outline the probabilistic framework for the data association problems presented in this work. The technical details are presented elsewhere (A. B. Poore. Multidimensional assignment formulation of data association problems arising from multitarget tracking and multisensor data fusion. *Computational Optimization and Applications*, 3;27–57, 1994). The data association problems for multisensor and multitarget tracking considered in this work are generally posed (A. B. Poore. Multi-dimensional assignment formulation of data association problems arising from multitarget tracking and multisensor data fusion. *Computational Optimization and Applications*, 3:27–57, 1994) as that of maximizing the posterior probability of the surveillance region (given the data) according to $$\text{Maximize } \{P(\gamma=\gamma|Z^{N+1})|\gamma\in\Gamma^*\}, \tag{3.1}$$

where $Z^{N+1}$ represents N+1 data sets, $\gamma$ is a partition of indices of the data (and thus induces a partition of the data), $\Gamma^*$ is the finite collection of all such partitions, $\Gamma$ is a discrete random element defined on $\Gamma^*$, and $P(\Gamma=\gamma|Z^{N+1})$ is the posterior probability of a partition y being true given the data $Z^{N+1}$. The term partition is defined below; however, this framework is currently sufficiently general to cover set packings and coverings.

Consider N+1 data sets Z(k)(k=1, . . . ,N+1), each consisting of $M_k$ actual reports and a dummy report $z_0^k$, and let denote the cumulative data set defined by $$Z(k)=\{z_{i_k}^k\}_{i_k=0}^{M_k} \text{ and } Z^{N+1}=\{Z(1), \ldots ,Z(N+1),\} \quad (3.2)$$

respectively. (The dummy report $z_0^k$ serves several purposes in the representation of missing data, false reports, initiating tracks, and terminating tracks (A. B. Poore. Multidimensional assignment formulation of data association problems arising from multitarget tracking and multisensor data fusion. *Computational Optimization and Applications*, 3:27–57, 1994).) In multisensor data fusion and multitarget tracking the data sets Z(k) may represent different classes of objects, and each data set can arise from different sensors. For track initiation the objects are reports that must be partitioned into tracks and false alarms. In our formulation of track maintenance, which uses a moving window, one data set will be tracks and remaining data sets will be reports which are assigned to existing tracks, as false reports, or to initiating tracks.

We specialize the problem to the case of set partitioning (A. B. Poore. Multidimensional assignment formulation of data association problems arising from multitarget tracking and multisensor data fusion. *Computational Optimization and Applications*, 3:27–57, 1994) defined in the following way. Define a "track of data" as $\{z_{i_1}^1, \ldots , z_{i_{N+1}}^{N+1}\}$ where each $i_k$ can assume zero or nonzero values. A partition of the data will refer to a collection of tracks of data wherein each report occurs exactly once in one of the tracks of data and such that all data is used up; the occurrence of dummy report is unrestricted. The reference partition $\gamma^\circ$ is that in which all reports are declared to be false.

Next, under appropriate independence assumptions one can show (A. B. Poore. Multidimensional assignment formulation of data association problems arising from multitarget tracking and multisensor data fusion. *Computational Optimization and Applications*, 3:27–57, 1994)

$$\frac{P(\Gamma=\gamma|Z^{N+1})}{P(\Gamma=\gamma^0|Z^{N+1})} \equiv L\gamma \equiv \prod_{(i_1\ldots i_{N+1})\in\gamma} L_{i_1\ldots i_{N+1}}, \quad (3.3)$$

$L_{i_1\ldots i_{N+1}}$ is a likelihood ratio containing probabilities for detection, maneuvers, and termination as well as probability density functions for report errors, track initiation and termination. Define $$c_{i_1\ldots i_{N+1}} = -\ln L_{i_1\ldots i_{N+1}}, \quad (3.4)$$

$$z_{i_1\ldots i_{N+1}} = \begin{cases} 1, \text{ if } (z_{i_1\ldots i_{N+1}}) \text{ are assigned to as a track,} \\ 0, \text{ otherwise.} \end{cases}$$

Then, recognizing that $$-\ln\left[\frac{P(\Gamma=\gamma|Z^{N+1})}{P(\Gamma=\gamma^0|Z^{N+1})}\right] = \sum_{(i_1,\ldots,i_{N+1})\in\gamma} c_{i_1\ldots i_{N+1}},$$

the problem (3.1) can be expressed as the (N+1)-dimensional assignment problem $$\text{Minimize} \sum_{i_1=0}^{M_1} \ldots \sum_{i_{N+1}=0}^{M_{N+1}} c_{i_1\ldots i_{N+1}} z_{i_1\ldots i_{N+1}} \quad (3.5)$$

$$\text{Subject To} \sum_{i_2=0}^{M_2} \ldots \sum_{i_{N+1}=0}^{M_{N+1}} z_{i_1\ldots i_{N+1}} = 1, i_1 = 1, \ldots, M_1,$$

$$\sum_{i_1=0}^{M_1} \ldots \sum_{i_{k-1}=0}^{M_{k-1}} \sum_{i_{k+1}=0}^{M_{k+1}} \ldots \sum_{i_{N+1}=0}^{M_{k+1}} z_{i_1\ldots i_{N+1}} = 1$$

for $i_k = 1, \ldots, M_k$ and $k = 2, \ldots, N$, $$\sum_{i_1=0}^{M_1} \ldots \sum_{i_{N+1-1}=0}^{M_N} z_{i_1\ldots i_{N+1}} = 1,$$

$i_{N+1} = 1, \ldots, M_{N+1},$ $z_{i_1\ldots i_{N+1}} \in \{0, 1\}$ for all $i_1, \ldots, i_{N+1}$, where $c_{0\ldots 0}$ is arbitrarily defined to be zero. Here, each group of sums in the constraints represents the fact that each non-dummy report occurs exactly once in a "track of data." One can modify this formulation to include multi-assignments of one, some, or all the actual reports. The assignment problem (3.5) is changed accordingly. For example, if $z_{i_k}^k$ is to be assigned no more than, exactly, or no less than $n_{i_k}^k$ times, then the "=1" in the constraint (3.5) is changed to "$\leq$, =, $\geq 0$ $n_{i_k}^k$," respectively. In making these changes, one must pay careful attention to the independence assumptions, which need not be valid in many applications. Expressions for the likelihood ratios can be found in the work of (A. B. Poore. Multidimensional assignments and multitarget tracking, partitioning data sets, I. J. Cox, P. Hansen, and B. Julesz, editors. *DIMACS Series in Discrete Mathematics and Theoretical Computer Science*, American Mathematical Society, Providence, R.I., 19:169–198, 1995) and the references therein.

III.4. Track Initiation and Maintenance

In this section we explain two multiframe assignment formulations to the track initiation and maintenance problem. The continued use of all prior information is computationally intensive for tracking, so that a window sliding over the frames of reports is used as the framework for track maintenance and track initiation within the window. The objectives are to describe an improved version of a simple method and then to put this into a more general framework in which track initiation and maintenance have different length moving windows.

III.4.1. The First Approach to Track Maintenance and Initiation

The first method as explained in this section is an improved version of our first track maintenance scheme (A. B. Poore. Multidimensional assignment formulation of data association problems arising from multitarget tracking and multisensor data fusion. *Computational Optimization and Applications*, 3:27–57, 1994) and uses the same window length for track initiation and maintenance after the initialization step. The process is to start with a window of length N+1 anchored at frame one. In the first step there is only one track initiation in that we assume no prior existing tracks. In the second and all subsequent frames, there is a window of length N anchored at frame k plus a collection of tracks up to frame k. This window is denoted by $\{k, k+1, \ldots, k+N\}$. The following explanation of the steps is much like mathematical induction in that we explain the first step and then step k to step k+1.

Track Maintenance and Initiation: Step 1.
Let $$\{i_1(l_2),i_2(l_2), \ldots ,i_N(l_2),i_{N+1}(l_2)\}_{l_2=1}^{L_2} \quad (3.6)$$

be an enumeration of all those zero-one variables in the solution of the assignment problem (3.5) (i.e., $z_{i_1 i_2 \ldots i_{N+1}}=1$) excluding all the false reports in the solution (i.e., all those zero-one variables with exactly one nonzero index) and zero-one variables in the solution for which $(i_1,i_2)=(0,0)$. (The latter can correspond to tracks that initiate on frames three and higher.) These denote our initial tracks.

Consider only the first two index sets in this enumeration (3.6) and add the zero index $l_2=0$ with the corresponding values of $i_1$ and $i_2$ being zero. Thus, the enumeration is now $\{i_1(l_2),i_2(l_2)\}_{l_2=0}^{L_2}$. The notation $T_2(l_2)=(z_{i_1(l_2)},z_{i_2(l_2)})$ will be used for this pairing. Suppose now that the next data set, i.e., the $(N+2)^{th}$ set, is added to the problem.

To explain the costs for the new problem, one starts with the hypothesis that a partition $\gamma \in \Gamma^*$ being true is now conditioned on the truth of the pairings on the first two frames being correct. Corresponding to the sequence $\{T_2(l_2),z_{i_3}, \ldots ,z_{i_{N+2}}\}$, the likelihood function is then given by $$L_\gamma \equiv \prod_{\{T_2(l_2),z_{i_3},\ldots z_{i_{N+2}}\} \in \gamma} L_{l_2 i_3 \ldots i_{N+2}}, \text{ where} \quad (3.7)$$

$$L_{l_2 i_3 \ldots i_{N+2}} \equiv L_{T_2(l_2)} L_{z_{i_3},\ldots ,z_{i_{N+2}}},$$

$$L_{T_2(0)} = 1.$$

Next, define the cost and the corresponding zero-one variable $$c_{l_2 i_3 \ldots i_{N+2}} = -\ln L_{l_2 i_3 \ldots i_{N+2}}, \quad (3.8)$$

$$z_{l_2 i_3 \ldots i_{N+2}} = \begin{cases} 1, & \text{if } \{z_{i_3}^3, \ldots , z_{i_{N+2}}^{N+2}\} \text{ is assigned to Track } T_2(l_2), \\ 0, & \text{otherwise,} \end{cases}$$

respectively. Then the track maintenance problem Maximize $\{L_\gamma | \gamma \in \Gamma^*\}$ can be formulated as the following multidimensional assignment $$\text{Minimize} \sum_{l_2=0}^{L_2} \sum_{i_3=0}^{M_3} \ldots \sum_{i_{N+2}=0}^{M_{N+2}} c_{l_2 i_3 \ldots i_{N+2}} z_{l_2 i_3 \ldots i_{N+2}} \quad (3.9)$$

Subject to: $\sum_{i_3=0}^{M_3} \ldots \sum_{i_{N+2}=0}^{M_{N+2}} z_{l_2 i_3 \ldots i_{N+2}} = 1, l_2 = 1, \ldots , L_2,$ $$\sum_{l_2=0}^{L_2} \sum_{i_4=0}^{M_4} \ldots \sum_{i_{N+2}=0}^{M_{N+2}} z_{l_2 i_3 \ldots i_{N+2}} = 1, i_3 = 1, \ldots , M_3,$$

$$\sum_{l_2=0}^{L_2} \sum_{i_3=0}^{M_3} \ldots \sum_{i_{p-1}=0}^{M_{p-1}} \sum_{i_{p+1}=0}^{M_{p+1}} \ldots \sum_{i_{N+2}=0}^{M_{N+2}} z_{l_2 i_3 \ldots i_{N+2}} = 1,$$

for $i_p = 1, \ldots , M_p$ and $p = 4, \ldots , N+2-1,$ $$\sum_{i_3=0}^{M_3} \ldots \sum_{i_{N+2-1}}^{M_{N+2-1}} z_{l_2 i_3 \ldots i_{N+2}} = 1, i_{N+2} = 1, \ldots , M_{N+2}$$

$$z_{l_2 i_3 \ldots i_{N+2}} \in \{0, 1\} \text{ for all } l_2, i_3, \ldots , i_{N+2}$$

Track Maintenance and Initiation: Step k. At the beginning of the $k^{th}$ step, we solve the following $(N+1)$-dimensional assignment problem.

$$\text{Minimize} \sum_{l_k=0}^{L_k} \sum_{i_{k+1}=0}^{M_{k+1}} \ldots \sum_{i_{k+N}=0}^{M_{k+N}} c_{l_k i_{k+1} \ldots i_{k+N}} z_{l_k i_{k+1} \ldots i_{k+N}} \quad (3.10)$$

Subject to: $\sum_{i_{k+1}=0}^{M_{k+1}} \ldots \sum_{i_{k+N}=0}^{M_{k+N}} z_{l_k i_{k+1} \ldots i_{k+N}} = 1, l_k = 1, \ldots , L_k,$ $$\sum_{l_k=0}^{L_k} \sum_{i_{k+2}=0}^{M_{k+2}} \ldots \sum_{i_{k+N}=0}^{M_{k+N}} z_{l_k i_{k+1} \ldots i_{k+N}} = 1,$$

$$i_{k+1} = 1, \ldots M_{k+1},$$

$$\sum_{l_k=0}^{L_k} \sum_{i_{k+1}=0}^{M_{k+1}} \ldots \sum_{i_{p-1}=0}^{M_{n-1}} \sum_{i_{p+1}=0}^{M_{n+1}} \ldots \sum_{i_{k+N}=0}^{M_{k+N}} z_{l_k i_{k+1} \ldots i_{k+N}} = 1$$

for $i_p = 1, \ldots , M_p$ and $p = k+2, \ldots , N+k-1,$ $$\sum_{L_k=0}^{L_k} \sum_{i_{k+1}=0}^{M_{k+1}} \ldots \sum_{i_{k+1+N-2}=0}^{M_{k+1+N-2}} z_{l_k i_{k+1} \ldots i_{k+N}} = 1,$$

$$i_{k+N} = 1, \ldots , M_{k+N},$$

$$z_{l_k i_{k+1} \ldots i_{k+N}} \in \{0, 1\} \text{ for all } l_k, i_{k+1}, \ldots , i_{k+N},$$

where for the first step $l_1$ and $L_1$ are replaced by $i_1$ and $M_1$, respectively. The first index $l_k$ in the subscripts corresponds to the sequence of tracks $\{T_k(l_k)\}_{l_k=0}^{L_k}$, where $T_k(l_k)=\{z_{i_k}^1(l_k), \ldots , z_{i_k}^k(l_k)\}$ is a track of data from the solution of the problem prior to the formulation of (3.10). If k=1, then it is just the first data set in frame one.

Basic Assumption. Suppose problem (3.10) has been solved and let the solution, i.e., those zero-one variables equal to one, be enumerated by $$\{(l_k(l_{k+1}),i_{k+1}(l_{k+1}), \ldots ,i_{k+N}(l_{k+1}))\}_{l_{k+1}=1}^{L_{k+1}} \quad (3.11)$$

with the following exceptions.
 a. All zero-one variables for which $(l_k,i_{k+1})=(0,0)$ are excluded. Thus, tracks that initiate on frames after the $(k+1)^{th}$ are not included in the list.
 b. All zero-one variables whose subscripts have the form $l_k=0$ and exactly one nonzero index in the remaining indices $\{i_{k+1}, \ldots ,i_{k+N}\}$ are excluded. These correspond to false reports on frames $p=k+1, \ldots ,k+N$.
 c. All variables $z_{l_k i_{k+1} \ldots i_{k+N}}$ for which $(i_{k+1}, \ldots ,i_{k+N})=(0,0, \ldots ,0)$ and $l_k(l_k)=0$ are excluded from (1.11). In other words, the reports on the last N+1 frames in the $\{T_k(l_k),z_{i_{k+1}}^{k+N}, \ldots ,z_{i_{k+N}}^{k+N}\}$ are all dummy. Any solution with this feature corresponds to a terminated track.

Given the enumeration (3.11), one now fixes the assignments on the first two index sets in the list (3.11). The zero index $l_{k+1}=0$ is added to the enumeration to specify $(l_k(0),i_{k+1}(0))=(0,0)$ that is used to represent false reports and tracks that initiate on frame k+2 or later, so that the enumeration (3.11) is now $\{(l_k(l_{k+1}),i_{k+1}(l_{k+1}))\}_{l_{k+1}=0}^{L_{k+1}}$.

Then, for $l_{k+1}=1, \ldots ,L_{k+1}$, the $l_{k+1}^{th}$ such track is denoted by $T_{k+1}(l_{k+1})=\{T_k(l_k(l_{k+1})),z_{i_{k+1}}^{k+1}(l_{k+1})\}$ and the $(N+1)$-tuple $\{T_{k+1}(l_{k+1}), z_{i_{k+2}}^{k+2}, \ldots ,z_{i_{k+1+N}}^{k+1+N}\}$ will denote a track $T_{k+1}(l_{k+1})$ plus a set of reports $\{i_{k+2}^{k+2}, \ldots ,z_{i_{k+1+N}}^{k+1+N}\}$, actual or dummy, that are feasible with the track $T_{k+1}(l_{k+1})$. The $(N+1)$-tuple $\{T_{k+1}(0),z_{i_{k+2}}^{k+2}, \ldots ,z_{i_{k+1+N}}^{k+1+N}\}$ will denote a track that initiates in the sliding window, i.e., on subsequent frames. A false report in the sliding window is one with all but one non-zero index $i_p$ for some p=k+2, ... ,k+1+N in the (N+1)-tuple $\{T_{k+1}(0), z_{i_{k+2}}^{k+2}, \ldots, z_{i_{k+1+N}}^{k+1+N}\}$.

The corresponding hypothesis about a partition $\gamma \in \Gamma^*$ being true is now conditioned on the truth of the $L_{k+1}$ tracks existing at the beginning of the N-frame window. (Thus the assignments prior to this sliding window are fixed.) The likelihood function is given by $$L_\gamma = \prod_{\{T_{k+1}(l_{k+1}), z_{i_{k+2}}, \ldots, z_{i_{k+1+N}}\} \in \gamma} L_{l_{k+1} i_{k+2} \cdots i_{k+1+N}}, \text{ where} \quad (3.12)$$

$$L_{l_{k+1} i_{k+2} \cdots i_{k+1+N}} = L_{T_{k+1}(l_{k+1})} L_{z_{i_{k+2}}^{k+2} \cdots z_{i_{k+1+N}}^{k+1+N}},$$

Next, define the cost and the zero-one variable by $$c_{l_{k+1} i_{k+2} \cdots i_{k+1+N}} = \qquad (3.13)$$
$$-\ln L_{l_{k+1} i_{k+2} \cdots i_{k+1+N}} \equiv -\ln L_{T_{k+1}(l_{k+1}) z_{i_{k+2}} \cdots z_{i_{k+1+N}}},$$

$$z_{l_{k+1} i_{k+2} \cdots i_{k+1+N}} = \begin{cases} 1, & \text{if } \{z_{i_{k+2}}^{k+2}, \ldots, z_{i_{k+1+N}}^{k+1+N}\} \text{ is assigned to } T_{k+1}(l_{l+1}), \\ 0, & \text{otherwise,} \end{cases}$$

respectively, so that the track extension problem, which was originally formulated as Maximize $\{L_\gamma | \gamma \in \Gamma^*\}$, can be expressed as exactly the same multi-dimensional assignment in (3.4) with k replaced by k+1. Thus, we do not repeat it here.

III.4.2. The Second Approach to Track Maintenance and Initiation

In the first approach the window lengths were the same for both track maintenance and initiation. This can be inefficient in that one can usually use a shorter window for track maintenance than for track initiation. This section addresses such a formulation.

The Ceneral Step k. To formulate a problem for track initiation and maintenance we consider a moving window centered as frame k of length I+J+1 denoted by [k–I, ... , k, ... ,k+J]. In this representation, the window length for track maintenance is J and that for initiation, I+J+1. The objective will be to explain the situation at this center and then the move to the same length window at center k+1 denoted by [k+1–I, ... ,k+1, ... ,k+1+J], i.e., by moving the window to the right one frame at time. The explanation from the first step follows hereinafter.

The notation for a track of data is $$T_k(l_k) = \{z_{i_1(l_k)}^1, \ldots, z_{i_p(l_k)}^p, \ldots, z_{i_k(l_k)}^k\}, \qquad (3.14)$$

where the index $l_k$ is used for an enumeration of those reports paired together. We also use the notation $T_{p,k}(l_k)$ to denote the sequence of reports belonging to track $T_k(l_k)$ but restricted to frames prior to and including p. Thus $$T_k(l_k) = T_{k,k}(l_k),$$

$$T_{p,k}(l_k) = \{z_{i_1(l_k)}^1, \ldots, z_{i_p(l_k)}^p\},$$

$$T_{k,k}(l_k) = T_{p,k}(l_k) \cup \{z_{i_{p+1}(l_k)}^{p+1}, \ldots, z_{i_{k-1}(l_k)}^{k-1}, z_{i_k(l_k)}^k\} \text{ for any } p \leq k-1,$$

Given this notation for the tracks and partition of the data in the frames $\{k-I, \ldots, k, \ldots, k+J\}$, $L_{T_{p,k}(l_k)}$ will denote the accumulated likelihood ratio up to and including frame $p(p \leq k)$ for a track that is declared as existing on frame k as a solution of the assignment problem. In this notation, the likelihood for $T_{p,k}(l_k)$ and that of the association of $\{z_{i_{k+1}}^{k+1}, \ldots, z_{i_{k+N}}^{k+N}\}$ with track $T_k(l_k)$ is given by $$L_{T_k(l_k)} = L_{T_{p,k}(l_k)} L_{i_{p+1}(l_k) \cdots i_k(l_k)} \text{ for any } p \leq k-1,$$

$$L_{T_k(l_k) i_{k+1} \cdots i_{k+N}} = L_{T_{p,k}(l_k)} L_{i_{p+1}(l_k) \cdots i_k(l_k) i_{k+1} \cdots i_{k+N}} \text{ for any } p \leq k-1,6)$$

respectively.

The cost for the assignment of $\{z_{i_{k+1}}^{k+1}, \ldots, z_{i_{k+N}}^{k+N}\}$ to track $T_k(l_k)$ and the corresponding zero-one variable are given by $$c_{l_k i_{k+1} \cdots i_{k+J}}^T = -\ln[L_{T_k(l_k)} L_{i_{k+1} \cdots i_{k+J}}] \qquad (3.17)$$
$$= -\ln[L_{T_{p,k}(l_k)} L_{i_{p+1}(l_k) \cdots i_k(l_k) i_{k+1} \cdots i_{k+J}}] \text{ and}$$

$$z_{l_k i_{k+1} \cdots i_{k+J}}^T = \begin{cases} 1, & \text{if } \{z_{i_{k+1}}^{k+1}, \ldots, z_{i_{k+N}}^{k+N}\} \text{ is assigned to track } T_k(l_l), \\ 0, & \text{otherwise,} \end{cases}$$

respectively. Likewise, for costs associated with the false reports on the frames k–I to k and as associated with $\{z_{i_{k+1}}^{k+1}, \ldots, z_{i_{k+J}}^{k+J}\}$ and the corresponding zero-one variables are given by:

$$c_{i_{k-I} \cdots i_k i_{k+1} \cdots i_{k+J}}^F = -\ln[L_{i_{k-I} \cdots i_k i_{k+1} \cdots i_{j+J}}] \qquad (3.18)$$

$$c_{i_{k-I} \cdots i_k i_{k+1} \cdots i_{k+J}}^F = \begin{cases} 1, & \text{if } \{z_{i_{k-I}}, \ldots, z_{i_k}, i_{k+1}, \ldots, i_{k+J}\} \\ & \text{are assigned as a track,} \\ 0, & \text{otherwise.} \end{cases}$$

For the window of frames in the range $\{k-I, \ldots, k\}$, the easiest explanation of the partition of the reports is based on the definitions $$T_{p,k} = \begin{cases} i_p \mid z_{i_p}^p \text{ belongs to one of the tracks} \\ \text{listed on frame } k, \text{ i.e., to one} \\ \text{of the } T_k(l_k) \text{ for some } l_k = 1, \ldots, l_k \end{cases}, \qquad (3.19)$$

$$F_{p,k} = (\{1, \ldots, M_p\} \setminus T_{p,k}) \cup \{0\},$$

so that all of those reports not used in the tracks $T_k(l_k)$ on frame p are put into the set of available reports $F_{p,k}$ for the formation of tracks over the entire window. Thus, we formulate the assignment problem as Minimize $\qquad (3.20)$ $$\sum_{p=k-I}^{k} \sum_{i_p \in F_{p,k}} \sum_{r=k+1}^{k+J} \sum_{i_r=0}^{M_r} c_{i_{k-I} \cdots i_k i_{k+1} \cdots i_{k+J}}^F z_{i_{k-I} \cdots i_k i_{k+1} \cdots i_{k+J}}^F +$$

$$\sum_{l_k=1}^{L_k} \sum_{r=k+1}^{k+J} \sum_{i_r=0}^{M_r} c_{l_k i_{k+1} \cdots i_{k+J}}^T z_{l_k i_{k+1} \cdots i_{k+J}}^T$$

Subject To $\sum_{\{p=k-I,p\neq q\}} \sum_{i_p \in F_{p,k}} \sum_{r=k+1}^{k+J} \sum_{i_r=0}^{M_r} z^F_{i_{k-I}\cdots i_k i_{k+1}\cdots i_{k+J}} = 1$ for $i_q \in F_{p,k} \setminus \{0\}$ and $q = k - I, \ldots, k,$ $\sum_{p=k-I}^{k} \sum_{i_p \in F_{p,k}} \sum_{\{r=k+1, r\neq q\}}^{k+J} \sum_{i_q=0}^{M_r} z^F_{i_{k-I}\cdots i_k i_{k+1}\cdots i_{k+J}} = 1$ for $i_q = 1, \ldots, M_q$ and $q = k+1, \ldots, k+J,$ $z_{i_{k-I}\cdots i_k i_{k+1}\cdots i_{k+J}} \in \{0, 1\}$ for all $i_{k-I}, \ldots, i_k, i_{k+1}, \ldots, i_{k+J},$ $\sum_{r=k+1}^{k+J} \sum_{i_r=0}^{M_r} z^T_{l_k i_{k+1}\cdots i_{k+J}} = 1, l_k = 1, \ldots, L_k,$ $\sum_{l_k=1}^{L_k} \sum_{\{r=k+1, r\neq q\}}^{k+J} \sum_{i_r=0}^{M_r} z^T_{l_k i_{k+1}\cdots i_{k+J}} = 1, l_q = 1, \ldots, M_q$ for $q = k+1, \ldots, k+J,$ $z_{l_k i_{k+1}\cdots i_{k+J}} \in \{0, 1\}$ for all $l_k \geq 1, i_{k+1}, \ldots, i_{k+J}.$ Basic Assumptions. Suppose problem (1.20) has been solved and let the solution, i.e. those zero-one variables equal to one, be enumerated by $\{z_{l_k(l_{k+1})i_{k+1}(l_{k+1})\cdots i_{k+J}(l_{k+1})}^T\}_{l_{k+1}=1}^{\tilde{L}_{k+1}},$ $\{z_{i_{k-I}(l_{k+1})\cdots i_k(l_{k+1})i_{k+1}(l_{k+1})\cdots i_{k+J}(l_{k+1})}^F\}_{l_{k+1}=\tilde{L}_{k+1}+1}^{L_{k+1}}$ (3.21)

with the following exceptions.

a. All zero-one variables in the second list for which $(i_{k-I}, \ldots, i_k, i_{k+1}) = (0, \ldots, 0, 0)$ are excluded. Thus, tracks that initiate on frames after the $(k+1)^{th}$ are not included in the list.

b. All false reports are excluded, i.e., all zero-one variables in the second list whose subscripts have exactly one nonzero index.

c. All variables $z_{l_k i_{k+1} \cdots i_{k+N}}^T$ for which $(i_{k+1}, \ldots, i_{k+N}) = (0, 0, \ldots, 0)$ and $Z(p) \cap T_k(l_k) = 0$ for $p = k-K, \ldots, k$ where $K \geq 0$ is user specified. Thus the track $T_k(l_k)$ is terminated if it is not observed over $K+J+1$ frames.

Given the enumeration (3.20), one now fixes the assignments on the all index sets up to and including the $(k+1)^{th}$ index sets.

$$T_{k+1}(l_{k+1}) = \begin{cases} (T_k(l_k(l_{k+1})), z^{k+1}_{i_{k+1}}(l_{k+1})) \\ \text{for } l_{k+1} = 1, \ldots, \tilde{L}_{k_{1+1}}, \\ (z^{k-I}_{i_{k-I}(l_{k+1})}, \ldots, z^k_{i_k(l_{k+1})}, z^{k+1}_{i_{k+1}(l_{k+1})}) \\ \text{for } l_{k+1} = \tilde{L}_{k+1} + 1, \ldots, L_{k+1}. \end{cases}$$ (3.22)

Thus one can now formulate the assignment problem for the next problem exactly as in (3.20) but with k replaced by k+1. Thus, we do not repeat it here.

The Initial Step. Here is one explanation for the initial step. First, assume that N=I+J. In this case, we start the track initiation with a solution of (3.5). Let $\{i_1(l_2), i_2(l_2), \ldots, i_N(l_2), i_{N+1}(l_2)\}_{l_2=0}^{L_2}$ be an enumeration of the solution set of (3.5), i.e., those zero-one variables $z_{i_1(l_2)i_2(l_2)\cdots i_{N+1}(l_2)}=1$, including $z_{00\ldots 0}=1$ corresponding to $l_2=0$, but excluding all those zero-one variables that are assigned to one and correspond to false reports (i.e., there is exactly one nonzero index in the subscript of $z_{i_1 i_2 \ldots i_{N+1}}$), all those zero-one variables that are assigned to one and correspond to tracks that initiate on frames higher than I+2. Then we fix the data association decisions corresponding to the reports in our list of tracks prior to and including frame k+1=I+2. This defines the k for problem (3.5) and one can then continue the development by adding a frame to the window as in the general case.

If I+J>N, then one possibility is to start the process with N+1 frames, and assuming J≦N, proceed as before replacing I by N-J for the moment, and continue to add frames without lopping off the first frame in the window until reaches a window of length I+J+1. Then we proceed as in the previous paragraph.

If I+J<N, then one can solve the track initiation problem (3.5), formulate the problem with the center of the window at k+1=N+1-J, enumerate the solutions as above, and lop off the first N-J-I frames. Then, we proceed just as in the case I+J=N.

III.5. CONCLUDING COMMENTS

A primary objective in this work has been to demonstrate how multidimensional assignment problems arise in the tracking environment. The problem of track initiation and maintenance has been formulated within the framework of a moving window over the frames of data. The solution of these NP-hard, noisy, large scale, and sparse problems to the noise level in the problem is fundamental to superior track estimation and identification. Thus, one must utilize the special structure in the problems as well take advantage of special information that is available. Since these moving windows are overlapping, there are some algorithm efficiencies that can be identified and that take advantages of the overlap in the windows from one frame of reports to the next. Here is an example of the use of a primal solution of one problem to warm start the solution of the next problem in the sequence.

Suppose we have solved problem (3.10) and have enumerated all those zero-one variables in the solution of (3.10) as in (3.11). Add the zero index $l_{k+1}=0$ so that the enumeration is $\{(l_k(l_{k+1}), i_{k+1}(l_{k+1}), \ldots, i_{k+N}(l_{k+1})\}_{l_{k+1}=0}^{L_{k+1}}.$ (3.23)

With this enumeration one can define the cost by $c_{l_{k+1} i_{k+1+N}} = c_{l_k(l_{k+1}) i_{k+1}(l_{k+1}) \cdots i_{N+1}(l_{k+1}) i_{k+1+N}}$ (3.24)

and the two-dimensional assignment problem $$\phi_2 \equiv \text{Minimize} \sum_{l_{k+1}=0}^{L_{k+1}} \sum_{i_{k+1+N}=0}^{M_{k+1+N}} c^2_{l_{k+1} i_{k+1+N}} z^2_{l_{k+1} i_{k+1+N}}$$ (3.25)

$\equiv V_2(z^2)$

Subject to $\sum_{i_{k+1+N}=0}^{M_{k+1+N}} z^2_{l_{k+1} i_{k+1+N}} = 1, l_{k+1} = 1, \ldots, L_{k+1}$ $\sum_{l_{k+1}=0}^{L_{k+1}} z^2_{l_{k+1} i_{k+1+N}} = 1, i_{k+1+N} = 1, \ldots, M_{k+1+N},$ $z^2_{l_{k+1} i_{k+1+N}} \in \{0, 1\}$ for all $l_{k+1}, i_{k+1+N}.$ Let w be an optimal or feasible solution to this two-dimensional assignment problem and define $\hat{z}_{l_{k+1} \cdots i_{k+N} i_{k+1+N}} =$ (3.26)

$$\begin{cases} 1, & \text{if } (i_{k+1}, \ldots, i_{k+N}) = (i_{k+1}(l_{k+1}), \ldots, i_{k+N}(l_{k+1})) \\ & \text{and } w_{l_{k+1}i_{k+1+N}} = 1 \text{ for some } l_{k+1} = 1, \ldots, L_{k+1} \\ & \text{or if } (l_{k+1}, i_{k+1+N}) = (0, 0) \\ 0, & \text{otherwise.} \end{cases}$$

This need not satisfy the constraints in that there are usually many objects left unassigned. Thus, one can complete the assignment by using the zero-one variables in (3.10) with k replaced by k+1 with exactly one nonzero index corresponding to any unassigned object or data report.

For the dual solutions, the multipliers arising from the solution of the two-dimensional assignment problem (3.25) corresponding to the second variable, i.e., $\{u_{i_{k+1+N}}^{k+1+N}\}_{i_{k+1+N}=1}^{M_{k+1+N}}$. These are good initial values to use in a relaxation scheme (A. B. Poore and N. Rijavec. Partitioning multiple data sets: multidimensional assignments and Lagrangian relaxation, in quadratic assignment and related problems; P. M. Pardalos and H. Wolkowicz, editors, *DIMACS series in Discrete Mathematics and Theoretical Computer Science*, 16:25–37, 1994; A. J. Robertson III. A class of lagrangian relaxation algorithms for the multidimensional assignment problem. *Ph.D. Thesis*, Colorado State University, Fr. Collins, CO, 1995). Finally, note that one can also develop a warm start for problem (3.20) in a similar fashion.

IV. Review of New Relaxation Schemes

IV.1. Introduction

Multidimensional assignment problems govern the central problem of data association in multisensor and multitarget tracking, i.e., the problem of partitioning observations from multiple scans of the surveillance region and from either single or multiple sensors into tracks and false alarms. This fundamental problem can be stated as (A. B. Poore. Multidimensional assignments and multitarget tracking, partitioning data sets, I. J. Cox, P. Hansen, and B. Julesz, editors, *DIMACS Series in Discrete Mathematics and Theoretical Computer Science, American Mathematical Society*, Providence, R.I., 19:169–198, 1995; A. B. Poore. Multidimensional assignment formulation of data association problems arising from multitarget tracking and multisensor data fusion. *Computational Optimization and Applications*, 3;27–57, 1994)

$$\text{Minimize } \sum_{i_1=0}^{M_1} \cdots \sum_{i_N=0}^{M_N} c_{i_1 \ldots i_N} z_{i_1 \ldots i_N} \quad (4.1)$$

$$\text{Subject to: } \sum_{i_2=0}^{M_2} \cdots \sum_{i_N=0}^{M_N} z_{i_1 \ldots i_N} = 1, i_1 = 1, \ldots, M_1,$$

$$\sum_{i_1=0}^{M_1} \cdots \sum_{i_{p-1}=0}^{M_{n-1}} \sum_{i_{p+1}=0}^{M_{n+1}} \cdots \sum_{i_N=0}^{M_N} z_{i_1 \ldots i_N} = 1$$

for $i_p = 1, \ldots, M_p$ and $p = 2, \ldots, N-1$, $$\sum_{i_1=0}^{M_1} \cdots \sum_{i_{n-1}=0}^{M_{N+1}} z_{i_1 \ldots i_N} = 1, i_N = 1, \ldots, M_N,$$

$$z_{i_1 \ldots i_N} \in \{0, 1\} \text{ for all } i_1, \ldots, i_N,$$

where $c_{0 \ldots 0}$ is arbitrarily defined to be zero and is included for notational convenience. One can modify this formulation to include multi-assignments of one, some, or all of the actual reports. The zero index is used in representing missing data, false alarms, initiating and terminating tracks as described in (A. B. Poore. Multidimensional assignments and multitarget tracking, partitioning data sets, I. J. Cox, P. Hansen, and B. Julesz, editors, *DIMACS Series in Discrete Mathematics and Theoretical Computer Science, American Mathematical Society*, Providence, R.I., 19:169–198, 1995; A. B. Poore. Multidimensional assignment formulation of data association problems arising from multitarget tracking and multisensor data fusion. *Computational Optimization and Applications*, 3:27–57, 1994). In these problems, we assume that all zero-one variables $z_{i_1 \ldots i_N}$ with precisely one nonzero index are free to be assigned and that the corresponding cost coefficients are well-defined. (This is a valid assumption in the tracking environment (A. B. Poore. Multidimensional assignments and multitarget tracking, partitioning data sets, I. J. Cox, P. Hansen, and B. Julesz, editors, *DIMACS Series in Discrete Mathematics and Theoretical Computer Science, American Mathematical Society*, Providence, R.I., 19:169–198, 1995; A. B. Poore. Multidimensional assignment formulation of data association problems arising from multitarget tracking and multisensor data fusion. *Computational Optimization and Applications*, 3:27–57, 1994).) Although not required, these cost coefficients with exactly one nonzero index can be translated to zero by cost shifting (A. B. Poore and N. Rijavec. A lagrangian relaxation algorithm for multidimensional assignment problems arising form multitarget tracking. *SIAM Journal of Optimization*, 3, No. 3:544–563, 1993) without changing the optimal assignment. Finally, this formulation is of sufficient generality to include the symmetric problem and the asymmetric inequality problem (A. J. Robertson III. A class of lagrangian algorithms for the multidimensional assignment problem. *Ph.D. Thesis*, Colorado State University, Fr. Collins, CO, 1995).

The data association problems in tracking that are formulated as Equation (4.1) have several characteristics. They are normally sparse, the cost coefficients are noisy and the problem is NP-hard (M. R. Galey and D. S. Johnson. *Computers and Intractability*. W.H. Freeman and Company, San Francisco, Calif., 1979), but it must be solved in real-time. The only known methods for solving this NP-hard problem optimally are enumerative in nature, with branch-and-bound being the most efficient; however, such methods are much too slow for real-time applications. Thus one must resort to suboptimal approaches. Ideally, any such algorithm should solve the problem to within the noise level, assuming, of course, that one can measure this noise level in the physical problem and that the mathematical method provides a way to decide if the criterion has been met.

There are many algorithms that can be used to construct suboptimal solutions to NP-hard combinatorial optimization problems. These include greedy (and its many variants), relaxation, simulated annealing, tabu search, genetic algorithms, and neural network algorithms (C. H. Papadimitriou and K. Steiglitz. *Combinatorial Optimization: Algorithm and Complexity*. Prentice-Hall, Inc., Englewood Cliffs, N.J., 1982; J. Pearl. *Heuristics: Intelligent Search Strategies for Computer Problem Solving*. Addison-Wesley, Reading, Mass., 1984; C. R. Reeves ed. *Modern Heuristic Techniques for Combinatorial Problems*. Halstead Press, Wiley, N.Y., 1993). For the three-dimensional assignment problem, Pierskalla (W. Pierskalla. The tri-substitution method for three-dimensional assignment problem. *Journal du CORS*, 5:71–81, 1967) developed the tri-substitution method, which is a variant of the simplex method. Frieze and Yadegar (A. M. Frieze and J. Yadegar. An algorithm for solving 3-dimensional assignment problems with application to scheduling a teaching practice. *Journal of the Operational Research Society,* 39:989–955, 1981) introduced a method based on Lagrangian relaxation in which a feasible solution is recovered using information provided by the relaxed solution. Our choice of approaches is strongly influenced by the need to balance real-time performance and solution quality. Lagrangian relaxation based methods have been used successfully in prior tracking applications (K. R. Pattipati, S. Deb, and Y. Bar-Shalom. A s-dimensional assignment algorithm for track initiation. In *Proceedings of the IEEE Systems Conference,* Kobe, Japan, pages 127–130, 1992; Y. Bar-Shalom, S. Deb, K. R. Pattipati, and H. Tsanakis. A new algorithm for the generalized multidimensional assignment problem. In *Proceedings of the IEEE International Conference on Systems, Math, and Cybernetics,* Chicago, pages 132–136, 1992; A. B. Poore and N. Rijavec. A numerical study of some data association problems arising in multitarget tracking. *Large Scale Optimization: State of the Art,* W. W. Hager, D. W. Hearn and P. M. Pardalos, editors. Kluwer Academic Publishers B. V., Boston, pages 339–361, 1994; A. B. Poore and N. Rijavec. Partitioning multiple data sets: multidimensional assignments and lagrangian relaxation. In P. M. Pardalos and H. Wolkowicz, editors, Quadratic assignment and related problems: *DIMACS Series in Discrete Mathematics and Theoretical Computer Science,* volume 16, pages 25–37, 1994; A. B. Poore and N. Rijavec. A lagrangian relaxation algorithm for multidimensional assignment problems from multitarget tracking. *SIAM Journal of Optimization,*3, No. 3:544–563, 1993). An advantage of these methods is that they provide both an upper and lower bound on the optimal solution, which can then be used to measure the solution quality. These works extend the method of Frieze and Yadegar (A. M. Frieze and J. Yadegar. An algorithm for solving 3-dimensional assignment problems with application to scheduling a teaching practice. *Journal of the Operational Research Society,* 32:989–995, 1981) to the multidimensional case.

IV.2. Probabilistic Framework for Data Association

The goal of this section is to explain the formulation of the data association problems that governs large classes of data association problems in centralized or hybrid centralized-sensor level multisensor/multitarget tracking. The presentation is brief; technical details are presented for both track initiation and maintenance in the work of (A. B. Poore. Multidimensional assignments and multitarget tracking, partitioning data sets, I. J. Cox, P. Hansen, and B. Julesz, editors, *DIMACS Series in Discrete Mathematics and Theoretical Computer Science, American Mathematical Society,* Providence, R.I., 19:169–198, 1995; A. B. Poore. Multidimensional assignment formulation of data association problems arising from multitarget tracking and multisensor data fusion. *Computational Optimization and Applications,* 3:27–57, 1994). The formulation is of sufficient generality to cover the MHT work of Reid, Blackman and Stein (S. S. Blackman. *Multiple Target Tracking with Radar Applications.* Artech House, Norwood, Mass., 1986) and modifications by Kurien (T. Kurien. Issues in the designing of practical multitarget tracking algorithms. In *Multitarget-Multisensor Tracking: Advanced Applications* by Y. Bar-Shalom. Artech House, MA, 1990) to include maneuvering targets. As suggested by Blackman (S. S. Blackman. *Multiple Target Tracking with Radar Applications.* Artech House, Norwood, Mass., 1986), this formulation can also be modified to include target features (e.g., size and type) into the scoring function. The recent work (A. B. Poore and O. E. Drummond. Track initiation and maintenance using multidimensional assignment problems. In D. W. Hearn, W. W. Hager, and P. M. Pardalos, editors, *Network Optimization,* volume 450, pages 407–422, Boston, 1996. Kluwer Academic Publishers B.V.) significantly extends the work of this section to new approaches for multiple sensor centralized tracking. Future work will involve extensions to track-to-track correlation.

The data association problems for multisensor and multitarget tracking considered in this work are generally posed as that of maximizing the posterior probability of the surveillance region (given the data) according to $$\text{Maximize } \{P(\Gamma=\gamma|Z^N)|\gamma\epsilon\Gamma^*\}, \quad (4.2)$$

where $Z^N$ represents N data sets, $\gamma$ is a partition of indices of the data (and thus induces a partition of the data), $\Gamma^*$ is the finite collection of all such partitions, $\Gamma$ is a discrete random element defined on $\Gamma^*$, and $P(\Gamma=\gamma|Z^N)$ is the posterior probability of a partition $\gamma$ being true given the data $Z^N$. The term partition is defined below; however, this framework is currently sufficiently general to cover set packings and coverings (A. B. Poore. Multidimensional assignment formulation of data association problems arising from multitarget tracking and multisensor data fusion. *Computational Optimization and Applications,* 3:27–57, 1994; A. B. Poore. Multidimensional assignments and multitarget tracking, partitioning data sets, I. J. cox, P. Hansen, and B. Julesz, editors, *DIMACS Series in Discrete Mathematics and Theoretical Computer Science, American Mathematical Society,* Providence, R.I., 19:169–198, 1995).

Consider N data sets Z(k) (k=1, . . . ,N) each of $M_k$ reports $\{z_{i_k}^k\}_{i_k=1}^{M_k}$, and let $Z^N$ denote the cumulative data set defined by $$Z(k)\{z_{i_k}^k\}_{i_k=1}^{M_k} \text{ and } Z^N=\{Z(1), \ldots, Z(N)\}, \quad (4.3)$$

respectively. In multisensor data fusion and multitarget tracking the data sets Z(k) may represent different classes of objects, and each data set can arise from different sensors. For track initiation the objects are measurements that must be partitioned into tracks and false alarms. In our formulation of track maintenance (A. B. Poore. Multidimensional assignment formulation of data association problems arising from multitarget tracking and multisensor data fusion. *Computational Optimization and Applications,* 3:27–57, 1994; A. B. Poore. Multidimensional assignments and multitarget tracking, partitioning data sets, I. J. cox, P. Hansen, and B. Julesz, editors, *DIMACS Series in Discrete Mathematics and Theoretical Computer Science, American Mathematical Society,* Providence, R.I., 19:169–198, 1995), which uses a moving window over time, one data set will be tracks and remaining data sets will be measurements which are assigned to existing tracks, as false measurements, or to initiating tracks. In sensor level tracking, the objects to be fused are tracks (S. S. Blackman. *Multiple Target Tracking with Radar Applications.* Artech House, Norwood, Mass., 1986). In centralized fusion (S. S. Blackman. *Multiple Target Tracking with Radar Applications.* Artech House, Norwood, Mass., 1986) , the objects may all be measurements that represent targets or false reports, and the problem is to determine which measurements emanate from a common source.

We specialize the problem to the case of set partitioning (A. B. Poore. Multidimensional assignment formulation of data association problems arising from multitarget tracking and multisensor data fusion. *Computational Optimization and Applications,* 3:27–57, 1994; A. B. Poore. Multidimensional assignments and multitarget tracking, partitioning data sets, I. J. cox, P. Hansen, and B. Julesz, editors, *DIMACS Series in Discrete Mathematics and Theoretical Computer Science, American Mathematical Society*, Providence, R.I., 19:169–198, 1995) defined in the following way. First, for notational convenience in representing tracks, we add a zero index to each of the index sets in Equation (4.3), a dummy report $z_0^k$ to each of the data sets $Z(k)$ in Equation (4.3), and define a "track of data" as $(z_{i_1}^1, \ldots, z_{i_N}^N)$ where $i_k$ can now assume the value of 0. A partition of the data will refer to a collection of tracks of data wherein each report occurs exactly once in one of the tracks of data and such that all data is used up; the occurrence of dummy report is unrestricted. The dummy report $z_0^k$ serves several purposes in the representation of missing data, false reports, initiating tracks, and terminating tracks (A. B. Poore. Multidimensional assignment formulation of data association problems arising from multitarget tracking and multisensor data fusion. *Computational Optimization and Applications*, 3:27–57, 1994; A. B. Poore. Multidimensional assignments and multitarget tracking, partitioning data sets, I. J. cox, P. Hansen, and B. Julesz, editors, *DIMACS Series Discrete Mathematics and Theoretical Computer Science, American Mathematical Society*, Providence, R.I., 19:169–198, 1995). The reference partition is that in which all reports are declared to be false.

Next under appropriate independence assumptions one can show (A. B. Poore. Multidimensional assignment formulation of data association problems arising from multitarget tracking and multisensor data fusion. *Computational optimization and Applications*, 3:27–57, 1994; A. B. Poore. Multidimensional assignments and multitarget tracking, partitioning data sets, I. J. cox, P. Hansen, and B. Julesz, editors, *DIMACS Series in Discrete Mathematics and Theoretical Computer Science, American Mathematical Society*, Providence, R.I., 19:169–198, 1995)

$$\frac{P(\Gamma = \gamma | Z^N)}{P(\Gamma = \gamma^0 | Z^N)} \equiv L_\gamma \equiv \prod_{(i_1 \ldots i_N) \in \gamma} L_{i_1 \ldots i_N}, \quad (4.4)$$

where $\gamma^0$ is a reference partition, $L_{i_1 \ldots i_N}$ is a likelihood ratio containing probabilities for detection, maneuvers, and termination as well as probability density functions for measurement errors, track initiation and termination. Then if $$c_{i_1 \ldots i_N} = -\ln L_{i_1 \ldots i_N},$$

$$-\ln\left[\frac{P(\Gamma = \gamma | Z^N)}{P(\Gamma = \gamma^0 | Z^N)}\right] = \prod_{(i_1 \ldots i_N) \in \gamma} c_{i_1 \ldots i_N}. \quad (4.5)$$

Using Equation (4.4) and the zero-one variable $z_{i_1 \ldots i_N} = 1$ if $(i_1, \ldots, i_N) \in \gamma$ and 0 otherwise, one can then write the problem (4.4) as the following N-dimensional assignment problem:

$$\text{Minimize} \sum_{i_1 \ldots i_N} c_{i_1 \ldots i_N} z_{i_1 \ldots i_N} \quad (4.6)$$

Subject To $\sum_{i_2 i_3 \ldots i_N} z_{i_1 \ldots i_N} = 1 \ (i_1 = 1, \ldots, M_1),$ $\sum_{i_1 i_3 \ldots i_N} z_{i_1 \ldots i_N} = 1 \ (i_2 = 1, \ldots, M_2),$ $\sum_{i_1 \ldots i_{p-1} i_{p+1} \ldots i_N} z_{i_1 \ldots i_N} = 1$ $(i_p = 1, \ldots, M_p \text{ and } p = 2, \ldots, N-1),$ $\sum_{i_1 i_2 \ldots i_{N-1}} z_{i_1 \ldots i_N} = 1 \ (i_N = 1, \ldots, M_N),$ $z_{i_1 \ldots i_N} \in \{0, 1\} \text{ for all } i_1, \ldots, i_N,$ where $c_{0 \ldots 0}$ is arbitrarily defined to be zero. Here, each group of sums in the constraints represents the fact that each-non-dummy report occurs exactly once in a "track of data." One can modify this formulation to include multi-assignments of one, some, or all the actual reports. The assignment problem Equation (4.6) is changed accordingly. For example, if $z_{i_j}^k$ is to be assigned no more than, exactly, or no less than $n_{i_k}^k$ times, then the "=1" in the constraint (4.6) is changed to $\leq$, =, $\geq n_{i_k}^k$," respectively. Modifications for group tracking and multi-resolution features of the surveillance region will be addressed in future work. In making these changes, one must pay careful attention to the independence assumptions that need not be valid in many applications.

Expressions for the likelihood ratios $L_{i_1, \ldots, i_N}$ can be found in the work of Poore (A. B. Poore. Multidimensional assignment formulation of data association problems arising from multitarget tracking and multisensor data fusion. *Computational Optimization and Applications*, 3:27–57, 1994; A. B. Poore. Multidimensional assignments and multitarget tracking, partitioning data sets, I. J. cox, P. Hansen, and B. Julesz, editors, *DIMACS Series in Discrete Mathematics and Theoretical Computer Science, American Mathematical Society*, Providence, R.I., 19:169–198, 1995). These expressions include the developments of Reid, Kurien (T. Kurien. Issues in the designing of practical multitarget tracking algorithms. In *Multitarget-Multisensor Tracking: Advanced Applications* by Y. Bar-Shalom. Artech House, MA, 1990), and Stein and Blackman (S. S. Blackman. *Multiple Target Tracking with Radar Applications*. Artech House, Norwood, Mass., 1986). What's more, they are easily modified to include target features and to account for different sensor types. In track initiation, the N data sets all represent reports from N sensors, possibly all the same. For track maintenance, we use a sliding window of N data sets and one data set containing established tracks. (A. B. Poore. Multidimensional assignment formulation of data association problems arising from multitarget tracking and multisensor data fusion. *Computational Optimization and Applications*, 3:27–57, 1994; A. B. Poore. Multidimensional assignments and multitarget tracking, partitioning data sets, I. J. cox, P. Hansen, and B. Julesz, editors, *DIMACS Series in Discrete Mathematics and Theoretical Computer Science, American Mathematical Society*, Providence, R.I., 19:169–198, 1995). The formulation is the same as above except that the dimension of the assignment problem is now N+1.

IV.3. Overview of the Lagrangian Relaxation Algorithm,

Having discussed the N-dimensional assignment problem (3.1), we now turn to a description of the Lagrangian relaxation algorithm. The algorithm will proceed iteratively for a loop k=1, ..., N-2. At the completion, there remains one two-dimensional assignment problem that provides the last step which yields an optimal (sometimes) or near-optimal solution to the original N-dimensional assignment problem. In step k of this loop (summarized in Section IV.3) one starts with the following (M−k+1)-dimensional assignment problem with one change in notation. If k=1, then the index notation $l_1$ and $L_1$ are to be replaced by $i_1$ and $M_1$, respectively.

$$\text{Minimize} \sum_{l_k i_{k+1} \cdots i_N} c^{N-k+1}_{l_k i_{k+1} \cdots i_N} z^{N-k+1}_{l_k i_{k+1} \cdots i_N} \quad (4.7)$$

$$\text{Subject To} \sum_{i_{k+1} \cdots i_N} z^{N-k+1}_{l_k i_{k+1} \cdots i_N} = 1, l_k = 1, \ldots, L_k,$$

$$\sum_{l_k i_{k+2} \cdots i_N} z^{N-k+1}_{l_k i_{k+1} \cdots i_N} = 1, i_{k+1} = 1, \ldots, M_{k+1},$$

$$\sum_{l_k i_{k+1} \cdots i_{p-1} i_{p+1} \cdots i_N} z^{N-k+1}_{l_k i_{k+1} \cdots i_N} = 1$$

for $i_p = 1, \ldots, M_p$ and $p = k+2, \ldots, N-1$, $$\sum_{l_k i_{k+1} \cdots i_{N-k+1}} z^{N-k+1}_{l_k i_{k+1} \cdots i_N} = 1, i_N = 1, \ldots, M_N,$$

$z^{N-k+1}_{l_k i_{k+1} \cdots i_N} \in \{0, 1\}$ for all $l_k, i_{k+1}, \ldots, i_N$.

To ensure that a feasible solution of Equation (4.7) always exists for a sparse problem, all variables with exactly one nonzero index (i.e., variables of the form $z^{N-k+1}_{l_k 0 \cdots 0}$ for $l_k = 1, \ldots, L_k$ and $z^{N-k+1}_{0 \cdots i_p 0 \cdots 0}$ for $i_p = 1, \ldots, M_{i_p}$ and $p = k+1, \ldots, N$) are assumed free to be assigned with the corresponding cost coefficients being well-defined. This assumption is valid in the tracking environment (A. B. Poore. Multidimensional assignments and multitarget tracking, partitioning data sets, I. J. cox, P. Hansen, and B. Julesz, editors, *DIMACS Series in Discrete Mathematics and Theoretical Computer Science*, American Mathematical Society, Providence, R.I., 19:169–198, 1995; A. B. Poore. Multidimensional assignment formulation of data association problems arising from multitarget tracking and multisensor data fusion. *Computational Optimization and Applications*, 3:27–57, 1994).

Section IV.3.1 presents some of the properties associated with the Lagrangian relaxation of (4.7) based on relaxing the last (N−k)-sets of constraints to a two-dimensional one. Section IV.3.2 describes a new approach to the problem of recovering a high quality feasible solution of the original (N−k+1)-dimensional problem given a feasible solution (optimal or suboptimal) of the relaxed two-dimensional problem is described hereinafter. A summary of the relaxation algorithm is given in Section IV.3.3, and in Section IV.3.4, we establish the maximization of the Lagrangian dual (an important aspect of the relaxation procedure) to be an unconstrained nonsmooth optimization problem and then present a method for computing the subgradients.

IV.3.1 The Lagrangian Relaxed Assignment Problem

The (N−k+1)-dimensional problem (4.7) has (N−k+1) sets of constraints. A ($M_p$+1)-dimensional multiplier vector (i.e., $u^p \in \mathbb{R}^{M_p+1}$) associated with the $p^{th}$ constraint set will be denoted by $u^p = (u_0^p, u_1^p, \ldots, u_{M_p}^p)^T$ with $u_0^p \equiv 0$ being fixed for each $p = k+2, \ldots, N$ and included for notational convenience only. Now, the (N−k+l)-dimensional assignment problem (4.7) is relaxed to a two-dimensional assignment problem by incorporating (N−k−1) sets of constraints into the objective function via the Lagrangian. Although any (N−k−1) constraint sets can be relaxed, we choose the last (N−k−1) sets of constraints for convenience. The relaxed problem is $$\phi_{N-k+1}(u^{k+2}, \ldots, u^N) \equiv \text{Minimize } \phi_{N-k+1}(z^{N-k+1}; u^{k+2}, \ldots, u^N) \equiv \quad (4.8)$$

$$\text{Minimize} \sum_{l_k i_{k+1} \cdots i_N} c^{N-k+1}_{l_k i_{k+1} \cdots i_N} z^{N-k+1}_{l_k i_{k+1} \cdots i_N} +$$

$$\sum_{p=k+2}^{N} \sum_{i_p=0}^{M_p} u^p_{i_p} \left[ \sum_{l_k i_{k+1} \cdots i_{p-1} i_{p+1} \cdots i_N} z^{N-k+1}_{l_k i_{k+1} \cdots i_N} - 1 \right] \equiv$$

$$\text{Minimize} \sum_{l_k i_{k+1} \cdots i_N} \left[ c^{N-k+1}_{l_k i_{k+1} \cdots i_N} + \sum_{p=k+2}^{N} \sum_{i_p=0}^{M_p} u^p_{i_p} \right] z^{N-k+1}_{l_k i_{k+1} \cdots i_N} -$$

$$\sum_{p=k-2}^{N} \sum_{i_p=0}^{M_p}$$

$$\text{Subject To} \sum_{i_{k+1} i_{k+2} \cdots i_N} z^{N-k+1}_{i_{k+1} i_{k+2} \cdots i_N} = 1, l_k = 1,$$

$$\ldots L_k, \sum_{l_k i_{k+2} \cdots i_N} z^{N-k+1}_{i_{k+1} i_{k+2} \cdots i_N} = 1, i_{k+1} = 1, \ldots, M_{k+1}.$$

One of the major steps in the algorithm is the maximization of $\Phi_{N-k+1}(u^{k+2}, \ldots, u^N)$ with respect to the multipliers $(u^{k+2}, \ldots, u^N)$. It turns out that $\Phi_{N-k+1}$ is a concave, continuous, and piecewise affine function of the multipliers $(u^{k+2}, \ldots, u^N)$, so that the maximization of $\Phi_{N-k+1}$ is a problem of nonsmooth optimization. Since many of these algorithms require a function value and a subgradient of $\Phi_{N-k+1}$ at any required multiplier value $(u^{k+2}, \ldots, u^N)$, we address this problem in the next subsection. We note, however, that there are other ways to maximize $\Phi_{N-k+1}$ and the next subsection just addresses one such method.

IV.3.2 Properties of the Lagrangian Relaxed Assignment Problem

For a function evaluation of $\Phi_{N-k+1}$, we show that an optimal (or suboptimal) solution of this relaxed problem (4.8) can be constructed from that of a two-dimensional assignment problem. Then, the nonsmooth characteristics of $\Phi_{N-k+1}$ are addressed, followed by a method for computing the function value and a subgradient.

Evaluation of $\Phi_{N-k+1}$. Define for each $(l_k, i_{k+1})$ an index $(j_{k+2}, \ldots, j_N) = (j_{k+2}(l_k, i_{k+1}), \ldots, j_N(l_k, i_{k+1}))$ and a new cost function $c^2_{l_k i_{k+1}}$ by $$(j_{k+2}(l_k, i_{k+1}), \ldots, j_N(l_k, i_{k+1})) = \text{argmin} \left\{ c^{N-k+1}_{l_k i_{k+1} i_{k+2} \cdots i_N} + \sum_{p=k+2}^{N} u^p_{i_p} \,\middle|\, \begin{array}{l} i_p = 0, 1, \ldots, M_p \\ \text{and } p = k+2, \ldots, N \end{array} \right\}, \quad (4.9)$$

-continued $$c^2_{l_k i_{k+1}} = c^{N-k+1}_{l_k i_{k+1} j_{k+2}(l_k, i_{k+1})\ldots j_N(l_k, i_{k+1})} + \sum_{p=k+2}^{N} u^p_{j_p}(l_k, i_{k+1}) \text{ for } (l_k, i_{k+1}) \neq (0, 0),$$

$$c^2_{00} = \sum_{i_{k+1}\cdots i_N} \text{Minimum}\left\{0, c_{00 i_{k+2}\cdots i_N} + \sum_{p=k+2}^{N} u^p_{i_p}\right\},$$

Given an index pair $(l_k, i_{k+1})$, $(j_{k+2}, \ldots, j_N)$ need not be unique, resulting in the potential generation of several subgradients (4.17). Then, $$\hat{\Phi}_{N-k+1}(u^{k+2}, \ldots, u^N) = \text{Minimize}\hat{\phi}_{N-k+1}(z^2; u^{k+2}, \ldots, u^N) \quad (4.10)$$

$$\equiv \sum_{l_k=0}^{L_k} \sum_{i_{k+1}=0}^{M_{k+1}} c^2_{l_k i_{k+1}} z^2_{l_k i_{k+1}} - \sum_{p=k+2}^{N} \sum_{i_p=0}^{M_p} u^p_{i_p}$$

Subject To $\sum_{i_{k+1}=0}^{M_{k+1}} z^2_{l_k i_{k+1}} = 1, l_k = 1, \ldots L_k,$ $\sum_{l_k=0}^{L_k} z^2_{l_k i_{k+1}} = 1, i_{k+1} = 1, \ldots M_{k+1},$ $z^2_{l_k i_{k+1}} \in \{0, 1\}$ for all $l_k, i_{k+1}$.

As an aside, two observations are in order. The first is that the search procedure needed for the computation of the relaxed cost coefficients in (4.9) is the most computationally intensive part of the entire relaxation algorithm. The second is that a feasible solution $z^{N-k+1}$ of a sparse problem (4.7) yields a feasible solution $z^2$ of (4.10) via the construction $$z^2_{l_k i_{k+1}} = \begin{cases} 1, & \text{if } z^{N-k+1}_{l_k i_{k+1} i_{k+2}\cdots i_N} = 1 \text{ for some } (i_{k+2}, \cdots, i_N), \\ 0, & \text{otherwise.} \end{cases}$$

thus, there are generally solutions other than the one nonzero index solution.

The following Theorem 4.1 gives a method for evaluating $\Phi_{N-k+1}$ and states that an optimal solution of (4.8) can be computed from that of (4.10). Furthermore, if the solution of either of these two problems is $\epsilon$-optimal, then so is the other. The converse is contained in Theorem 4.2.

Theorem 4.1. Let $w^2$ be a feasible solution to the two-dimensional assignment problem (4.10) and define $w^{N-k+1}$ by $$w^{N-k+1}_{l_k i_{k+1} i_{k+2}\cdots i_N} = w^2_{l_k i_{k+1}} \quad \text{if } (i_{k+2}, \ldots, i_N) = (j_{k+2}, \ldots, j_N) \text{ and } (l_k, i_{k+1}) \neq (0, 0) \quad (4.11)$$

$$w^{N-k+1}_{l_k i_{k+1} i_{k+2}\cdots N} = 0 \quad \text{if } (i_{k+2}, \ldots, i_N) \neq (j_{k+2}, \ldots, j_N) \text{ and } (l_k, i_{k+1}) \neq (0, 0)$$

$$w^{N-k+1}_{00 i_{k+2}\cdots i_N} = 1 \quad \text{if } c^{N-k+1}_{00 i_{k+2}\cdots i_N} + \sum_{p=k+2}^{N} u^p_{i_p} \leq 0,$$

$$w^{N-k+1}_{00 i_{k+2}\cdots i_N} = 0 \quad \text{if } c^{N-k+1}_{00 i_{k+2}\cdots i_N} + \sum_{p=k+2}^{N} u^p_{i_p} > 0.$$

Then $w^{N-k+1}$ is a feasible solution of the Lagrangian relaxed problem and $$\phi_{N-k+1}(w^{N-k+1}; u^{k+2}, \ldots, u^N) = \phi_{-k-1}(w_2; u^{k+2}, \ldots, u^N).$$

If, in addition, $W^2$ is optimal for the two-dimensional problem, then $w^{N-k+1}$ is an optimal solution of the relaxed problem and $$\Phi_{N-k+1}(u^{k+2}, \ldots, u^N) = \Phi_{-k+1}(u^{k+2}, \ldots, u^N).$$

Proof. Let $w^{N-k+1}$ and $w^2$ be as in the hypotheses, and let $$\phi_{N-k+1}(w^{N-k+1}; u^{k+2}, \ldots, u^N)$$

and $$\phi_{N-k+1}(z^2; u^{k+2}, \ldots, u^N)$$

denote the objective function values of (4.8) and (4.10), respectively. Direct verification shows that $w^{N-k+1}$ satisfies the constraints in (4.8) and $$\phi_{N-k+1}(w^{N-k+1}; u^{k+2}; \ldots, u^N) = \phi_{-k+1}(w^2; u^{k+2}, \ldots, u^N).$$

For the remainder of the proof, assume that $w^2$ is optimal for (4.10). Let $X^{N-k+1}$ satisfy the constraints in (4.8) and define $$x^2_{l_k i_{k+1}} = \sum_{i_{k+2}\cdots i_N} x^{N-k+1}_{l_k i_{k+1} i_{k+2}\cdots i_N} \text{ for } (l_k, i_{k+1}) \neq (0, 0), \quad (4.12)$$

$x^2_{00} = 1$ if $(l_k, i_{k+1}) = (0, 0)$ and $$c^{N-k+1}_{00 i_{k+2}\cdots i_N} + \sum_{p=k+2}^{N} u^p_{i_p} \leq 0 \text{ for some } (i_{k+2}, \cdots, i_N),$$

$x^2_{00} = 0$ if $(l_k, i_{k+1}) = (0, 0)$ and $$c^{N-k+1}_{00 i_{k+2}\cdots i_N} + \sum_{p=k+2}^{N} u^p_{i_p} > 0 \text{ for all } (i_{k+2}, \cdots, i_N).$$

Note that $x^2$ satisfies the constraints in (4.10) and $$\phi_{N-k+1}(x^{N-k+1}; u^{k+2}, \ldots, u^N) \geq \phi'_{-k+1}(x^2; u^{k+2}, \ldots, u^N)$$
$$\geq \phi'_{N-k+1}(w^2; u^{k+2}, \ldots, u^N)$$
$$= \phi_{N-k+1}(w^{N-k+1}; u^{k+2}, \ldots, u^N)$$

for any feasible solution $x^{N-k+1}$ of the constraints (4.8). This implies $w^{N-k+1}$ is an optimal solution of (4.8). Next, $$\Phi_{N-k+1}(u^{k+2}, \ldots, u^N) = \Phi_{N-k+1}(u^{k+2}, \ldots, u^N)$$

follows immediately from $$\phi_{N-k+1}(w^{N-k+1}; u^{k+2}, \ldots, u^N) = \phi_{N-k+1}(w^2; u^{k+2}, \ldots, u^N)$$

for an optimal solution $w^2$ of (4.10). With the exception of one equality being converted to an inequality, the following theorem is a converse of Theorem 4.1.

Theorem 4.2. Let $w^{N-k+1}$ be a feasible solution to problem (4.8) and define $w^2$ by $$w^2_{i_k i_{k+1}} = \sum_{i_{k+2}\cdots i_N} w^{N-k+1}_{i_k i_{k+1} i_{k+2}\cdots i_N} \text{ for } (l_k, i_{k+1}) \neq (0,0), \quad (4.13)$$

$w^2_{00} = 1$ if $(l_k, i_{k+1}) = (0,0)$ and $$c^{N-k+1}_{00 i_{k+2}\cdots i_N} + \sum_{p=k+2}^{N} u^p_{i_p} \leq 0 \text{ for some } (i_{k+2}, \cdots, i_N),$$

$w^2_{00} = 0$ if $(l_k, i_{k+1}) = (0,0)$ and $$c^{N-k+1}_{00 i_{k+2}\cdots i_N} + \sum_{p=k+2}^{N} u^p_{i_p} > 0 \text{ for all } (i_{k+2}, \cdots, i_N).$$

Then $w^2$ a feasible solution of the problem (4.10) and $$\phi_{N-k+1}(w^{N-k+1}; u^{k+2}, \ldots, u^N) \geq \phi_{N-k+1}(w^2; u^{k+2}, \ldots, u^N).$$

If, in addition, $w^{N-k+1}$ is optimal for (4.8), then $w^2$ is an optimal solution of (4.10), $$100_{N-k+1}(w^{N-k+1}; u^{k+2}, \ldots, u^N) = \phi_{N-k+1}(w^2; u^{k+2}, \ldots, u^N)$$

and $$\Phi_{N-k+1}(u^{k+2}, \ldots, u^N) = \Phi_{N-k+1}(u^{k+2}, \ldots, u^N).$$

Proof: Let $w^{N-k+1}$ and $w^2$ be as in the hypotheses, and let $\phi_{N-k+1}(w^{N-k+1}; u^{k+2}, \ldots, u^N)$ and $\phi_{N-k+1}(w^2; u^{k+2}, \ldots, u^N)$ denote the objective function values of (4.8) and (4.10), respectively. Direct verification shows that $w^2$ satisfies the constraints in (4.10) and $$\phi_{N-k+1}(w^{N-k+1}; u^{k+2}, \ldots, u^N) \geq \phi_{N-k+1}(w^2; u^{k+2}, \ldots, u^N).$$

For the remainder of the proof, assume that $w^{n-k+1}$ is optimal for (4.8) and construct $w^2$ as above. Using Theorem 4.1, construct $\overline{w}^{N-k+1}$ by replacing $w^{N-k+1}$ in (4.11) with $\overline{w}^{N-k+1}$. Then, from that theorem $$\phi_{N-k+1}(\overline{w}^{N-k+1}; u^{k+2}, \ldots, u^N) = \phi'_{N-k+1}(w^2; u^{k+2}, \ldots, u^N)$$
$$\leq \phi_{N-k+1}(w^{N-k+1}; u^{k+2}, \ldots, u^N).$$

Optimality of $w^{N-k+1}$ then implies the last inequality is in fact an equality. This proves the theorem.

The Nonsmooth Optimization Problem. Next, we address the nonsmooth properties of the function $\phi_{N-k+1}(u^{k+2}, \ldots, u^N)$ as explained in the following theorem.

Theorem 4.3. (G. L. Nemhauser and L. A. Wolsey. Integer and Combinatorial Optimization, Section II.3.6. Wiley, New York, N.Y., 1988). Let $\Phi_{N-k+1}$ be as defined in (4.7), let $V_{N-k+1}(z^{N-k+1})$ be the objective function value of the (N-k+1)-dimensional assignment problem in equation (4.7) corresponding to a feasible solution $z^{N-k+1}$ of the constraints in (4.7), and let $\overline{z}^{N-k+1}$ be an optimal solution of (4.7). Then, $\Phi_{N-k+1}(u^{k+2}, \ldots, u^N)$ is piecewise affine, concave and continuous in $\{u^{k+2}, \ldots, u^N\}$ and $$\Phi_{n-k+1}(u^{k+2}, \ldots, u^N) \leq V_{N-k+1}(\overline{z}^{N-k+1}) \leq V_{N-k+1}(z^{N-k+1}) \quad (4.14)$$

Most of the algorithms for nonsmooth optimization are based on generalized gradients, called subgradients, given by the following definition for a concave function.

Definition 4.1. At $\square = (u^{k+2}, \ldots, u^N)$ the set a $\partial \Phi_{N-k+1}(u)$ is called a subdifferential of $\Phi_{N-k+1}$ and is defined for the concave function $\Phi_{N-k+1}(u)$ by $$\partial \Phi_{N-k+1}(u) = \{ g \in \mathbb{R}^{M_{k+2}+1} x \ldots x \mathbb{R}^{M_N+1} | \Phi_{N-k+1}(w) - \Phi_{N-k+1}(u) \leq g^T(w-u) \text{ for all } w \in \mathbb{R}^{M_{k+2}+1} x \ldots x \mathbb{R}^{M_N+1} \}, \quad (4.15)$$

where $g_0^p = w_0^{p=u} {}_0^{p=}0$ are all permanently fixed. (Recall that these were used for notational conveience only.) A vector $g \in \partial \Phi_{N-k+1}$ is called a subgradient.

There is a large literature on such problems, e.g., (J.-B. Hiriart-Urruty and C. Lemarechal. *Concex Analysis and Minimization Algorithms I& II*. Springer-Verlag, Berlin, 1993; K. C. Kiwiel. Methods of descent for nondifferentiable optimization. In *Lecture Notes in Mathematics* 1133, A. Dold and B. Eckmann, eds. Springer-Verlag, Berlin, 1985; C. Lemarechal and R. Mifflin. *Nonsmooth Optimization*. Pergamon Press, Oxford, UK, 1978; B. T. Polyak. Subgradient method: A survey of Soviet research. In C. Lemarechal and R. Mifflin, editors, *Nonsmooth Optimization*, pages 5–29, N.Y., 1978. Pergamon Press.; H. Schramm and J. Zowe. A version of the bundle idea for minimizing a nonsmooth function: Conceptual idea, convergence analysis, numerical results. *SIAM Journal on Optimization*, 2, No.1:121–152, February, 1992; N. Z. Shor. *Minimization Methods for Non-Differentiable Functions*. Springer-Verlag, Nem York, 1985; P. Wolfe. A method of conjugate subgradients for minimizing nondifferentiable functions. *Mathematical Programming Study*, 3:145–173, 1975), and we have tried a variety of methods including subgradient methods (N. Z. Shor. *Minimization Methods for Non-Differentiable Functions*. Springer-Verlag, New York, 1985) and bundle methods (J.-B. Hiriart-Urruty and C. Lemarechal. *Convex Analysis and Minimization Algorithms I& II*. Springer-Verlag, Berlin, 1993; K. C. Kiwiel. Methods of descent for nondifferentiable optimization. In *Lecture Notes in Mathematics* 1133, A. Dold and P. Eckmann, eds. Springer-Verlag, Berlin, 1985). Of these, we have determined that for a fixed number of nonsmooth iterations (e.g., twenty), the bundle trust method of Schramm and Zowe (H. Schramm and J. Zowe. A version of the bundle idea for minimizing a nonsmooth function: Conceptual idea, convergence analysis, numerical results. *SIAM Journal on Optimization*, 2, No. 1:121–152, February, 1992) provides excellent quality solutions with the fewest number of function and subgradient evaluations, and is therefore our currently recommended method.

An Algorithm for Computing $\Phi_{N-k+1}$ and a Subgradient.

Most current software for maximizing the concave function $\Phi N-k+1$ requires the value of the function and a subgradient at a point $(u^{k+2}, \ldots, u^N)$. Based on the previous two sections, this can be summarized as follows.

1. Starting with problem (4.7), form the relaxed problem (4.8);
2. To solve (4.8) optimally, defined the two-dimensional assignment problem (4.10) via the transformation (4.9);
3. Solve the two-dimensional problem (4.10) optimally;
4. Reconstruct the optimal solution, say $\hat{w}^{N-k+1}$, of (4.8) via equation (4.9) as in Theorem 4.1;
5. Compute the function $$\Phi_{N-k+1}(u^{k+2}, \ldots, u^N) \equiv \phi_{N-k+1}(\hat{w}^{N-k+1}; u^{k+2}, \ldots, u^N) \quad (4.16)$$

$$\equiv \sum_{l_k i_{k+1} \cdots i_N} c^{N-k+1}_{l_k i_{k+1} \cdots i_N} \hat{w}^{N-k+1}_{l_k i_{k+1} \cdots i_N} +$$

$$\sum_{p=k+2}^{N} \sum_{i_p=0}^{M_p} u^p_{i_p} \left[ \sum_{l_k i_{k+1} \cdots i_{p-1} i_{p+1} \cdots i_N} \hat{w}^{N-k+1}_{l_k i_{k+1} \cdots i_N} - 1 \right];$$

6. A subgradient is given by $$g^p_{i_p} = \frac{\partial \Phi_{N-k+1}(u^{k+2}, \ldots, u^N)}{\partial u^p_{i_p}} \quad (4.17)$$

$$= \left[ \sum_{l_k i_{k+1} \cdots i_{p-1} i_{p+1} \cdots i_N} \hat{w}^{N-k+1}_{l_k i_{k+1} \cdots i_N} - 1 \right]$$

for $i_p = 1, \ldots, M_p$ and $p = k+2, \ldots, N$.

Several remarks are in order. First, the optimal solution of the minimization problem (4.8) is required before one can remove the minimum sign, replace $z^{N-k+1}$ by the minimizer $\hat{w}^{N-k+1}$ and differentiate with respect to $u^p_{i_p}$ to obtain a subgradient as in (4.17). If $\hat{w}^{N-k+1}$ is an approximate solution of (4.8), then the subgradient and function values are only approximate with accuracy depending on that of $\hat{w}^{N-k+1}$. Although one can evaluate the sums in (4.16) and (4.17) in a straight forward manner, another method is based on the following observation. Given the multiplier vector $(u_{k+2}, \ldots, u_N)$ let $\{(l_k(l_{k+1}), i_{k+1}(l_{k+1}))\}_{l_{k+1}=0}^{L_{k+1}}$ be an enumeration of indices $\{l_k, i_{k+1}\}$ of $w^2$ (or the first 2 indices of $w^{N-k+1}$ constructed in equation (4.9)) such that $w_{l_k(l_{k+1}),i_{k+1}(l_{k+1})}^2 = 1$ for $(l_k(l_{k+1}), i_{k+1}(l_{k+1})) \neq (0,0)$ and $(l_k(l_{k+1}), i_{k+1}(l_{k+1})) = (0, 0)$ for $l_{k+1}=0$ regardless of whether $w_{00}^2 = 1$ or not. (The latter can only improve the recovered feasible solution.) The evaluation of the bracketed quantity in (4.17) for a specific $i_p \geq 1$ and $p=k+2, \ldots, N$ is one minus the number of times the index value $i_p$ appears in the $(p-k+1)^{th}$ position of the $(N-k+1)$-tuple in the list $\{l_k(l_{k+1}), i_{k+1}(l_{k+1}), j_{k+2}, \ldots, j_N\}_{l_{k+1}=0}^{L_{k+1}}$.

Finally, we have presented a method for computing one subgradient. If $\hat{w}^{N-k+1}$ is the unique optimal solution of (4.8), then $\Phi_{N-k}1(u)$ is differentiable at u, g is just the gradient at u, and the subdifferential a $\partial \Phi_{N-k+1}(u)=\{g\}$ is a singleton. If, corresponding to u, $\hat{w}^{N-k+1}$ is not unique, then there are finitely many such solutions, say $\{\hat{w}^{N-k+1}(1), \ldots, \hat{w}^{N-k+1}(m)\}$ with respective subgradients $\{g(1), \ldots, g(m)\}$, the subdifferential $\partial \Phi(u)$ is the convex hull of $\{g(1), \ldots, g(m)\}$ (J. L. Goffin. On convergence rates of subgradient optimization methods, mathematical programming. *Mathematical Programming*, 13:329– 347, 1977).

These nonunique solutions arise in two ways. First, if the optimal solution of the two-dimensional assignment problem is not unique, then one can generate all optimal solutions of the two-dimensional assignment problem (4.10). Corresponding to each of these solutions and to each index pair $(l_k, i_{k+1})$ in each solution, compute the indices $(j_{k+2}, \ldots, j_N)$ in (4.9). If these j's are not unique, then we can enumerate all the possible optimal solutions $\hat{w}^{N-k+1}$ of (4.8). Given these solutions, one can then compute the corresponding subgradients from (4.17). In most nonsmooth optimization algorithms, one uses an $\epsilon$-subdifferential.

Definition 4.2. At $u=(u^{k+2}, \ldots, u^N)$ the set $\partial_\epsilon \Phi_{N-k+1}(u)$ is called an $\epsilon$-subdifferential of $\Phi_{N\,k+1}$ and is defined for the concave function $\Phi_{N-k+1}(u)$ by $$\partial_\epsilon \Phi_{N-k+1}(u) = \{g \in \mathbb{R}^{M_{k+2}+1} x \ldots x \mathbb{R}^{M_N+1}(w) - \Phi_{N-k+1}(u) \leq g^T(w-u) + \epsilon$$
$$\text{for all } w \in \mathbb{R}^{M_{k+2}+1} x \ldots x \mathbb{R}^{M_N+1}\},$$

where $g_0^P = w_0^P = u_0^P = 0$ are all permanently fixed. (Recall that these were used for notational convenicence only.) A vector $g \in \partial_\epsilon \Phi_{N-k+1}(u)$ is called an $\epsilon$-subgradient.

IV.3.3 The Recovery Procedure

The next objective is to explain a recovery procedure, i.e., given a feasible (optimal or suboptimal) solution $w^2$ of (4.10) (or $w^{N-k+1}$ of (4. 8) constructed via Theorem 4.1), generate a feasible solution $z^{N-k+1}$ of equation (4.7) which is close to $w^2$ in a sense to be specified. We first assume that no variables in (4.7) are preassigned to zero; this assumption will removed shortly. The difficulty with the solution $w^{N-k+1}$ in Theorem 4.1 is that it need not satisfy the last (N-k-1) sets of constraints in (4.7). (Note, however, that if $w^2$ is an optimal solution (4.10) and $w^{N-k+1}$, as constructed in Theorem 4.1, satisfies the relaxed constraints, then $w^{N-k+1}$ is optimal for (4.7).) The recovery procedure described here is designed to preserve the 0–1 character of the solution $w^2$ of (4.10) as far as possible: If $w_{l_k i_{k+1}}^2 = 1$ and $l_k \neq 0$ or $i_{k+1} \neq 0$, the corresponding feasible solution $z^{N-k+1}$ of (4.7) is construed so that $z_{l_k i_{k+1} \ldots i_N}^{N-k+1} = 1$ for some $(i_{k+2}, \ldots, i_N)$. By this reasoning, variables of the form $z_{00 i_{k+2} \ldots i_N}^{N-k+1}$ can be assigned a value of one in the recovery problem only if $w_{00}^2 = 1$. However, variables $z_{00 i_{k-2} \ldots i_N}^{N-k+1}$ will be treated differently in the recovery procedure in that they can be assigned either zero or one independent of the value $w_{00}^2$. This increases the feasible set of the recovery problem, leading to a potentially better solution. Let $\{(l_k(l_{k+1}), i_{k+1}(l_{k+1}))\}_{l_{k+1}=0}^{L_{k+1}}$ be an enumeration of indices $\{l_k, i_{k+1}\}$ of $w^2$ (or the first 2 indices of $w^{N-k+1}$ constructed in equation (4.11)) such that $$w_{l_k(l_{k+1}), i_{k+1}(l_{k+1})}^2 = 1$$

for $$(l_k(l_{k+1}), i_{k+1}(l_{k+1})) \neq (0,0)$$

and $$(l_k(l_{k+1}), i_{k+1}(l_{k+1})) = (0,0) \text{ for } l_{k+1}=0$$

regardless of whether $w_{000}=1$ or not. To define the (N-k)-dimensional assignment problem that resores feasibility, let $$c^{N-1}_{l_2 i_3 \ldots i_N} = c^N_{l_i(l_2) i_2(l_2) i_3 \ldots i_N} \text{ for } k=1 \quad (4.18)$$

$$c^{N-k}_{l_{k+1} i_{k+2} \ldots i_N} = c^{N-k+1}_{l_k(l_{k+1}) i_{k+1}(l_{k+1}) i_{k+1} \ldots i_N}$$

$$= c^N_{i_1(l_2 \ldots k+1) i_2(l_2 \ldots k+1) i_3(l_3 \ldots k+1) \ldots i_k(l_{kk+1}) i_{k+1}(l_{k+1} i_{k+2} \ldots i_N}$$

-continued for $k \geq 2$ and $l_k = 0, \ldots, L_k$, where $$l_m \ldots {}_{k+1} = l_m \circ l_{m+1} \circ \ldots \circ l_k(l_{k+1}) = l_m(l_{m+1}(\ldots (l_k(l_{k+1}))\ldots)) \quad (4.19)$$

for $m=2, \ldots k+1$ and where "$\circ$" denotes function composition. For example, $l_{23}=l_2(l_3)$ and $l_{234}=l_2 \circ l_3(l_4)=l_2(l_3(l_4))$.

Then the $(N-k)$-dimensional assignment problem that restores feasibility is $$\text{Minimize} \sum_{l_{k+1}i_{k+2}\ldots i_N} c^{N-k}_{l_{k+1}i_{k+2}\ldots i_N} z^{N-k}_{l_{k+1}i_{k+2}\ldots i_N} \quad (4.20)$$

$$\text{Subject To} \sum_{i_{k+2}\ldots i_N} z^{N-k}_{l_{k+1}i_{k+2}\ldots i_N} = 1, l_{k+1} = 1, \ldots, L_{k+1},$$

$$\sum_{i_{k+1}i_{k+2}\ldots i_N} z^{N-k}_{l_{k+1}i_{k+2}\ldots i_N} = 1, l_{k+2} = 1, \ldots, M_{k+2},$$

$$\sum_{l_k l_{k+1} \ldots i_{p-1} i_{p+1} \ldots i_N} z^{N-k}_{l_{k+1}i_{k+2}\ldots i_N} = 1$$

for $i_p = 1, \ldots, M_p$ and $p = k+3, \ldots, N-1$, $$\sum_{l_{k+1}i_{k+1}\ldots i_{N-1}} z^{N-k}_{l_{k+1}i_{k+2}\ldots i_N} = 1, i_N = 1, \ldots M_N,$$

$$z^{N-k}_{l_{k+1}i_{k+2}\ldots i_N} \in \{0, 1\} \text{ for all } l_{k+1}i_{k+2}\ldots i_N.$$

Let $Y$ be an optimal or feasible solution to this $(N-k)$-dimensional assignment problem. The recovered feasible solution $z^N$ is defined by $$z^N_{i_1 i_2 i_3 \ldots i_N} = \begin{cases} 1, & \text{if } i_1 = i_1(l_{2\ldots k+1}), i_2 = i_2(l_{2\ldots k+1}), \\ & i_3 = i_3(l_{2\ldots k+1}), \ldots, i_k = i_k(l_{kk+1}), \\ & i_{k+1} = i_{k+1}(l_{k+1}) \text{ and } Y_{l_{k+1}i_{k+2}\ldots i_N=1}, \\ 0, & \text{otherwise.} \end{cases} \quad (4.21)$$

Said in a different way, the recovered feasible solution $z^N$ corresponding to the multiplier set $\{u^{k+2}, \ldots, u^N\}$ is then defined by $$z_{i_1(l_2\ldots k+1)i_2(l_2\ldots k+1)i_3(l_3\ldots k+1)\ldots i_k(l_{kk+1})i_{k+1}(l_{k+1})i_{k+2}\ldots i_N} =$$

$$\begin{cases} 1, & \text{if } Y_{l_{k+1}i_{k+2}\ldots i_N} = 1, \\ 0, & \text{otherwise,} \end{cases}$$

where $l_m \ldots {}_{k+1}$ is defined in (4.19) and "$\circ$" denotes function composition.

The next objective is to remove the assumption that all cost coefficients are defined and all zero-one variables are free to be assigned. We first note that the above construction of a reduced dimension assignment problem (4.20) is valid as long as all cost coefficients $c^{N-k}$ are defined and all zero-one variables in $z^{N-k}$ are free to be assigned. Modifications are necessary for sparse problems. If the cost coefficient $c_{l_k(l_{k+1})i_{k+1}(l_{k+1})i_{k+2} \ldots i_N}^{N-k+1}$ is well-defined and the zero-one variable $z_{l_k(l_{k+1})i_{k+1}(l_{k+1})i_{k+2} \ldots i_N}^{N-k+1}$ is free to be assigned to zero or one, then define $c_{l_{k+1}i_{k+2} \ldots i_N}^{N-k} = c_{l_k(l_{k+1})i_{k+1}(l_{k+1})i_{k+2} \ldots i_N}^{N-k+1}$ as in (4.18) with $z_{l_{k+1}i_{k+2} \ldots i_N}^{N-k}$ being free to be assigned. Otherwise, $z_{l_{k+1}i_{k+2} \ldots i_N}^{N-k}$ is preassigned to zero or the corresponding arc is not allowed in the feasible set of arcs. To ensure that a feasible solution exists, we now only need ensure that the variables $z_{l_{k+1}^0 \ldots 0}^{N-k}$ are free to be assigned for $l_{k+1}=0,1, \ldots, L_{k+1}$ with the corresponding cost coefficients being well-defined. (Recall that all variables of the form $z_{l_k^0 \ldots 0}^{N-k+1}$ and $z_{0 \ldots 0 i_p^0 \ldots 0}^{N-k+1}$ are free (to be assigned) and all coefficients of the form $c_{l_k^0 \ldots 0}^{N-k+1}$ and $c_{0 \ldots 0 i_p^0 \ldots 0}^{N-k+1}$ are well-defined for $l_k=0, \ldots, L_k$ and $i_p=0, \ldots, M_p$ for $p=k+1, \ldots, N$.) This is accomplished as follows: If the cost coefficient $c_{l_k(l_{k+1})i_{k+1}(l_{k+1})0 \ldots 0}^{N-k+1}$ is well-defined and $z_{l_k(l_{k+1})i_{k+1}(l_{k+1})0 \ldots 0}^{N-k+1}$ is free, then define $c_{l_{k+1}^0 \ldots 0}^{N-k} = c_{l_k(l_{k+1})i_{k+1}(l_{k+1})0 \ldots 0}^{N-k+1}$ with $z_{l_{k+1}^0 \ldots 0}^{N-k}$ being free. Otherwise, since all variables of the form $z_{l_k^0 \ldots 0}^{N-k+1}$ and $z_{0 i_{k+1}^0 \ldots 0}^{N-k+1}$ are free to be assigned with the corresponding costs being well-defined, set $c_{l_{k+1}^0 \ldots 0}^{N-k} = c_{l_k(l_{k+1})00 \ldots 0}^{N-k+1} + c_{0 i_{k+1}(l_{k+1})0 \ldots 0}^{N-k+1}$, where the first term is omitted if $l_k(l_{k+1})=0$ and the second, if $i_{k+1}(l_{k+1})=0$. For $l_k(l_{k+1})=0$ and $i_{k+1}(l_{k+1})=0$, define $c_{0 \ldots 0}^{N-k} = c_{0 \ldots 0}^{N-k+1}$.

IV.3.4. The last step $k=N-2$.

$$\Phi_2 \equiv \text{Minimize} \sum_{l_{N-1}}^{L_{N-1}} \sum_{i_N=0}^{M_N} c^2_{l_{N-1}i_N} z^2_{l_{N-1}i_N} \equiv V_2(z^2) \quad (4.22)$$

$$\text{Subject To} \sum_{i_N=0}^{M_N} z^2_{l_{N-1}i_N} = 1, l_{N-1} = 1, \ldots, L_{N-1},$$

$$\sum_{l_{N-1}=0}^{L_{N-1}} z^2_{l_{N-1}i_N} = 1, l_N = 1, \ldots, M_N,$$

$$z^2_{l_{N-1}i_N} \in \{0, 1\} \text{ for all } l_{N-1}, i_N.$$

The description of the algorithm ends with $k=N+2$. The resulting recovery problem defined in (4.10) with $k=N-2$ is Let $Y$ be an optimal or feasible solution to this two-dimensional assignment problem. The recovered feasible solution $z^N$ is defined by $$\hat{z}^N_{i_1 i_2 i_3 \ldots i_N} = \quad (4.23)$$

$$\begin{cases} 1, & \text{if } i_1 = i_1(l_{2\ldots N-1}), i_2 = i_2(l_{2\ldots N-1}), i_3 = i_3(l_{3\ldots N-1}), \ldots \\ & i_{N-2} = i_{N-2}(l_{N-2N-1}), i_{N-1} = i_{N-1}(l_{N-1}) \text{ and } Y_{l_{N-1}i_N} = 1 \\ & \text{or if } (l_{N-1}, i_N) = (0, 0), \\ 0, & \text{otherwise.} \end{cases}$$

Said in a different way, the recovered feasible solution $z^N$ is then defined by $$\hat{z}_{i_1(l_2\ldots N-1)i_2(l_2\ldots N-1)i_3(l_3\ldots N-1)\ldots i_{N-2}(l_{N-2N-1})i_{N-1}(l_{N-1})i_N} = \quad (4.24)$$

$$\begin{cases} 1, \text{if } Y_{l_{N-1}i_N} = 1, \\ 0, \text{otherwise.} \end{cases}$$

where $l_m \ldots {}_{N-1}$ is defined in (4.19) and "$\circ$" denotes function composition. To complete the description, let $\{(l_{N-1}(l_N), i_N(l_N))\}_{l_N=0}^{L_N}$ be an enumeration of indices $\{l_{N-1}, i_N\}$ of $Y$ such that $Y_{l_{N-1}(l_N), i_N(l_N)} = 1$ for $(l_{N-1}(l_N), i_N(l_N)) \neq (0,0)$ and $(l_{N-1}(l_N), i_N(l_N)) = (0,0)$ for $l_N=0$ regardless of whether $Y_{00}=1$ or not. Then the recovered feasible solution can be written as $$\hat{z}^N_{i_1 i_2 i_3 \ldots i_N} = \quad (4.25)$$

$$\begin{cases} 1, & \text{if } i_1 = i_1(l_{2\ldots N}), i_2 = i_2(l_{2\ldots N}), i_3 = i_3(l_{3\ldots N}), \ldots, \\ & i_{N-1} = i_{N-1}(l_{N-1N}), i_N = i_N(l_N); \\ 0, & \text{otherwise.} \end{cases}$$

IV.3.5. The Upper and Lower Bounds

The upper bound on the feasible solution is given by $$V_N(\hat{z}^N) = \sum_{i_1 \cdots i_N} c^N_{i_1 \cdots i_N} \hat{z}^N_{i_1 \cdots i_N} \quad (4.26)$$

and the lower by $\Phi_N(u^3, \ldots, u^N)$ for any multiplier value $(u^3, \ldots, u^N)$. In particular, we have $$\Phi_N(u^3, \ldots, u^N) \le \Phi_N(\bar{u}^3, \ldots, \bar{u}^N) \le V_N(\bar{z}^N) \le V_N(\hat{z}^N), \quad (4.27)$$

where $(u^3, \ldots, u^N)$ is any multiplier value, $(\bar{u}^3, \ldots, \bar{u}^N)$ is a maximizer of $\Phi_N(u^3, \ldots, u^N)$, $\bar{z}^N$ is an optimal solution of the multidimensional assignment problem (4.7) and $\hat{z}^N$ is the recovered feasible solution defined by (4.25). Finally, we conclude with the observation that $V_N(\hat{z}) = V_2(Y)$ where $Y$ is the optimal solution of (4.23) used in the construction of $\hat{z}$ in equations (4.24)–(4.26).

IV.3.6. Reuse of Multipliers

Since the most computationally expensive part of the algorithm occurs in the maximization of $\Phi_{N-k+1}$, the development of algorithms that can make use of hot starts or multipliers close to the optimal are fundamentally important for real-time speed. The purpose of this section is to demonstrate that the multiplier set obtained at stage $k \ge 1$ provide good starting values for those obtained at step $k+1$.

Theorem 4.4. Let $(u^3, \ldots, u^N)$ denote a multiplier set obtained in the maximization of $\Phi_N(u^3, \ldots, u^N)$. Then this multiplier set satisfies the string of inequalities $$\Phi_N(u^3, \ldots, u^N) \le \Phi_{N-1}(u^4, \ldots, u^N) \le \ldots \le \Phi_3(u^N) \le \Phi_2 \le V_N(\hat{z}) \quad (4.28)$$

where after the first step in the maximization of $\Phi_N$ the multipliers are not chanted in the remaining steps. Furthermore, to improve this inequality, let $(u^{2+k,N-k+1}, \ldots, u^{N,N-k+1})$ denote a maximizer of $\Phi_{N-k+1}(u^{k+2}, \ldots, u^N)$.

Then, we have $$\phi_{N-k+1}(u^{k+2}, \ldots, u^N) \le \phi_{N-k+1}(u^{2+k,N-k+1}, \ldots, u^{N,N-k+1}) \quad (4.29)$$

$$\le \phi_{N-k}(u^{3+k,N-k+1}, \ldots, u^{N,N-k+1})$$

$$\le \phi_{N-k}(u^{3+k,N-k}, \ldots, u^{N,N-k})$$

$$\le \ldots \le \phi_3(u^{N,3}) \le \phi_2 \le V_N(\hat{z}).$$

Proof: Suppose we have a value of the multipliers $(u^{k+2}, \ldots, u_N)$ obtained in the maximization of $$\phi_{N-k+1}(u^{k+2}, \ldots, u^N) \equiv \text{Minimize } \phi_{N-k+1}(z^{N-k+1}; u^{k+2}, \ldots, u^N) \quad (4.30)$$

Subject To $\sum_{i_{k+1} i_{k+2} \cdots i_N} z^{N-k+1}_{l_k i_{k+1} i_{k+2} \cdots i_N} = 1,$ $l_k = 1, \ldots L_k, \sum_{i_k i_{k+2} \cdots i_N} z^{N-k+1}_{l_k i_{k+1} i_{k+2} \cdots i_N} = 1, l_{k+1} = 1, \ldots, M_{k+1},$ where $$\phi_{N-k+1}(z^{N-k+1}; u^{k+2}, \ldots, u^N) = \sum_{i_k i_{k+1} \cdots i_N} c^{N-k+1}_{l_k i_{k+1} \cdots i_N} z^{N-k+1}_{l_k i_{k+1} \cdots i_N} + \quad (4.31)$$

$$\sum_{p=k+2}^{N} \sum_{i_p=0}^{M_p} \left[ \sum_{l_k i_{k+1} \cdots i_{p-1} i_{p+1} \cdots i_N} z^{N-k+1}_{l_k i_{k+1} \cdots i_N} - 1 \right] =$$

$$\sum_{l_k i_{k+1} \cdots i_N} \left[ c^{N-k+1}_{l_k i_{k+1} \cdots i_N} + \sum_{p=k+2}^{N} u^p_{i_p} \right] z^{N-k+1}_{l_k i_{k+1} \cdots i_N} - \sum_{p=k+2}^{N} \sum_{i_p=0}^{M_p} u^p_{i_p}.$$

These need not be the maximizer; however, we do assume that we have solved the above minimization problem optimally to evaluate $\Phi_{N-k+1}(u^{k+2}, \ldots, u^N)$. Just as in the definition of the recovery problem discussed earlier, let $\{(l_k(l_{k+1}), i_{k+1}(l_{k+1}))\}_{l_{k+1}=0}^{L_{k+1}}$ be an enumeration of indices $\{l_k, i_{k+1}\}$ of the optimal solution $w^2$ of problem (4.10) (or the first 2 indices of the solution $w^{N-k+1}$ of the relaxed problem (4.8) constructed in equation (4.11)) such that $w_{l_k(l_{k+1}), i_{k+1}(l_{k+1})}^2 = 1$ for $(l_k(l_{k+1}), i_{k+1}(l_{k+1})) \ne (0,0)$ and $(l_k(l_{k+1}), i_{k+1}(l_{k+1})) = (0,0)$ for $l_{k+1} = 0$ regardless of whether $w_{00}^2 = 1$ or not.

Then, the final value of the objective function can be expressed as $$\phi_{N-k+1}(u^{k+2}, \ldots, u_N) \equiv \text{Minimize } \phi_{N-k+1}(z^{N-k+1}; u^{k+2}, \ldots, u^N) \quad (4.32)$$

Subject to $\sum_{i_{k+2} \cdots i_N} z^{N-k-1}_{l_k(l_{k+1}) i_{k+1}(l_{k+1}) i_{k+2} \cdots i_N} = 1, l_{k+1} = 1, \ldots, L_{k+1},$ where $$\phi_{n-k+1}(z^{N-k+1}; u^{k+2}, \ldots, u^N) = \quad (4.33)$$

$$\sum_{l_{k+1} i_{k+2} \cdots i_N} \left[ c^{N-k+1}_{l_k(l_{k+1}) i_{k+1}(l_{k+1}) i_{k+2} \cdots i_N} + \sum_{p=k+2}^{N} u^p_{i_p} \right]$$

$$z^{N-k+1}_{l_k(l_{k+1}) i_{k+1}(l_{k+1}) i_{k+2} \cdots i_N} - \sum_{p=k+2}^{N} \sum_{i_p=0}^{M_p} u^p_{i_p}.$$

If now another constrain set, say the $(k+2)^{th}$ set, is added to this problem, one has $$\tilde{\phi}_{N=k+1}(u^{k+2}, \ldots u^N) \equiv \text{Minimize } \tilde{\phi}_{N-k+1}(z^{N-k+1}; u^{k+2}, \ldots, u^N) \equiv \quad (4.34)$$

$$\text{Minimize} \sum_{l_{k+1} k+2 \cdots i_N} \left\{ c^{N-k+1}_{l_k(l_{k+1}) i_{k+1}(l_{k+1}) \cdots i_N} + \sum_{p=k+2}^{N} u^p_{i_p} \right\}$$

$$z^{N-k+1}_{l_k(l_{k+1}) i_{k+1}(l_{k+1}) \cdots i_N} - \sum_{p=k+2}^{N} \sum_{i_p=0}^{M_p} \sum_{p=k+2}^{N} u^p_{i_p}$$

Subject to $\sum_{i_{k+2} \cdots i_N} z^{N-k-1}_{l_k(l_{k+1}) i_{k+1}(l_{k+1}) i_{k+2} \cdots i_N} = 1, l_{k+1} = 1, \ldots,$ $L_{k+1}, \sum_{l_{k+1} i_{k+3} \cdots i_N} z^{N-k-1}_{l_k(l_{k+1}) i_{k+1}(l_{k+1}) i_{k+2} \cdots i_N} = 1, i_{k+2} = 1, \ldots, M_{k+2}.$ Since the constraint $$\sum_{l_{k+1} i_{k+3} \cdots i_N} z^{N-k-1}_{l_k(l_{k+1}) i_{k+1}(l_{k+1}) i_{k+2} \cdots i_N} = 1$$

for $i_{k+2} = 1, \ldots, M_{k+2}$ is now imposed, the feasible region is smaller, so that one has $$\phi_{N-k+1}(u^{k+2}, \ldots, u^N) \leq \tilde{\phi}_{N-k+1}(u^{k+2}, \ldots, u^N)$$

$$\equiv \phi_{N-k+1}(u^{k+3}, \ldots, u^N)$$

$$\equiv \phi_{N-k+1}(u^{k+3}, \ldots, u^N),$$

where the fact that $\Phi_{N=k+1}$ does not depend on the multiplier set $u^{k+2}$ due the added constraint set. Also, the last equivalence follows from the fact that $\Phi_{N=k+1}(u^{k+3}, \ldots, u^N)$ is the relaxed problem (with k replaced by k+1) for the recovery problem in step k of the above algorithm. Continuing this way, one can compute $(u^3, \ldots, u^N)$ at the first step (k=1), fix them thereafter, and perform no optimization at the subsequent steps to obtain $$\Phi_N(u^3, \ldots, u^N) \leq \Phi_{N-1}(u^4, \ldots, u^N) \leq \ldots \leq \Phi_3(u^N) \leq \Phi_2 = V_N(\hat{z}),$$

where $\Phi_2$ is defined in (4.22).

To explain how to improve this inequality, let $(u^{2+k,N-k+1}, \ldots, u^{N,N-k+1})$ denote a maximizer of $\Phi_{N-k+1}$ $(u^{k+2}, \ldots, u^N)$. Then by the same reasoning one has the result as stated in the theorem.

V. Summary of the Lagrangian Relaxation Problem

Given the multidimensional assignment problem $$\text{Minimize} \sum_{i_1 \ldots i_N} c_{i_1 \ldots i_N} z_{i_1 \ldots i_N} \quad (5.1)$$

$$\text{Subject To} \sum_{i_2 i_3 \ldots i_N} z_{i_1 \ldots i_N} = 1 \ (i_1 = 1, \ldots M_1),$$

$$\sum_{i_1 i_3 \ldots i_N} z_{i_1 \ldots i_N} = 1 \ (i_2 = 1, \ldots M_2),$$

$$\sum_{i_1 \ldots i_{p-1} i_{p+1} \ldots i_N} z_{i_1 \ldots i_N} = 1$$

$$(i_p = 1, \ldots M_p \text{ and } p = 2, \ldots, N-1),$$

$$\sum_{i_1 i_2 \ldots i_{N-1}} z_{i_1 \ldots i_N} = 1, \ (i_N = 1, \ldots M_N),$$

$$z_{i_1 \ldots i_N} \in \{0, 1\} \text{ for all } i_1, \ldots i_N,$$

where $c_{0 \ldots 0}{}^N$ is arbitrarily defined to be zero and is included for notational convenience and where the superscript N on both c and z is not an exponent, but denotes the dimension of the subscripts and the assignment problem as stated in (3.5). In relaxed and recovery problems $c_{0 \ldots 0}{}^N$ need not be zero! In this problem, we assume that all zero-one variables $z_{i_1 \ldots i_N}$ with precisely one nonzero index are free to be assigned and that the corresponding cost coefficients are well-defined. (This is a valid assumption in the tracking environment (A. B. Poore. Multidimensional assignments and multitarget tracking, partitioning data sets, I. J. Cox, P. Hansen, and B. Julesz, editors, *DIMACS Series in Discrete Mathematics and Theoretical Computer Science, American Mathematical Society*, Providence, R.I., 19:169–198, 1995; A. B. Poore. Multidimensional assignment formulation of data association problems arising from multitarget tracking and multisensor data fusion. *Computational Optimization and Applications*, 3:27–57, 1994).) Although not required, these cost coefficients with exactly one nonzero index can be translated to zero by cost shifting (A. B. Poore and N. Rijavec. A lagrangian relaxation algorithm for multidimensional assignment problems arising from multitarget tracking. *SIAM Journal of Optimization*, 3, No. 3:544–563, 1993) without changing the optimal assignment.

Having explained many of the relaxation features, it is now appropriate to present the Lagrangian relaxation algorithm, which iteratively constructs a feasible solution to the N-dimensional assignment problem (5.1).

Algorithm 5.1 (Lagrangian Relaxation Algorithm) To construct a high quality feasible solution, denoted by $\hat{z}^N$, of the assignment problem (5.1), proceed as follows: 0. Initialize the multipliers $(u^{k+2}, \ldots, u^N)$, e.g., $(u^{k+2}, \ldots, u^N) = (0, \ldots, 0)$.

For k=1, ..., N−2, do

1. For the Lagrangian relaxed problem (4.8) from the problem (4.7) by relaxing the last (N−k−1) sets of constraints.

2. Use a nonsmooth optimization technique to solve

Maximize $\{\Phi_{N-k+1}|u^p \in \mathbb{R}^{M_p+1} \text{ for } p=k+2, \ldots, N \text{ with } u_0^p=0 \text{ being fixed}\}$, (5.2)

where $\Phi_{N-k+1}(u^{k+2}, \ldots, u^N)$ is defined by equation (4.8). The algorithm in Section IV.3.2 provides one method for computing a function value and a subgradient out of the subdifferential at $(u^{k+2}, \ldots, u^N)$, as required in most nonsmooth optimization techniques.

3. Given an approximate or optimal maximizer of (5.2), say $(\hat{u}^{k+2}, \ldots, \hat{u}^N)$, let $\hat{w}^2$ denote the optimal solution of the two-dimensional assignment problem (4.10) corresponding to this maximizer of $\Phi_{N-k+1}(u^{k+2}, \ldots, u^N)$.

4. Formulate the recovery (N−k)-dimensional problem (4.19), modified as discussed at the end of subsection IV.3.3 for sparse problems. At this stage, $\hat{z}^N$, as defined in (4.21), contains the alignment of the indices $\{i_1, \ldots, i_{k+1}\}$.

Formulate the final two-dimensional problem (4.22) and complete the final recovered solution $Z^N$ as in (4.25).

To explain the lower and upper bounds, let $\Phi_N$ be as defined in (4.8) with k=1, let $V_N(z^N)$ be the objective function value of the N-dimensional assignment problem in equation (3.5) corresponding to a feasible solution $z^N$ of the constraints in (3.5), and let $\bar{z}^{N-k+1}$ be an optimal solution of (3.5). Then, $$\Phi_N(u^3, \ldots, u^N) \leq V_N(\bar{z}^N) \leq V_N(\hat{z}^N) \quad (5.3)$$

is the desired inequality.

Comments

1. Step 2 is the computational part of the algorithm. Evaluating $\Phi_{N-k+1}$ and computing a subgradient used in the search procedure requires 99% of the computing time in the algorithm. This part uses two-dimensional assignment algorithms, a search over a large number of indices, and a nonsmooth optimization algorithm. It is the second part (the search) that consumes 99% of the computational time and this is almost entirely parallelizable.

2. In track maintenance, the warm starts for the initial multipliers for the first step are available. For the relaxation procedure, initial multipliers are available in step 2 from the prior step in the algorithm.

3. There are many variations on the above algorithm. For example, one can compute a good solution on the first pass (k=1) and not perform the optimization in (2) thereafter. This yields a great solution. Thus one can continue the optimization at the first pass, and immediately compute quality feasible solutions to the problem.

VI. Lagrangian Relaxation Algorithm for the Three-Dimensional Algorithm

In this section, we illustrate the relaxation algorithm for the three-dimensional assignment problem. Having discussed the general relaxation scheme, $$\text{Minimize} \sum_{i_1=0}^{M_1} \sum_{i_2=0}^{M_2} \sum_{i_3=0}^{M_3} c_{i_1 i_2 i_3} z_{i_1 i_2 i_3} \qquad (6.1)$$

$$\text{Subject To} \sum_{i_2=0}^{M_2} \sum_{i_3=0}^{M_3} z_{i_1 i_2 i_3} = 1, i_1 = 1, \ldots, M_1,$$

$$\sum_{i_1=0}^{M_1} \sum_{i_3=0}^{M_3} z_{i_1 i_2 i_3} = 1, i_2 = 1, \ldots, M_2,$$

$$\sum_{i_1=0}^{M_1} \sum_{i_2=0}^{M_2} z_{i_1 i_2 i_3} = 1, i_3 = 1, \ldots, M_3,$$

$$z_{i_1 i_2 i_3} \in \{0, 1\} \text{ for all } i_1 i_2 i_3.$$

To ensure that a feasible solution of (6.1) always exists for a sparse problem, all variables with exactly one nonzero index (i.e., variables of the form $z_{i_p 00}, z_{0 i_p 0}$, and $z_{00 i_p}$ for $i_p 1, \ldots, M_p$ and p=1,2,3 are assumed free to be assigned with the corresponding cost coefficients being well-defined). This assumption is valid in the tracking environment (A. B. Poore. Multidimensional assignments and multitarget tracking, partitioning data sets, I. J. Cox, P. Hansen, and B. Julesz, editors, *DIMACS Series in Discrete Mathematics and Theoretical Computer Science, American Mathematical Society*, Providence, R.I., 19:169–198, 1995; A. B. Poore. Multidimensional assignment formulation of data association problems arising from multitarget tracking and multisensor data fusion. *Computational Optimization and Applications*, 3:27–57, 1994).

VI.1. The Lagrangian Relaxed Assignment Problem

The three-dimensional assignment problem (6.1) has three sets of constraints and one can describe the relaxation by relaxing any of the three sets of constraints, the description here is based on relaxing the last set of constraints. A $(M_3+1)$-dimensional multiplier vector (i.e., $u^3 \in \mathbb{R}^{M_3+1}$) associated with the $3^{rd}$ constraint set will be denoted by $u^3 = (u_0^3, u_1^3, \ldots, u_{M_3}^3)^T$ with $u_0^3 \equiv 0$ being fixed for notational convenience. (The zero multiplier $u^3 = 0$ is used for notational convenience.) Now, the three-dimensional assignment problem (6.1) is relaxed to a two-dimensional assignment problem by incorporating last set of constraints into the objective function via the Lagrangian. Although any constraint set can be relaxed, we choose the last set of constraints for convenience. The relaxed problem is $$\phi_3(u^3) \equiv \text{Minimize } \phi_3(z^3; u^3) \qquad (6.2)$$

$$\equiv \sum_{i_1=0}^{M_1} \sum_{i_2=0}^{M_2} \sum_{i_3=0}^{M_3} c_{i_1 i_2 i_3}^3 z_{i_1 i_2 i_3}^3 +$$

$$\sum_{i_3=0}^{M_3} u_{i_3}^3 \left[ \sum_{i_1=0}^{M_1} \sum_{i_2=0}^{M_2} z_{i_1 i_2 i_3}^3 - 1 \right]$$

$$\equiv \text{Minimize} \sum_{i_1=0}^{M_1} \sum_{i_2=0}^{M_2} \sum_{i_3=0}^{M_3} [c_{i_1 i_2 i_3}^3 + u_{i_3}^3] z_{i_1 i_2 i_3}^3 - \sum_{i_3=0}^{M_3} u_{i_3}^3$$

$$\text{Subject To} \sum_{i_2=0}^{M_2} \sum_{i_3=0}^{M_3} z_{i_1 i_2 i_3}^3 = 1, i_1 = 1, \ldots, M_1,$$

$$\sum_{i_1=0}^{M_1} \sum_{i_3=0}^{M_3} z_{i_1 i_2 i_3}^3 = 1, i_2 = 1, \ldots, M_2.$$

One of the major steps in the algorithm is the maximization of $\Phi_3(u^3)$ with respect to the multiplier vector $u^3$. It turns out that $\Phi_3$ is a concave, continuous, and piecewise affine function of the multiplier vector $u^3$, so that the maximization of $\Phi_3$ is a problem of nonsmooth optimization. Since many of these algorithms require a function value and a subgradient of $\Phi_3$ at any required multiplier value ($u^3$), we address this problem in the next subsection. We note, however, that there are other ways to maximize $\Phi_3$ and the next subsection addresses but one such method.

VI.2. Properties Lagrangian Relaxed Assignment Problem

For a function evaluation of $\Phi_3$, we show that an optimal (or suboptimal) solution of this relaxed problem (6.2) can be constructed from that of a two-dimensional assignment problem. Then, the nonsmooth characteristics of $\Phi_3$ are addressed, followed by a method for computing a subgradient.

Evaluation of $\Phi_3$. Define for each $(i_1, i_2)$ an index $j_3 = j_3(i_1, i_2)$ and a new cost function $c_{i_1 i_2}^2$ by:

$$j_3 \equiv j_3(i_1, i_2) = \arg \min \{c_{i_1 i_2 i_3}^3 + u_{i_3}^3 \mid i_3 = 0, 1, \ldots, M_3\}, \qquad (6.3)$$

$$c_{i_1 i_2}^2 = c_{i_1 i_2 j_3(i_1 i_2)}^3 + u_{i_3}^3 \text{ for } (i_1 i_2) \neq (0, 0),$$

$$c_{00}^2 = \sum_{i_3=0}^{M_3} \text{Minimum}\{0, c_{00 i_3}^3 + u_{i_3}^3\}.$$

Given an index pair $(i_1, i_2)$, $j_3$ need not be unique, resulting in the potential generation of several subgradients (6.11). (We further discuss this issue at the end of the Subsection.) Now, define $$\hat{\phi}_3(u^3) = \text{Minimize } \hat{\phi}_3(z^2; u^3) \equiv \sum_{i_1=0}^{M_1} \sum_{i_2=0}^{M_2} c_{i_1 i_2}^2 z_{i_1 i_2}^2 - \sum_{i_3=0}^{M_3} u_{i_3}^3. \qquad (6.4)$$

$$\text{Subject To} \sum_{i_2=0}^{M_2} z_{i_1 i_2}^2 = 1, i_1 = 1, \ldots, M_1,$$

$$\sum_{i_1=0}^{M_1} z_{i_1 i_2}^2 = 1, i_2 = 1, \ldots, M_2.$$

$$z_{i_1 i_2}^2 \in \{0, 1\} \text{ for all } i_1, i_2.$$

As an aside, two observations are in order. The first is that the search procedure needed for the computation of the relaxed cost coefficients in (6.3) is the most computationally intensive part of the entire relaxation algorithm. The second is that a feasible solution $z^3$ of a sparse problem (6.1) yields a feasible solution $z^2$ of (6.4) via the construction $$z_{i_1 i_2}^2 = \begin{cases} 1, & \text{if } z_{i_1 i_2 i_3}^3 = 1 \text{ for some } (i_1, i_2, i_3), \\ 0, & \text{otherwise.} \end{cases}$$

Thus the two-dimensional assignment problem (6.4) has feasible solutions other than those with exactly one nonzero index if the original problem (6.1) does.

The following Theorem 6.1 states that an optimal solution of (6.2) can be computed from that of (6.4). Furthermore, if the solution of either of these two problems is $\epsilon$-optimal, then so is the other. The converse is contained in Theorem 6.2.

Theorem 6.1. Let $w^2$ be a feasible solution to the two-dimensional assignment problem (6.4) and define $w^3$ by $w_{i_1 i_2 i_3}^3 = w_{i_1 i_2}^2$ if $i_3 = j_3$ and $(i_1, i_2) \neq (0, 0)$, $w_{i_1 i_2 i_3}^3 = 0$ if $i_3 \neq j_3$ and $(i_1, i_2) \neq (0, 0)$, $w_{00i_3}^3 = 1$ if $c_{00i_3}^3 + u_{i_3}^3 \leq 0$, $w_{00i_3}^3 = 0$ if $c_{00i_3}^3 + u_{i_3}^3 > 0$. (6.5)

Then $w^3$ is a feasible solution of the Lagrangian relaxed problem (6.2) and $\phi_3(w^3;u^3) = \hat{\phi}_3(w^2;u^3)$. If, in addition, $w^2$ is optimal for the two-dimensional problem, then $w^3$ is an optimal solution of the relaxed problem and $\Phi_3(u^3) = \hat{\Phi}_3(u^3)$.

With the exception of one equality being converted to an inequality, the following theorem is a converse of Theorem 6.1.

Theorem 6.2. Let $w^3$ be a feasible solution to problem (6.2) and define $w^2$ by $$w_{i_1 i_2}^2 = \sum_{i_3=0}^{M_3} w_{i_1 i_2 i_3}^3 \text{ for } (i_1, i_2) \neq (0, 0), \quad (6.6)$$

$w_{00}^2 = 0$ if $(i_1, i_2) = (0, 0)$ and $c_{00i_3}^3 + u_{i_3}^3 > 0$ for all $i_3$, $w_{00}^2 = 1$ if $(i_1, i_2) = (0, 0)$ and $c_{00i_3}^3 + u_{i_3}^3 \leq 0$ for some $i_3$.

Then $w^2$ is a feasible solution of the problem (6.4) and $\phi_3(w^3;u^3) \leq \hat{\phi}_3(w^2;u^3)$. If, in addition, $w^3$ is optimal for (6.2), then $w^2$ is an optimal solution of (6.4), $\phi_3(w^3;u^3) = \hat{\phi}_3(w^2;u^3)$ and $\Phi_3(u^3) = \hat{\Phi}_3(u^3)$.

An Algorithm for Computing $\Phi_3$ and a Subgradient

Given $u^3$ the problem of computing $\Phi_3(u^3)$ and a subgradient of $\Phi_3(u^3)$ can be summarized as follows.

1. Starting with problem (6.1), form the relaxed problem (6.2).
2. To solve (6.2) optimally, define the two-dimensional assignment problem (6.4) via the transformation (6.3).
3. Solve the two-dimensional problem (6.4) optimally.
4. Reconstruct the optimal solution, say $\hat{w}^3$, of (6.2) via equation (6.5) as in Theorem 6.1.
5. Then $$\phi_3(u^3) \equiv \phi_3(\hat{w}^3; u^3) = \sum_{i_1=0}^{M_1} \sum_{i_2=0}^{M_2} \sum_{i_3=0}^{M_3} c_{i_1 i_2 i_3}^3 \hat{w}_{i_1 i_2 i_3}^3 + \quad (6.7)$$

$$\sum_{i_3=0}^{M_3} u_{i_3}^3 \left[ \sum_{i_1=0}^{M_1} \sum_{i_2=0}^{M_2} \hat{w}_{i_1 i_2 i_3}^3 - 1 \right].$$

6. A subgradient is given by substituting $\hat{w}^3$ into the objective function (6.2), erasing the minimum sign, and taking the partial with respect to $u_{i_3}^3$. The result is $$g_{i_3}^3 = \frac{\partial \phi_3(u^3)}{\partial u_{i_3}^3} = \left[ \sum_{i_1=0}^{M_1} \sum_{i_2=0}^{M_2} \hat{w}_{i_1 i_2 i_3}^3 - 1 \right] \text{ for } i_3 = 1, \ldots, M_3. \quad (6.8)$$

VI.3. The Recovery Procedure

The next objective is to explain a recovery procedure, i.e., given a feasible (optimal or suboptimal) solution $w^2$ of (6.4) (or $w^3$ of (6.2) constructed in Theorem 6.1), generate a feasible solution $z^3$ of equation (6.1) which is close to $w^2$ in a sense to be specified. We first assume that no variables in (6.1) are preassigned to zero; this assumption will be removed shortly. The difficulty with the solution $w^3$ in Theorem 6.1 is that it need not satisfy the third set of constraints in (6.1). (Note, however, that if $w^2$ is an optimal solution for (6.4) and $w^3$, as constructed in Theorem 6.1, satisfies the relaxed constraints, then $w^3$ is optimal for (6.1).) The recovery procedure described here is designed to preserve the 0–1 character of the solution $w^2$ of (6.4) as far as possible: If $w_{i_1 i_2}^2 = 1$ and $i_1 \neq 0$ or $i_2 \neq 0$, the corresponding feasible solution $z^3$ of (6.1) is constructed so that $z_{i_1 i_2 i_3}^3 = 1$ for some $(i_1, i_2, i_3)$. By this reasoning, variables of the form $z_{00i_3}^3$ can be assigned a value of one in the recovery problem only if $w_{00}^2 = 1$. However, variables $z_{00i_3}^3$ will be treated differently in the recovery procedure in that they can be assigned either zero or one independent of the value $w_{00}^2$. This increases the feasible set of the recovery problem, leading to a potentially better solution.

Let $\{(i_1(l_2), i_2(l_2))\}_{l_2=0}^{L_1}$ be an enumeration of indices $\{i_1, i_2\}$ of $w^2$ (or the first 2 indices of $w^3$ constructed in equation (6.5)) such that $w_{i_1(l_2), i_2(l_2)}^2 = 1$ for $(i_1(l_2), i_2(l_2)) \neq (0,0)$ and $(i_1(l_2), i_2(l_2)) = (0,0)$ for $l_2 = 0$ regardless of whether $w_{00}^2 = 1$ not. (The latter can only improve the quality of the feasible solution.)

Next to define the two-dimensional assignment problem that restores feasibility, let $$c_{l_2 i_3}^2 = c_{i_1(l_2)i_2(l_2)i_3}^3 \text{ for } l_2 = 0, \ldots L_1. \quad (6.9)$$

Then the two-dimensional assignment problem that restores feasibility is $$\text{Minimize } \sum_{l_2=0}^{L_2} \sum_{i_3=0}^{M_3} c_{l_2 i_3}^2 z_{l_2 i_3}^2 \quad (6.10)$$

$$\text{Subject to } \sum_{i_3=0}^{M_3} z_{l_2 i_3}^2 = 1, l_2 = 1, \ldots, L_2,$$

$$\sum_{l_2=0}^{L_2} z_{l_2 i_3}^2 = 1, i_3 = 1, \ldots, M_3,$$

$$z_{l_2 i_3}^2 \in \{0, 1\} \text{ for all } l_2, i_3.$$

The next objective is to remove the assumption that all cost coefficients are defined and all zero-one variables are free to be assigned. We first note that the above construction of a reduced two-dimensional assignment problem (6.11) is valid as long as all cost coefficients $c^2$ are defined and all zero-one variables in $z^2$ are free to be assigned. Modifications are necessary for sparse problems. If the cost coefficient $c_{i_1(l_2)i_2(l_2)i_3}^3$ is well-defined and the zero-one variable $z_{i_1(l_2)i_2(l_2)i_3}^3$ is free to be assigned to zero or one, then define $c_{l_2 i_3}^2 = c_{i_1(l_2)i_2(l_2)i_3}^3$ as in (6.9) with $z_{i_1(l_2)i_2(l_2)i_3}^3$ being free to be assigned. Otherwise, $z_{l_2 i_3}^2$ preassigned to zero or the corresponding arc is not allowed in the feasible set of arcs. To ensure that a feasible solution exists, we now only need ensure that the variables $z_{l_2 0}^2$ are free to be assigned for $l_2 = 0, 1, \ldots, L_1$ with the corresponding cost coefficients being well-defined. Recall that all variables of the form $z_{i_1 00}^3$, $z_{0i_2 0}^3$ and $z_{00i_3}^3$ are free (to be assigned) and all coefficients of the corresponding form $c_{i_1 00}^3$, and $c_{0i_2 0}^3$ and $c_{00i_3}^3$ need to be defined. This is accomplished as follows: if the cost coefficient $c_{i_1(l_2)i_2(l_2)0}^3$ is well-defined and $z_{i_1(l_2)i_2(l_2)0}^3$ is free, then define $c_{l_2 0}^2 = c_{i_1(l_2)i_2(l_2)0}^3$ with $z_{l_2 0}^2$ being free. Otherwise, since all variables of the form $z_{i_1 0}^3$ and $z_{0i_2 0}^3$ are free to be assigned with the corresponding costs being well-defined, set $c_{l_2 0}^2 = c_{i_1(l_2)00}^3 + c_{0i_2(l_2)0}^3$, where the first term is omitted if $i_1(l_2) = 0$ and the second, if $i_2(l_2) = 0$. For $i_1(l_2) = 0$ and $i_2(l_2) = 0$, define $c_{00}^2 = c_{000}^3$.

VI.4. The Final Recovery Problem

The recovery problem for the case N=3 is $$\text{Minimize} \sum_{l_2=0}^{L_2} \sum_{i_3=0}^{M_3} c_{l_2 i_3}^2 z_{l_2 i_3}^2 \tag{6.11}$$

$$\text{Subject to } \sum_{i_3=0}^{M_3} z_{l_2 i_3}^2 = 1, l_2 = 1, \ldots, L_2,$$

$$\sum_{l_2=0}^{L_2} z_{l_2 i_3}^2 = 1, i_3 = 1, \ldots, M_3,$$

$$z_{l_2 i_3}^2 \in \{0, 1\} \text{ for all } l_2, i_3.$$

Let Y be an optimal or feasible solution to this two-dimensional assignment problem. The recovered feasible solution $z^3$ is defined by $$z_{i_1 i_2 i_3}^3 = \begin{cases} 1, & \text{if } i_1 = i_1(l_2), i_2 = i_2(l_2) \text{ and } Y_{l_2 i_3} = 1, \\ 0, & \text{otherwise.} \end{cases} \tag{6.12}$$

Said in another way, let $\{(l_2(l_3), i_3(l_3))\}_{l_3=0}^{L_3}$ be an enumeration of indices $\{l_2, i_3\}$ of Y such that $Y_{l_2(l_3), i_3(l_3)} = 1$ for $(l_2(l_3), i_3(l_3)) \neq (0,0)$ and $(l_2(l_3) i_3(l_3)) = (0,0)$ for $l_3 = 0$ regardless of whether $Y_{00} = 1$ or not. Then the recovered feasible solution can be written as $$\hat{z}_{i_1 i_2 i_3}^3 = \begin{cases} 1, & \text{if } i_1 = i_1(l_{12}), i_2 = i_2(l_{12}), i_3 = 1_3(l_3), \\ 0, & \text{otherwise.} \end{cases} \tag{6.13}$$

The upper bound on the feasible solution is given by $$V_3(\hat{z}^3) = \sum_{i_1=0}^{M_1} \sum_{i_2=0}^{M_2} \sum_{i_3=0}^{M_3} c_{i_1 i_2 i_3}^3 \hat{z}_{i_1 i_2 i_3}^3 \tag{6.14}$$

and the lower by $\Phi_3(u^3)$ for any multiplier value $(u^3)$.

In particular, we have $$\Phi_3(u^3) \leq \Phi_3(\bar{u}^3) \leq V_3(\bar{z}^3) \leq V_3(\hat{z}^3),$$

where $u^3$ is any multiplier value, $\bar{u}^3$ is a maximizer of $\Phi_3(u^3)$, $\bar{z}^3$ is an optimal solution of the multidimensional assignment problem and $\hat{z}^3$ is the recovered feasible solution defined by (6.13).

VII. Other Relaxations for the Multidimentional Assignment Problem

In this section, we briefly describe other possible relaxations and their implications. These include linear programming relaxations and the corresponding duals.

Recall from Section II that one starts with the definition of the zero-one variable $z_{i_N \ldots i_N} = 1$ and cost coefficients to form the problem $$\text{Minimize} \sum_{i_1 \ldots i_N} c_{i_1 \ldots i_N} z_{i_1 \ldots i_N} \tag{7.1}$$

Subject To $\sum_{i_2 i_3} z_{i_1 \ldots i_N} = 1 \ (i_1 = 1, \ldots, M_1),$ $$\sum_{i_1 i_3} z_{i_1 \ldots i_N} = 1 \ (i_2 = 1, \ldots, M_2),$$

$$\sum_{i_1 \ldots i_{p-1} i_{p+1} \ldots i_N} z_{i_1 \ldots i_N} = 1$$

$(i_p = 1, \ldots, M_p \text{ and } p = 2, \ldots, N-1),$ $$\sum_{i_1 i_2 \ldots i_{N-1}} z_{i_1 \ldots i_N} = 1 \ (i_N = 1, \ldots, M_N),$$

$z_{i_1 \ldots i_N} \in \{0, 1\} \text{ for all } i_1, \ldots, i_N,$ where $c_{0 \ldots 0}$ is arbitrarily defined to be zero. Here, each group of sums in the constraints represents the fact that each non-dummy report occurs exactly once in a "track of data". One can modify this formulation to include multiassignments of one, some, or all the actual reports. The assignment problem (3.5) is changed accordingly. For example, if $z_{i_k}^k$ is to be assigned no more than, exactly, or no less than $n_{i_k}^k$ times, then the "=1" in the constraint (3.5) is changed to "$\leq$, =, $\geq n_{i_k}^k$," respectively. Modifications for group tracking and multiresolution features of the surveillance region will be addressed in future work. In making these changes, one must pay careful attention to the independence assumptions that need not be valid in many applications.

Again, the recent work of Poore and Drummond (A. B. Poore and O. E. Drummond. Track initiation and maintenance using multidimentional assignment problems. In D. W. Hearn, W. W. Hager, and P. M. Pardalos, editors, *Network Optimization*, volume 450, pages 407–422, Boston, 1996. Kluwer Academic Publishers B. V.) significantly extends the formulation of the track maintenance and initiation to new approaches. The discussions of this section apply equally to those formulations.

VII.1. The Linear Programming Relaxation

In the linear programming relaxation, one replaces the zero-one variables constraints $$z_{i_1 \ldots i_N} \in \{0,1\} \text{ for all } i_1, \ldots, i_N \tag{7.2}$$

with the constraint $$0 \leq z_{i_1 \ldots i_N} \leq 1 \text{ for all } i_1, \ldots, i_N. \tag{7.3}$$

Then, the problem (7.1) can be formulated as a linear programming problem with the constraint (7.2) in (7.1) replaced by (7.3) with a special block structure to which the Dantzing-Wolfe decomposition is applicable. Of course, after solving this problem, one must now recover the zero-one character of the variables in (7.1) and there are many ways to do this, such as using the two-dimensional assignment problems. Commercial software is also available.

VII.2. The Linear Programming Dual and Partial Lagrangian Relaxations

Given the linear programming relaxation, one can formulate the dual problem or the partial Lagrangian relaxation duals with respect to any number of constraints. In particular, this is precisely what is done in Section 3 on the Lagrangian relaxation algorithm presented. The much broader class of algorithms provided in the U.S. Pat. No. 5,537,119 (Aubrey B. Poore, Jr., Method and System for Tracking Multiple Regional Objects by Multi-Dimensional Relaxation, U.S. Pat. No. 5,537,119, filed Mar. 14, 1995, issue date of Jul. 16, 1996) can be modified to remove the zero-one character when one relaxes M sets of constraints to an (N–M)-dimensional problem and recovers with an (N−M+1)-dimensional problem. This avoids the problems associated with the NP-hard (N−M)- and (N−M+1)-dimensional problems. However, to restore the zero-one character, one can do it sequentially with an assignment problem or with one of the many zero-one rounding techniques. These formulations are easy to work out and thus the details are omitted.

The complete dual problem is another way of solving the LP problem and may indeed be more efficient in certain applications. In addition, the solution of this dual problem may provide excellent initial approximations to the multipliers for Lagrangian relaxations.

VIII. Hot Starts for Track Maintenance and Initiation: Bundle Modifications

Thus reuse of multipliers and the first proof that this reuse is actually valid was presented in this section. The reuse in track maintenance is demonstrated and discussed in the work of Poore and Drummond (A. B. Poore and O. E. Drummond. Track initiation and maintenance using multidimensional assignment problems. In D. W. Hearn, W. W. Hager, and P. M. Pardalos, editors, *Network Optimization*, volume 450, pages 407–422, Boston, 1996. Kluwer Academic Publishers B.V.). The only item left is the modification of the bundle of subgradients for the use with the multiplier values as one goes through the recovery problem as in Section IV.3.6 or as one moves the window in track maintenance. It is this aspect of the nonsmooth optimization that adds an order of magnitude to the speed of the algorithms. This work is based on both a mathematical proof as in Section IV.3.6 as well as computational experience and heuristics.

IX. Adaptive and Variable Window Size Selection

These data association algorithms, based on the multidimensional assignment problem, range from sequential processing to many frames of data processed all at once! The data association problem for multisensor-multitarget tracking is formulated using a window sliding over the frames of data from the sensors. This discussion focuses on the work of Poore and Drummond and not on the formulations in Section III. Firm data association decisions for existing track are made at, say frame k, with the most recent frame being k+M. Decisions after frame k are soft decisions. Reports not in the confirmed tracks are used to initiate tracks over frames numbered k−I to k+M.

The length of these windows varies from sequential processing, which corresponds precisely to I=0 and M=1, to user defined large values of I and M. There is a marked change in performance over this range. As the two windows become exceedingly long, there is little statistically significant information gained and indeed performance can degenerate slightly. Thus, one must manually find the correct window lengths for performance in a given scenario and the algorithms do not change for a changing environment. Thus we propose an adaptive method for adjusting the window lengths. (The method has been highly successful for selecting the correct window length for multistep methods in ordinary differential equations.)

1. Compute the solution for different window lengths that overlap and differ by one or two frames.
2. Compare the solution quality, i.e., the value of the objective function, for two adjacent window lengths.
3. If there is a predefined improvement in either direction, we then, for stability, repeat the exercise for a shorter or longer on the first try. If there is consistent information, we adjust the window size in the indicated direction. This can be given a well defined mathematical formula in terms of the assignment problems of different dimensions.

X. Sensitivity Analysis

For sequential processing in which the two-dimensional assignment algorithm is used, one can use the LP sensitivity analysis theory and easily obtain the corresponding answers. For the multiframe processing, the optimal solution is not available; however, there are still two approaches one can use. First, the basic algorithm can perform the same sensitivity analysis at each stage (loop) of the algorithm as is done in the two-dimensional assignment problem since the evaluation of function $\Phi_{N-k+1}$ is equivalent to a two-dimensional assignment problem. Alternately, one could use an LP relaxation of the assignment problem and base the sensitivity on the resulting LP problem. We currently see this as an important step in finding even better solutions to the assignment problem if so desired.

XI. New Auction Algorithms

In this section we present a new auction algorithm for the two-dimensional assignment problem.

An important step in solving N-dimensional assignment problems for $N \geq 3$ is finding the optimal solution of the two-dimensional assignment problem. In particular, we wish to solve the two-dimensional problem which includes the zero-index. Typically this problem can be thought of as trying to find either a minimum cost or maximum utility in assigning person to objects, tenants to apartments, or teachers to classrooms. We will follow the work of Bertsekas and call the first index set persons and the second index set objects. The statement of this problem is given below (11.1) when the number of persons is m and the number of objects is n.

$$\text{Minimize} \sum_{i=0}^{m} \sum_{j=0}^{n} c_{ij} x_{ij} \tag{11.1}$$

$$\text{Subject To} \sum_{j=0}^{n} x_{ij} = 1 \text{ for all } i = 1, \ldots, m,$$

$$\sum_{i=0}^{m} x_{ij} = 1 \text{ for all } j = 1, \ldots, n.$$

There are a couple of assumptions which we will make about (11.1). First of all, we assume that $c_{i0}$ and $c_{0j}$ are well-defined and the corresponding variables $x_{i0}$ and $x_{0j}$ are free to be assigned. Second if a cost $c_{ij}$ happens to be undefined, then the corresponding variable $x_{ij}$ will be set to 0. In effect if $c_{ij}$ is undefined, we simply remove this cost and variable from inclusion in the problem.

Notice that there are no constraints on the number of times person 0 and object 0 can be assigned. But notice that the first constraint requires that each non-zero person i must be assigned exactly once. Similarly, the second constraint forces each non-zero object j to be assigned exactly one time. Finally, the last constraint gives an integer solution, although we will see shortly that this constraint can be relaxed to admit any solution $x_{ij} \geq 0$. One reason for requiring that all of the costs of the form $c_{i0}$ and $c_{0j}$ be defined is so that we are guaranteed a feasible solution exists for the given problem.

XI.1. Relaxation of One Constraint

Relaxing the last constraint, we obtain the following problem:

$$\text{Minimize} \sum_{i=0}^{m}\sum_{j=0}^{n} c_{ij}x_{ij} + \sum_{j=0}^{n} u_j^2 \left[\sum_{i=0}^{m} x_{ij} - 1\right] \equiv \sum_{i=0}^{m}\sum_{j=0}^{n}[c_{ij}+u_j^2]x_{ij} - \sum_{j=0}^{n} u_j^2$$

$$\text{Subject to } \sum_{j=0}^{n} x_{ij} = 1 \text{ for all } i = 1, \ldots, m$$

$$x_{ij} \in \{0, 1\}.$$

This lower bound is achieved and the second constraint in the original problem is satisfied if the following conditions are met:

$$\text{For } i = 0, \quad x_{0j} = \begin{cases} 1, & \text{if } c_{0j} + u_j^2 \le 0 \\ 0, & \text{otherwise} \end{cases},$$

$$\text{For } i \ne 0, \quad x_{ij} = \begin{cases} 1, & \text{if } j = arg \min\{c_{ik}+u_k^2 \mid k = 0, 1, \ldots, n\} \\ 0 & \text{otherwise} \end{cases}$$

All of j's are assigned only one time.

The relaxation of the first constraint is analogous and would lead to similar results with i and j exchanged and the introduction of the multiplier $u^1$.

XI.2. Relaxation of Both Constraints

This time we will relax both constraints and use duality theory to obtain a relationship between the multipliers $u^1$ and $u^2$.

Definition: An assignment S and a multiplier set $(u^1, u^2)$ are said to satisfy $\epsilon$-complementary slackness ($\epsilon$-CS) if $c_{ij}+u_i^1+u_j^2=0$ for all $(i,j) \in S$, $c_{ij}+u_i^1+u_j^2 \ge -\epsilon$ for all $(i,j) \in A$,

Forward Auction Algorithm (1) Select any unassigned person i
(2) Determine the following quantities:

$j_i = \arg \min\{c_{ik}+u_k^2 \mid k \in A(i)\}$, $v_i = c_{ij_i}+u_{j_i}^2$, $w_i = \min\{c_{ik}+u_k^2 \mid k \in A(i), k \ne j_i\}$.

In the selection of $j_i$ above, if a tie occurs between 0 and any non-zero index k, then select $j_i$ as k. Otherwise, if there is a tie between two or more non-zero indices, the choice of $j_i$ is arbitrary.
Also if A(i) consists of only one element, then set $w_i = \infty$.

(3) Update the multipliers and the assignment:
If $j_i=0$, then
  (a) Add (i,0) to the assignment.
  (b) Update $u_i^1:=-c_{i0}$.
If $j_1 \ne 0$, then
  (a) Add $(i,j_i)$ to the assignment.
  (b) Remove $(i',j_i)$ from the assignment if $j_i$ was previously assigned.
  (c) Update $u_{j_i}^2:=u_{j_i}^2+(w_i-v_i)+\epsilon=w_i-c_{ij_i}+\epsilon$.
  (d) Update $u_i^1:=-(c_{ij_i}+u_{j_i}^2)=w_i-\epsilon$.

Reverse Auction Algorithm (1) Select any unassigned object j, such that $c_{0j}+u_j^2>0$.
(2) Determine the following quantities:

$i_j = \arg \min\{c_{jk}+u_k^1 \mid k \in B(j)\}$, $\beta_j = c_{i_jj}+u_{i_j}^1$, $\gamma_j = \min\{c_{kj}+u_k^1 \mid k \in B(j), k \ne i_j\}$.

In the selection of $i_j$ above, if a tie occurs between 0 and any non-zero index k, then select $j_i$ as k. Otherwise, if there is a tie between two or more non-zero indices, the choice of $j_i$ is arbitrary.
Also if B(j) consists of only one element, then set $\gamma_j = \infty$.

(3) Update the multipliers and the assignment:
If $i_j=0$, then
  (a) Add (0,j) to the assignment.
  (b) Update $u_j^2:=-c_{0j}$.
if $i_j \ne 0$, then
  (a) Add $(i_j,j)$ to the assignment.
  (b) Remove $(i_j,j')$ from the assignment if $(i_j,j)$ was previously assigned.
  (c) Update $u_{i_j}^1:=u_{i_j}^1+(\gamma_j-\beta_j)+\epsilon=\gamma_j-c_{1_jj}+\epsilon$.
  (d) Update $u_j^2:=-(c_{i_jj}+u_{i_j}^1)=-\gamma_j-\epsilon$.

Combined Forward/Reverse Auction Algorithm

1. Assume that $u^2$ is given as an arbitrary multiplier.
2. Adjust the value of $u^2$ for each object j as follows:

If $c_{0j}+u_j^2<0$, then set $u_j^2:-c_{0j}$.

3. Run iterations of the Forward Auction Algorithm until all persons become assigned.
4. Run iterations of the Reverse Auction Algorithm until all of the objects become assigned.

Note at the completion of the Forward auction step we have the following conditions satisfied:

$c_{0j}+u_j^2 \ge 0$ for all objects j.
$c_{ij}+u_i^1+u_j^2=0$ for all $(i,j) \in S$.

$$c_{ij}+u_j^2 \le \min_k\{c_{ik}+u_k^2\}+\epsilon \text{ for all } (i,j) \in S.$$

Thus we can prove the following proposition.

Proposition: If we assume that $c_{0j}+u_j^2 \ge 0$ at the start of the Forward Auction Algorithm and all of the persons are assigned via a forward step, then we have:

$c_{ij}+u_i^1+u_j^2 \ge -\epsilon$ for all $(i,j) \in A$.

$c_{ij}+u_i^1+u_j^2 = 0$ for all $(i,j) \in S$.

$$c_{ij}+u_j^2 \le \min_k\{c_{ik}+u_k^2\}+\epsilon \text{ for all } (i, j) \in S.$$

Optimality of the Algorithm

Theorem: $\epsilon$-CS preserved during every forward and reverse iteration.

Theorem: If a feasible solution exists, then the resulting solution is with m$\epsilon$ of being optimal for the Combined Forward Reverse Algorithm.

XII. SOME CONCLUDING COMMENTS

Although the algorithm appears to be serial in nature, its primary computational requirements are almost entirely parallelizable. Thus parallelization is planned.

Step 2 is the computational part of the algorithm. Evaluating $\Phi_{N-k+1}$ and computing a subgradient use in the search procedure requires 99% of the computing time in the algorithm. This part uses two-dimensional assignment algorithms, a search over a large number of indices, and a nonsmooth optimization algorithm. It is the second part (the search) that consumes 99% of the computational time and this is almost entirely parallelizable. Indeed, there are two-dimensional assignment solvers that are highly parallelizable. Thus, we need but parallelize the nonsmooth optimization solver to have a reasonably complete parallelization.

If a sensitivity analysis is desired or if one is interested in computing several near-optimal solutions, a parallel processor with a few powerful processors and good communication such as on the Intel Paragon would be most beneficial.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or use of the invention. It is intended that the appended claims be construed to include alternative embodiments of the invention to the extent permitted by the prior art.

What is claimed is:

1. A method for tracking a plurality of objects comprising:

using at least one sensor to repeatedly scan a region containing at least one object and generating a variable number of N frames of said region that provide a plurality of observations associated with said N frames that include information for said at least one object in said N frames;

determining a most probable partition of said observations into tracks and false observations by computing likelihood functions to generate a score to assign a sequence of said observations to a track and by determining a correct combination of said tracks by transforming a binary partitioning problem to a continuous partitioning problem that is solved and from which a binary solution is recovered;

using a sliding window having a length N that encompasses said N frames of said region to allow both provisional and irrevocable data association decisions to be made to assign said observations to said tracks within said sliding window by determining said most probable partition of said observations into said tracks.

2. The method of claim 1 wherein said step of transforming a binary partitioning problem to a continuous partitioning problem further comprises the step of:

$$\text{Minimizing} \sum_{i_1=0}^{M_1} \sum_{i_2=0}^{M_2} \cdots \sum_{i_N=0}^{M_N} c_{i_1 \ldots i_N} z_{i_1 \ldots i_N}$$

Subject To:

$$\sum_{i_2=0}^{M_2} \cdots \sum_{i_N=0}^{M_N} z_{i_1 \ldots i_N} = 1 \text{ for } i_1 = 1, \ldots, M_1$$

-continued $$\sum_{i_1=0}^{M_1} \cdots \sum_{i_{k-1}=0}^{M_{k-1}} \sum_{i_{k+1}=0}^{M_{k+1}} \cdots \sum_{i_N=0}^{M_N} z_{i_1 \ldots i_N} = 1$$

for $i_k = 1, \ldots, M_k$ and $k = 2, \ldots, N-1$ $$\sum_{i_1=0}^{M_1} \cdots \sum_{i_{N-1}=0}^{M_{N-1}} z_{i_1 \ldots i_N} = 1 \text{ for } i_N = 1, \ldots, M_N$$

$z_{i_1 \ldots i_N} \geq 0$ for all $i_1, i_2, \ldots, i_N$ wherein each $c_{i_1 \ldots i_N}$ is included in said plurality of costs, each $M_i$, i=1, . . . ,N, being one of: (a) a number of observations in an $i^{th}$ frame of said N frames; (b) a sum of a number of tracks in said plurality of tracks and a number of said observations in the $i^{th}$ frame not assigned to one of said tracks; (c) a number of tracks in said plurality of tracks; and (d) a number of said observations in the $i^{th}$ frame not assigned to one of said tracks.

3. The method of claim 2 wherein said step of determining a most probable partition further comprises the steps of:

solving said continuous partitioning problem either approximately or optimally for values of for each $z_{i_1 \ldots i_N}$ for each $i_1, \ldots, i_N$ using a dual ascent method;

determining a binary value of $z_{i_1 \ldots i_N}$ in $\{0,1\}$ for each $i_1 \ldots i_N$ corresponding to each $z_{i_1 \ldots i_N}$, wherein said values $z_{i_1 \ldots i_N}$ provide an optimal or near optimal solution to said continuous partitioning problem.

4. The method of claim 2 wherein said step of determining a most probable partition further comprises the steps of:

solving said continuous partitioning problem either approximately or optimally for values of $z_{i_1 \ldots i_N}$ for each $i_1, \ldots, i_N$ using a linear programming algorithm that employs the primal simplex method or interior point method;

determining a binary value of $z_{i_1 \ldots i_N}$ in $\{0,1\}$ for each $i_1 \ldots i_N$ corresponding to each $z_{i_1 \ldots i_N}$ wherein said values $z_{i_1 \ldots i_N}$ provide an optimal or near optimal solution to said continuous partitioning problem.

5. The method of claim 2 wherein said step of determining a most probable partition further comprises the steps of:

solving said continuous partitioning problem either approximately or optimally for values of $z_{i_1 \ldots i_N}$ for each $i_1, \ldots, i_N$ using a Lagrangian relaxation and a non-smooth optimization technique, a dual simplex method, or dual interior point method to determine the Lagrange multipliers of the dual problem and then recovering a solution to the continuous partitioning problem using duality;

determining a binary value of $z_{i_1 \ldots i_N}$ in $\{0,1\}$ for each $i_1 \ldots i_N$ corresponding to each $z_{i_1 \ldots i_N}$, wherein said values $z_{i_1 \ldots i_N}$ provide an optimal or near optimal solution to said continuous partitioning problem.

6. The method of claim 2 wherein said step of determining a most probable partition further comprises The steps of:

solving said continuous partitioning problem either approximately or optimally for values of $z_{i_1 \ldots i_N}$ or each $i_1, \ldots, i_N$ using a primal-dual simplex method;

determining a binary value of $z_{i_1 \ldots i_N}$ in $\{0,1\}$ for each $i_1 \ldots i_N$ corresponding to each $z_{i_1 \ldots i_N}$, wherein said values $z_{i_1 \ldots i_N}$ provide an optimal or near optimal solution to said continuous partitioning problem.

7. The method of claim 1 further comprising the step of sending a warning to aircraft or ground or sea facility based on said data association decisions.

8. The method of claim 1 further comprising the step of controlling air traffic based on said data association decisions.

9. The method of claim 1 further comprising the step of controlling anti-aircraft or anti-missile equipment based on said data association decisions.

10. The method of claim 1 further comprising the step of taking evasive action based on said data association decisions.

11. The method of claim 1 further comprising the step of working on one of said one or more objects based on said data association decisions.

12. The method of claim 1 further comprising the step of surveilling one of said one or more objects based on said data association decisions.

13. The method of claim 1 wherein said step of using a sliding window is subject to any one track of said tracks being assigned to a maximum of one observation in a single frame and subject to a maximum of a single track being assigned to each observation in said single frame.

14. The method of claim 1 wherein said step of using at least one sensor to repeatedly scan a region further comprises providing a plurality of observations that include kinematic information.

15. The method of claim 1 wherein said step of using at least one sensor to repeatedly scan a region further comprises providing a plurality of observations that include feature information.

16. The method of claim 1 wherein said step of using at least one sensor to repeatedly scan a region further comprises providing a plurality of observations that include attribute information.

17. The method of claim 1 wherein said step of using at least one sensor to repeatedly scan a region further comprises providing a plurality of observations that include kinematic and feature information.

18. The method of claim 1 wherein said step of using at least one sensor to repeatedly scan a region further comprises providing a plurality of observations that include kinematic and attribute information.

19. The method of claim 1 wherein said step of using at least one sensor to repeatedly scan a region further comprises providing a plurality of observations that include feature and attribute information.

20. The method of claim 1 wherein said step of using at least one sensor to repeatedly scan a region further comprises providing a plurality of observations that include kinematic and target identification information.

* * * * *

UNITED STATES PATENT AND TRADEMARK OFFICE
CERTIFICATE OF CORRECTION

PATENT NO.       : 6,404,380 B2
APPLICATION NO.  : 09/312036
DATED            : June 11, 2002
INVENTOR(S)      : Aubrey B. Poore, Jr.

Page 1 of 1

It is certified that error appears in the above-identified patent and that said Letters Patent is hereby corrected as shown below:

Please insert the following paragraph following the Title at line 4 col. 1, the beginning of the patent application on page one:

--STATEMENT REGARDING FEDERAL RIGHTS

This invention was made with government support under Grant Nos. F49620-00-1-0108, F49620-93-1-0133, F49620-95-1-0136, and F49620-97-1-0273 awarded by the Air Force Office of Scientific Research to Colorado State University Research Foundation. The government has certain rights in the invention.--

Signed and Sealed this

Twenty-seventh Day of April, 2010

David J. Kappos
*Director of the United States Patent and Trademark Office*